US006886648B1

(12) United States Patent
Hata et al.

(10) Patent No.: US 6,886,648 B1
(45) Date of Patent: May 3, 2005

(54) POWER OUTPUT DEVICE, HYBRID VEHICLE, AND METHOD OF CONTROLLING THEM

(75) Inventors: Hiroshi Hata, Toyota (JP); Hideaki Matsui, Aichi-ken (JP); Ryuji Ibaraki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/889,141

(22) PCT Filed: Jan. 12, 2000

(86) PCT No.: PCT/JP00/00117

§ 371 (c)(1),
(2), (4) Date: Oct. 19, 2001

(87) PCT Pub. No.: WO00/41909

PCT Pub. Date: Jul. 20, 2000

(30) Foreign Application Priority Data

Jan. 13, 1999 (JP) ........................... 11-005913

(51) Int. Cl.$^7$ ................................. B60K 1/00
(52) U.S. Cl. ..................... 180/65.2; 180/65.3
(58) Field of Search .............. 180/65.1, 65.2, 180/65.3, 65.4; 701/22; 318/10, 65

(56) References Cited

FOREIGN PATENT DOCUMENTS

| JP | 50-30223 | 3/1975 |
|----|----------|--------|
| JP | 53-133814 | 11/1978 |
| JP | 55-40806 | 9/1980 |
| JP | 6-144020 | 5/1994 |
| JP | 7-67208 | 3/1995 |
| JP | 7-96759 | 4/1995 |
| JP | 7-107617 | 4/1995 |
| JP | 7-336810 | 12/1995 |
| JP | 8-98320 | 4/1996 |
| JP | 8-98322 | 4/1996 |
| JP | 9-14385 | 1/1997 |
| JP | 9-42122 | 2/1997 |
| JP | 9-46821 | 2/1997 |
| JP | 9-193676 | 7/1997 |
| JP | 9-222064 | 8/1997 |
| JP | 9-308012 | 11/1997 |
| JP | 10-89116 | 4/1998 |
| JP | 10-327504 | 12/1998 |

*Primary Examiner*—Christopher P. Ellis
*Assistant Examiner*—Christopher Bottorff
(74) *Attorney, Agent, or Firm*—Oblon, Spivak, McClelland, Maier & Neustadt, P.C.

(57) ABSTRACT

In a planetary gear unit 120, a planetary carrier 123 is linked with an engine 150, a sun gear 121 with a motor 130, and a ring gear 122 with a motor 140 and an axle 116. A clutch 160 is disposed between the planetary gear unit 120 and the motor 140 to connect and disconnect the planetary gear unit 120 with and from the motor 140. A brake 162 is also provided to constrain the ring gear 122 in a released position of the clutch 160. The state of coupling the clutch 160 attains the structure of a parallel hybrid vehicle. The state of releasing the clutch 160 and activating the brake 162 to constrain the ring gear 122 attains the structure of a series hybrid vehicle. The technique of the present invention changes over the drive mode according to the driving state of the hybrid vehicle, thus ensuring an efficient drive that takes advantage of the characteristics of the respective drive modes.

27 Claims, 30 Drawing Sheets

POWER OUTPUT DEVICE, HYBRID VEHICLE, AND METHOD OF CONTROLLING THEM

TECHNICAL FIELD

The present invention relates to a power output apparatus that has both an engine and a motor as power source and is capable of changing over the connection state of the motor and the engine, as well as to a hybrid vehicle and a method of controlling the hybrid vehicle.

BACKGROUND ART

Hybrid vehicles having both an engine and a motor as power source have been proposed recently. The hybrid vehicles are divided into two large groups: series hybrid vehicles and parallel hybrid vehicles. In the series hybrid vehicle, a generator converts all the output power of the engine into electric power and a motor linked with a drive shaft is driven with the electric power. In the parallel hybrid vehicle, the output power of the engine is divided into two portions. One portion is transmitted directly to the drive shaft in the form of mechanical power, whereas the residual portion is converted into electric power and output to the drive shaft.

The series hybrid vehicle enables the engine to be driven at a drive point of the highest driving efficiency, which is selected among possible drive points that allow supply of the electric power required for driving the motor linked with the drive shaft. The series hybrid vehicle can thus be driven with the high driving efficiency, irrespective of the driving conditions of the vehicle.

The parallel hybrid vehicle enables part of the power output from the engine to be transmitted directly to the drive shaft in the form of mechanical power. There is naturally no loss due to the conversion into electric power. The parallel hybrid vehicle accordingly attains the higher driving efficiency than the series hybrid vehicle. The parallel hybrid vehicle, on the other hand, requires the complicated control procedures to drive the vehicle with the high driving efficiency, compared with the series hybrid vehicle. The loss in the course of the power transmission may be increased according to the driving conditions of the vehicle and lower the driving efficiency.

The prior art hybrid vehicle is fixed to either the series hybrid structure or the parallel hybrid structure. No discussion has been made on the technique of simultaneously utilizing the advantages of both the series hybrid structure and the parallel hybrid structure. There is accordingly a requirement for further improvement in driving efficiency of the prior art hybrid vehicle. This issue arises not only in the vehicles but is commonly found in any hybrid-type power output apparatus.

DISCLOSURE OF THE INVENTION

In order to solve the problem of the prior art technique discussed above, the object of the present invention is to provide a hybrid-type power output apparatus having the advantages of both the series hybrid structure and the parallel hybrid structure, as well as such a hybrid vehicle.

The present invention is directed to a power output apparatus having at least an engine and two motors and causing power to be output from a drive shaft. The power output apparatus includes changeover means that changes over a connection state of the engine and the two motors between a parallel connection mode, in which at least part of output of the engine is transmitted in the form of mechanical power to the drive shaft and at least one of the two motors is utilized as a power source, and a series connection mode, in which at least one of the two motors converts the output of the engine into electric power and the other motor reconverts the electric power into mechanical power and outputs the mechanical power to the drive shaft.

The power output apparatus of the present invention selectively uses the parallel connection mode and the series connection mode, thus ensuring a drive that takes advantage of the characteristics of both the parallel power output apparatus and the series power output apparatus.

In accordance with one preferable application of the power output apparatus, one of the two motors functions as a power regulation unit, which has at least two rotating shafts and is capable of regulating magnitude of power transmitted between the at least two rotating shafts through transmission of electric power. The power regulation unit and the other motor are arranged in series between an output shaft of the engine and the drive shaft. The changeover means includes: a connection mechanism that connects and disconnects the power regulation unit with and from the other motor; and a constraint mechanism that constrains one of the at least two rotating shafts in the power regulation unit and thereby allows conversion between electric power and mechanical power in the power regulation unit in a released position of the connection mechanism.

In the power output apparatus of this application, coupling the connection mechanism attains the parallel power output apparatus, which enables the output power of the engine to be transmitted to the drive shaft. Releasing the connection mechanism, on the other hand, prevents the output power of the engine from being transmitted directly to the drive shaft. In the released position of the connection mechanism, the function of the constraint mechanism to allow the conversion between electric power and mechanical power in the power regulation unit attains the series power output apparatus, which converts all the output power of the engine into electric power and then causes the electric power to be output from the drive shaft.

More concretely, the power output apparatus has two configurations: a first configuration, in which the engine, the power regulation unit and the constraint mechanism, the connection mechanism, the motor, and the drive shaft are arranged in this order, and a second configuration, in which the engine, the motor, the connection mechanism, the power regulation unit and the constraint mechanism, and the drive shaft are arranged in this order. In the first configuration, the connection mechanism in the released position effects the series power output apparatus, in which the power regulation unit converts the output power of the engine into electric power and the motor carries out the power operation with a supply of the electric power. In the second configuration, the connection mechanism in the released position effects the series power output apparatus, in which the motor converts the output power of the engine into electric power and the power regulation unit carries out the power operation with a supply of the electric power. The technique of the present invention may be applied to either of these arrangements.

In the power output apparatus of the present invention, the power regulation unit may be constructed as a pair-rotor motor having two rotors that are rotatable relative to each other, or may include a planetary gear unit having three rotating shafts and a motor generator linked with one of the three rotating shafts.

The power regulation unit may have any other construction as long as it exerts the functions discussed above.

Any of these constructions works as the power regulation unit as discussed below. In the pair-rotor motor, electromagnetic coupling between the two rotors allows mechanical power to be transmitted from one rotor to the other rotor. When there is a slip between the two rotors, the pair-rotor motor may regenerate the electric power corresponding to the slip to allow transmission of the reduced power to the other rotor. The pair-rotor motor may, on the contrary, carry out the power operation with a supply of electric power to allow transmission of the increased power to the other rotor.

In the latter construction, the power regulation may be actualized through the function of the planetary gear unit. The planetary gear unit has the mechanical characteristic that the settings of the rotating state of any two rotating shafts among the three rotating shafts unequivocally determine the rotating state of a residual rotating shaft. The power input from one rotating shaft to the planetary gear unit is divided into a power portion transmitted to the motor generator and another power portion transmitted to the residual rotating shaft. The power transmitted to the motor generator can be regenerated in the form of electric power. In the above construction, regenerating part of the power input into the planetary gear unit into electric power reduces the magnitude of the power transmitted in the form of mechanical power. The motor generator may also carry out the power operation with a supply of electric power to increase the power input into the planetary gear unit and transmit the increased power.

In the construction where the power regulation unit includes the planetary gear unit, the constraint mechanism may link the residual two rotating shafts of the planetary gear unit with each other.

As described previously, the planetary gear unit has three rotating shafts. In the power output apparatus of the present invention, the first rotating shaft is connected with the motor generator, the second rotating shaft with the connection mechanism, and the third rotating shaft with either the output shaft of the engine or the drive shaft. Under such linkage conditions, when the connection mechanism is in the released position, the rotating state of the second rotating shaft is not constrained. The planetary gear unit has the mechanical characteristic that settings of the rotating state of two rotating shafts automatically determine the rotating state of the residual rotating shaft. While the rotating state of the second rotating shaft is not specified, the rotating state of the rotating shaft that receives the power is not determined in the case of the power transmission between the first rotating shaft and the third rotating shaft.

The constraint mechanism of the above arrangement links the residual two rotating shafts of the planetary gear unit with each other, that is, connects the second rotating shaft with the third rotating shaft. The rotating state of the second rotating shaft is accordingly constrained by the rotating state of the third rotating shaft, so that the second rotating shaft is rotated integrally with the third rotating shaft. This specifies the rotating state of the second rotating shaft and thereby allows the power transmission between the first rotating shaft and the third rotating shaft. A variety of means, such as a clutch or a gear, may be applied to connect the two rotating shafts with each other.

In accordance with one preferable embodiment, the constraint mechanism constrains rotation of a specific rotating shaft that is linked with the connection mechanism, among the at least two rotating shafts in the power regulation unit.

The constraint mechanism of this arrangement is advantageously applied to the power regulation unit of any construction.

The present invention is not restricted to the power output apparatus described above, but may be directed to a hybrid vehicle with the power output apparatus mounted thereon. As described previously with regard to the power output apparatus, the hybrid vehicle of the present invention ensures a drive that takes advantage of the characteristics of both the parallel hybrid vehicle and the series hybrid vehicle according to the driving conditions of the vehicle.

In the hybrid vehicle of the present invention, the changeover means may manually implement the changeover. In accordance with one preferable application, however, the hybrid vehicle further includes: detection means that detects a predetermined parameter relating to a driving state of the hybrid vehicle; and control means that controls the changeover means to change over the connection state, based on a result of the detection.

This application enables the adequate connection state to be selectively used according to the driving conditions of the vehicle without any specific load of the driver, thus sufficiently taking advantage of the characteristics of both the parallel hybrid vehicle and the series hybrid vehicle.

In the hybrid vehicle having the control means, a diversity of control techniques may be adopted to change over the connection state.

In a first embodiment, the control means selects the connection state of high driving efficiency against the driving conditions of the vehicle.

The series hybrid vehicle selects a drive point of favorable driving efficiency among possible drive points that allow output of the required power, and drives the engine at the selected drive point, thus attaining the high driving efficiency in a relatively stable manner, regardless of the driving conditions of the vehicle. In the series hybrid vehicle, however, the output power of the engine is once converted into electric power, then reconverted into mechanical power by the motor or the like, and output from the drive shaft. There is accordingly a loss due to the conversion and the reconversion. In the parallel hybrid vehicle, on the other hand, the engine is driven at a selected drive point of favorable driving efficiency, while part of the output power of the engine is transmitted directly to the drive shaft in the form of mechanical power. The parallel hybrid vehicle accordingly has the higher driving efficiency than the series hybrid vehicle. In the parallel hybrid vehicle, however, power circulation may arise according to the driving conditions of the vehicle and lower the driving efficiency, as discussed below.

The discussion first regards the reason why the power circulation arises in the structure where the motor is linked with the drive shaft, that is, in the first configuration where the engine, the power regulation unit and the constraint mechanism, the connection mechanism, the motor, and the drive shaft are arranged in this order. FIG. 34 shows an example of such configuration of the hybrid vehicle. In the illustrated hybrid vehicle, a combination of a planetary gear unit PG with a generator G is applied for the power regulation unit. The planetary gear unit PG includes a sun gear SG revolving on the center, a planetary pinion gear PC revolving both round the sun gear SG and on its axis, and a ring gear RG revolving round the planetary pinion gear PC. In the hybrid vehicle of FIG. 34, a crankshaft CS of an engine is linked with the planetary carrier PC. The generator G is linked with the sun gear SG. A motor AM is linked with the ring gear RG, which is further connected to a drive shaft DS.

The process of power transmission in this hybrid vehicle is discussed below with reference to FIGS. 35 and 36. FIG. 35 schematically illustrates the flow of power in the underdrive condition where the output power of the engine is converted into a combination of reduced revolving speed and enhanced torque and is output from the drive shaft DS, while the, product of the revolving speed and the torque is fixed. A power PU1 output from the engine is divided into two portions corresponding to a gear ratio of the planetary gear unit PG. Controlling the revolving speed and the torque of the generator G connecting with the sun gear SG causes a power PU2 having a revolving speed that coincides with a target revolving speed to be transmitted to the ring gear RG. In the underdrive condition, the target revolving speed is lower than the engine speed, so that the power PU2 is smaller than the output power PU1 of the engine. The residual power out of the output power of the engine is transmitted to the sun gear SG. The generator G linked with the sun gear SG regenerates the transmitted power in the form of electric power EU. The motor AM carries out the power operation with a supply of the electric power EU to supplement the insufficient torque. A power PU3 defined by the required combination of the target revolving speed and the target torque is accordingly output to the drive shaft DS.

FIG. 36 schematically illustrates the flow of power in the overdrive condition where the output power of the engine is converted into a combination of enhanced revolving speed and reduced torque and is output from the drive shaft DS. In this case, the generator G connecting with the sun gear SG carries out the power operation to enhance the revolving speed of the power PU1 output from the engine, and a power PU3 having the enhanced revolving speed is transmitted to the ring gear RG. The motor AM then applies loading to adjust the excess torque and causes a power PU4 defined by the required combination of the target revolving speed and the target torque to be output to the drive shaft DS. The motor AM regenerates part of the power PU4 in the form of electric power EU2 to apply the loading. The electric power EU2 is used for the power operation of the generator G.

In the underdrive condition, in the course of transmitting the output power of the engine to the drive shaft DS, the electric power regenerated by the upstream generator G is supplied to the downstream motor AM. In the overdrive condition, on the contrary, the electric power regenerated by the downstream motor AM is supplied to the upstream generator G. The electric power supplied to the generator G is again transmitted in the form of mechanical power to the downstream motor AM. In the overdrive condition, there is accordingly a power circulation γ1. The power circulation γ1 reduces the rate of the power effectively transmitted to the drive shaft DS to all the output power of the engine, thus lowering the driving efficiency of the hybrid vehicle.

The power circulation does not always arise in the range where the revolving speed of the drive shaft is higher than the engine speed. The relationship between the revolving speed of the drive shaft and the engine speed that starts the power circulation may depend upon the gear ratio of the planetary gear unit. In the specification hereof, in the structure where the motor is linked with the drive shaft, the state of causing power circulation while the revolving speed of the drive shaft is higher than the engine speed is called the overdrive condition.

FIG. 37 illustrates the hybrid vehicle in the structure where the motor is linked with the engine, that is, in the second configuration where the engine, the motor, the power regulation unit, and the drive shaft are arranged in this order. Like the structure of FIG. 34, the generator G is linked with the sun gear SG of the planetary gear unit PG, the crankshaft of the engine with the planetary carrier PC, and the drive shaft DS with the ring gear RG. The difference from the structure of FIG. 34 is that the motor AM is linked with the crankshaft in the structure of FIG. 37.

The process of power transmission in this hybrid vehicle is discussed below with reference to FIGS. 38 and 39. FIG. 38 shows the process of power transmission in the underdrive condition, and FIG. 39 shows the process of power transmission in the overdrive condition. In this structure, the reverse phenomena occur to those in the structure where the motor is linked with the drive shaft. In the underdrive condition, electric power EO1 regenerated by the downstream generator G is supplied to the upstream motor AM. In the overdrive condition, electric power EO2 regenerated by the upstream motor AM is supplied to the downstream generator G. While the motor is linked with the output shaft of the engine, in the underdrive condition, there is a power circulation γ2 shown in FIG. 39 to lower the driving efficiency of the hybrid vehicle. In the specification hereof, in the structure where the motor is linked with the engine, the state of causing power circulation while the revolving speed of the drive shaft is lower than the engine speed is called the underdrive condition.

In the parallel hybrid vehicle in either of the first configuration of the second configuration, the power circulation arises according to the driving conditions of the vehicle to lower the driving efficiency. The hybrid vehicle of the present invention takes into account these facts and compares the driving efficiency in the structure of the series hybrid vehicle with the driving efficiency in the structure of the parallel hybrid vehicle to select the suitable structure having the higher driving efficiency according to the driving conditions of the vehicle. The hybrid vehicle of the present invention thus enhances the driving efficiency. The above description regards the relationship between the driving efficiency and the driving state of the vehicle in the exemplified configurations. In any configuration, the parallel hybrid vehicle and the series hybrid vehicle generally have the high driving efficiency in different driving areas. The adequate selection between the structure of the parallel hybrid vehicle and the structure of the series hybrid vehicle thus ensures the enhanced driving efficiency in a wide driving range.

In a second embodiment, the detection means determines whether or not a current gearshift position is at a reverse position, and the control means selects the series connection mode when it is determined that the current gearshift position is at the reverse position.

The hybrid vehicle of this embodiment releases the connection mechanism to attain the structure of the series hybrid vehicle when the gearshift position is at the reverse position, that is, when the vehicle is in a reverse driving state. Such control procedure enables the hybrid vehicle to output a sufficient torque and ensure a smooth drive in the reverse direction, because of the reasons discussed below.

As described previously, the parallel hybrid vehicle enables part of the output power of the engine to be directly transmitted to the drive shaft. The engine generally rotates in one fixed direction, whether the vehicle goes forward or goes back. In the parallel hybrid vehicle, it is accordingly required to convert the mechanical power output from the engine into a power in the reverse direction for a reverse drive. Such conversion may be attained by controlling the revolving speeds of the power regulation unit and the motor. This method compensates for the torque output from the engine in the direction of moving the vehicle forward and thereby reduces the torque output from the drive shaft. This method also requires the delicate balance among the engine, the power regulation unit, and the engine. A variation in torque output from the engine thus often leads to a variation in torque output to the drive shaft, which results in the poor ride.

The hybrid vehicle of the above embodiment takes the structure of the series hybrid vehicle in the course of reverse driving, thus preventing the power output from the engine from being directly transmitted to the drive shaft. This arrangement facilitates the control by reversely rotating the power regulation unit or the motor linked with the drive shaft in the course of reverse driving. There is no need of compensation for the output torque of the engine, thus allowing the power regulation unit or the motor to output a sufficient torque in the reverse direction.

In a third embodiment, the detection means determines whether or not the hybrid vehicle is at a stop, and the control means selects the series connection mode when it is determined that the hybrid vehicle is at a stop.

The hybrid vehicle of this embodiment releases the connection mechanism to attain the structure of the series hybrid vehicle, while the vehicle is at a stop. At the time of starting or stopping the engine while the vehicle is at a stop, this arrangement effectively prevents a torque variation on the drive shaft and thereby significantly improves the ride as discussed below.

While the hybrid vehicle is at a stop, the engine may start or stop, for example, according to the state of charge in the battery. In the parallel hybrid vehicle, the function of the power regulation unit allows a start of the engine without outputting the power to the drive shaft even while the vehicle is at a stop. In the configuration of FIG. 34, for example, the motor AM outputs the torque to compensate for the torque transmitted to the ring gear RG of the planetary gear unit PG, among the output power of the engine. In this case, the output power of the engine is regenerated in the form of electric power by the generator G. Starting the engine during the stop of the vehicle thus enables the battery to be charged with the regenerated electric power. In the case where the state of charge in the battery reaches a sufficient level, stopping the engine effectively saves the fuel consumption. Similar operations are allowed in the series hybrid vehicle.

In the structure of the parallel hybrid vehicle, the start or the stop of the engine varies the torque transmitted to the drive shaft. It is practically impossible to control the motor AM linked with the drive shaft completely following the torque variation and compensate for the torque transmitted to the drive shaft. In the structure of the parallel hybrid vehicle, the start or the stop of the engine during the stop of the vehicle may accordingly cause vibrations of the vehicle and damage the ride. The hybrid vehicle of the above embodiment takes the structure of the series hybrid vehicle while the vehicle is at a stop. This arrangement effectively prevents the torque variation due to the start or stop of the engine from being transmitted to the drive shaft and thus significantly improves the ride during the stop of the vehicle.

The third embodiment selects the structure of the series hybrid vehicle regardless of the state of charge in the battery, while the vehicle is at a stop. One possible modification may select the structure of the series hybrid vehicle in the case where the two conditions a fulfilled, that is, when the vehicle is at a stop and when the state of charge in the battery is within a predetermined range. The predetermined range causes a start or a stop of the engine. Such control procedure may select the structure of the parallel hybrid vehicle according to the state of charge in the battery, even when the vehicle is at a stop. This modified arrangement advantageously ensures smooth acceleration of the vehicle without a changeover from the series hybrid vehicle to the parallel hybrid vehicle.

In a fourth embodiment, the detection means determines whether or not the hybrid vehicle is in a specific driving state that requires motoring of the engine, and the control means selects the series connection mode when it is determined that the hybrid vehicle is in the specific driving state.

In a fifth embodiment, the detection means determines whether or not the hybrid vehicle is in a certain driving state that requires a stop of the engine, and the control means selects the series connection mode when it is determined that the hybrid vehicle is in the certain driving state.

The hybrid vehicle of the fourth or the fifth embodiment attains the structure of the series hybrid vehicle at the time of motoring and starting the engine or at the time of stopping the engine. As described previously, in the structure of the parallel hybrid vehicle, the torque variation due to the start or the stop of the engine is transmitted to the drive shaft. This leads to variation of the vehicle and damages the ride. The hybrid vehicle of the fourth or the fifth embodiment selects the structure of the series hybrid vehicle at the time of starting or stopping the vehicle. This arrangement effectively prevents the torque variation due to the start or stop of the engine from being transmitted to the drive shaft and thus significantly improves the ride at the time of starting or stopping the engine.

In the fourth embodiment and the fifth embodiment, the hybrid vehicle selects the structure of the series hybrid vehicle at the time of starting or stopping the engine, whether or not the vehicle is at a stop. One possible modification may take the structure of the series hybrid vehicle at the time of starting or stopping the engine only when the vehicle is at a stop or is driven at a very low speed. During a normal-speed drive, the driver and the passengers do not sensitively feel the vibrations of the vehicle. The arrangement of selecting the structure of the series hybrid vehicle only when the vehicle is at a stop or is driven at a low speed effectively prevents the changeover to the series hybrid vehicle every time the engine starts or stops during a drive in the structure of the parallel hybrid vehicle, thus ensuring a smooth drive.

In a sixth embodiment, the power regulation unit includes a planetary gear unit having three rotating shafts and a motor generator linked with one of the three rotating shafts, and the constraint mechanism links the residual two rotating shafts of the planetary gear unit with each other. The detection means detects a required torque to be output from the drive shaft, and the control means makes both the connection mechanism and the constraint mechanism in coupled positions when the required torque is not less than a preset value.

In the hybrid vehicle of the sixth embodiment, coupling both the connection mechanism and the constraint mechanism allows the power to be output from the engine, the motor, and the motor generator to the drive shaft. When the required torque is not less than a preset value, the hybrid vehicle of this arrangement sets the connection mechanism and the constraint mechanism in the coupled positions and thereby effectively utilizes the power output from the engine, the motor, and the motor generator for a drive. The preset value is specified, based on the required torque that can be attained by outputting the power from the engine, the motor, and the motor generator to the drive shaft.

In a seventh embodiment, the hybrid vehicle further includes: resonance detection means that detects occurrence of a resonance on at least one of the output shaft of the engine and the drive shaft; and resonance suppression control means that, when the occurrence of the resonance is detected at any shaft, controls both the connection mechanism and the constraint mechanism to restrict a torque applied on the shaft with the resonance.

In the hybrid vehicle, the inertia force of the power regulation unit and the motor linked with the output shaft of the engine and the drive shaft may cause torsional resonance on these rotating shafts. The torsional resonance is partly ascribed to the elastic deformation of a rotating shaft when the torque applied to the rotating shaft is greater than the inertia force of the power regulation unit or the motor. The hybrid vehicle of the above embodiment controls the connection mechanism and the constraint mechanism to restrict the torque applied on the rotating shaft with the detected resonance, thus relieving the resonance.

The procedure of controlling the connection mechanism and the constraint mechanism may release these mechanisms or reduce the force of connection, as long as it can restrict the torque applied on the rotating shaft. It is not necessary that the resonance suppression control means controls both the connection mechanism and the constraint mechanism, but may alternatively control one of these mechanisms that relates to suppression of the resonance.

In the structure of controlling the connection mechanism and the constraint mechanism, it is preferable that the resonance suppression control means restricts the torque applied on the shaft with the resonance to be not greater than a torsional strength of the shaft.

The torsional strength represents the maximum torque that breaks the rotating shaft by the torsional resonance. The maximum torque can be set in advance according to the material and the cross section of the rotating shaft. The restriction in the above manner at least prevents the rotating shaft with the resonance from being broken by the torsional resonance.

It is also preferable that the resonance suppression control means restricts the torque applied on the shaft with the resonance to a specific level that causes no vibrations of the hybrid vehicle.

The restriction in this manner significantly improves the ride of the vehicle. The specific level of the torque that causes no vibrations of the vehicle may be set in advance by analyses or experiments. Another applicable procedure may feedback control the torque applied on the rotating shaft with the resonance, based on the output of an acceleration sensor that senses the vibrations of the vehicle.

In accordance with one preferable application of the seventh embodiment discussed above that carries out the control to suppress the resonance, the power regulation unit is linked with the engine, and the resonance detection means detects the occurrence of the resonance on the output shaft of the engine in the released position of the connection mechanism and in an active position of the constraint mechanism. The resonance suppression control means reduces a force of constraint by the constraint mechanism when the occurrence of the resonance is detected.

In the released position of the connection mechanism, that is, in the structure of the series hybrid vehicle, the constraint of the rotation of one of the rotating shafts in the power regulation unit by the constraint mechanism enables the torque to be transmitted to the output shaft of the engine. The hybrid vehicle of the above application reduces the force of constraint by the constraint mechanism when the resonance occurs at the output shaft, in order to suppress the resonance.

In the above application, it is preferable that the resonance detection means detects the occurrence of the resonance in the course of motoring the engine, and the resonance suppression control means reduces the force of constraint by the constraint mechanism in a certain range that enables a specific torque, which allows motoring of the engine, to be added. to the output shaft.

This arrangement enables the operation of motoring the engine to be continued even when the force of constraint by the constraint mechanism is reduced to suppress the resonance, thus ensuring a smooth start of the engine without any trouble.

In accordance with another preferable application of the seventh embodiment, the resonance detection means detects the occurrence of the resonance on the drive shaft in a coupled position of the connection mechanism, and the resonance suppression control means reduces a force of connection by the connection mechanism when the occurrence of the resonance is detected.

In the coupled position of the connection mechanism, that is, in the structure of the parallel hybrid vehicle, all the engine, the power regulation unit, and the motor are mechanically linked with one another. This causes an extremely large inertia force. In this structure, a jack rabbit start or abrupt braking of the vehicle may cause an excess torque to be transmitted to the drive shaft and generate the resonance. The hybrid vehicle of the above application controls the connection mechanism in such cases to restrict the torque transmitted to the drive shaft, thus effectively suppressing the resonance arising at the time of jack rabbit start or abrupt braking.

In the above application, it is preferable that the resonance detection means detects the occurrence of the resonance in the course of braking the hybrid vehicle, and the resonance suppression control means reduces the force of connection by the connection mechanism in a certain range that enables transmission of a specific torque, which is not less than a maximum regenerative torque applied by one of the power regulation unit and the other motor arranged closer to the engine.

This arrangement enables the regenerative braking by both the power regulation unit and the motor even when the force of connection by the connection mechanism is reduced to suppress the resonance. The hybrid vehicle of this arrangement enables the kinetic energy accompanied by the drive of the vehicle to be regenerated in the form of electric power at a high rate, thus attaining a drive of high efficiency.

In accordance with one preferable application of the present invention, the hybrid vehicle further includes: route information input means that inputs route information relating to a driving state of the hybrid vehicle, with regard to a preset driving route of the hybrid vehicle, and the control means carries out the changeover by taking into account the route information.

This application enables the adequate selection between the structure of the series hybrid vehicle and the structure of the parallel hybrid vehicle, thus ensuring a smooth drive. In the case of any of the above control procedures taking into account only the driving conditions of the vehicle at a certain time, there may be frequent changeover between the structure of the series hybrid vehicle and the structure of the parallel hybrid vehicle according to the driving conditions of the vehicle. The frequent changeover damages the ride and lowers the response of the vehicle to a driver's action. The hybrid vehicle of the above application carries out the changeover by taking into account the route information with regard to the planned driving route of the vehicle, thus preventing possible troubles due to the frequent changeover. When an increase in power consumption is expected, the hybrid vehicle may be driven in the structure suitable for charging the battery.

The route information includes, for example, information showing whether or not the preset driving route includes an upward slope, information showing whether or not the preset driving route has a traffic jam, and information regarding the speed restriction. When the input route information shows an approach of the vehicle to an upward slope, the hybrid vehicle may select the parallel mode suitable for charging the battery. The hybrid vehicle can be driven adequately based on the input route information regarding, for example, the presence of a curve in the preset driving route or the presence of a traffic jam, without requiring the frequent changeover of the drive mode.

The above application 'takes into account the route information' to carry out the changeover. One possible procedure selects the drive mode based on the route information in preference to the drive mode according to the driving state of the vehicle. Another possible procedure modifies the mapping of the driving state of the vehicle to the drive mode, based on the route information. In this case, the procedure may extend the driving area of the series mode or, on the contrary, extend the driving area of the parallel mode according to the route information. Still another possible procedure corrects the parameter representing the driving state of the vehicle, based on the route information. There are lots of other procedures to set the drive mode by reflecting the route information.

The present invention is also directed to a method of controlling a hybrid vehicle. Here the hybrid vehicle includes: at least an engine and a motor as power source for causing power to be output from a drive shaft; and changeover means that changes over a connection state of the engine and the motor between a parallel connection mode, which transmits at least part of output of the engine to the drive shaft in the form of mechanical power, and a series connection mode, which converts the output of the engine into electric power and outputs the electric power to the drive shaft.

The method includes the steps of:

(a) detecting a predetermined parameter relating to a driving state of the hybrid vehicle; and (b) controlling the changeover means to change over the connection state, based on a preset mapping of each range of the predetermined parameter to the connection state.

The control method of the present invention adequately changes over the connection state of the hybrid vehicle, thus ensuring a drive that takes advantage of the characteristics of both the parallel hybrid vehicle and the series hybrid vehicle. The control method may be applied to the vehicle having any of the various arrangements and applications discussed above. The diversity of settings discussed above as the first through the seventh embodiments, for example, the setting by giving the preference to the driving efficiency and the setting based on the gearshift position, are applicable for the preset mapping.

BRIEF DESCRIPTION OF THE DRAWINGS

BEST MODES OF CARRYING OUT THE INVENTION (1) Construction of First Embodiment The construction of a first embodiment is discussed below with reference to FIG. 1. FIG. 1 schematically illustrates the structure of a hybrid vehicle with a power output apparatus of the first embodiment mounted thereon. The hybrid vehicle has a power system of the following construction. An engine 150 included in the power system is a conventional gasoline engine and rotates a crankshaft 156. An EFIECU 170 controls driving of the engine 150 and is constructed as a one-chip microcomputer including a CPU, a ROM, and a RAM. The CPU controls fuel injection of the engine 150 and carries out other control operations according to programs recorded in the ROM. In order to attain such control, a diversity of sensors representing the driving conditions of the engine 150 are connected to the EFIECU 170. Such sensors and switches are omitted from the illustration. The EFIECU 170 electrically connects with a control unit 190 and transmits various pieces of information to and from the control unit 190 via communication. The EFIECU 170 receives a diversity of target values with regard to the driving conditions of the engine 150 from the control unit 190 and controls the engine 150 based on such target values.

Figure 1:
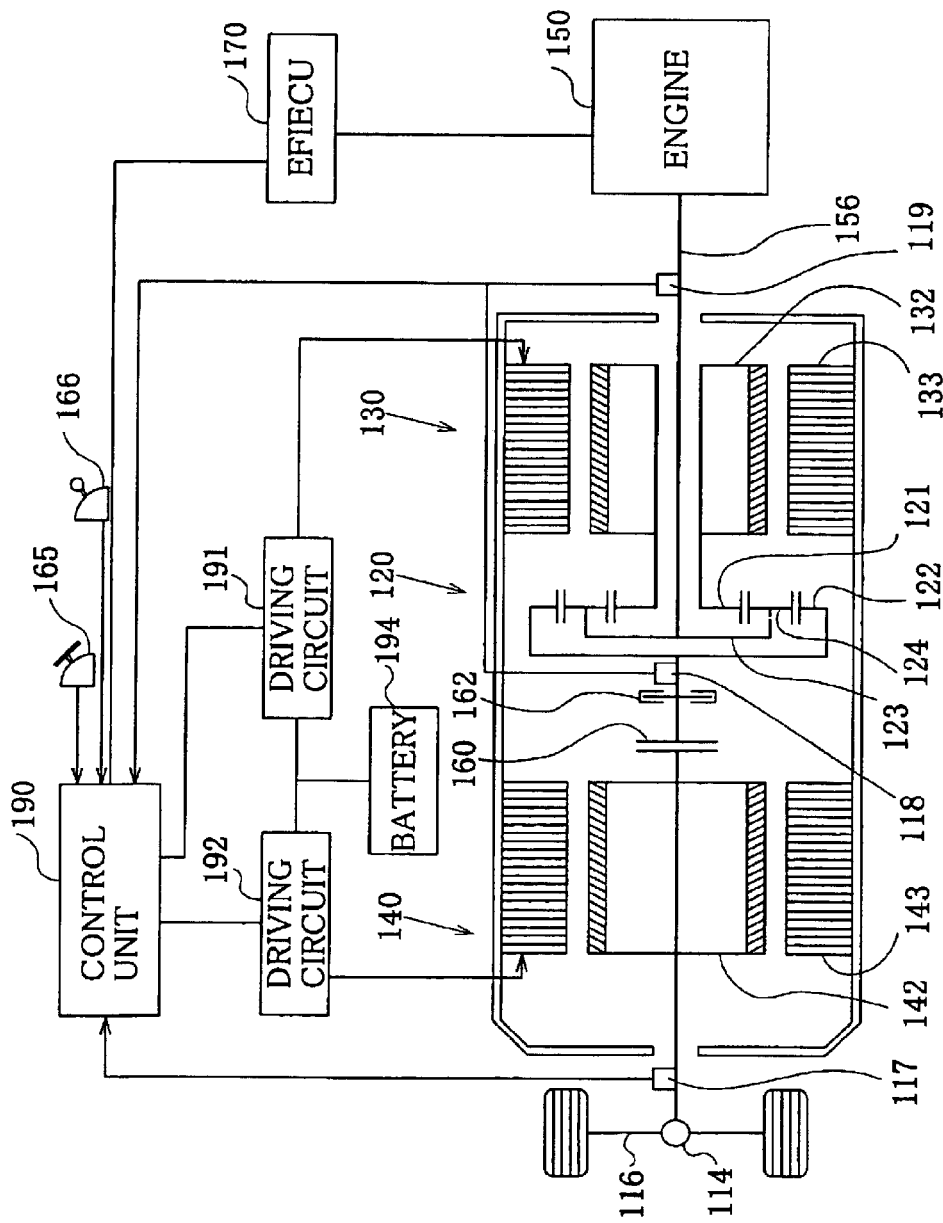
FIG. 1 schematically illustrates the general structure of a hybrid vehicle in a first embodiment of the present invention.

In the hybrid vehicle of FIG. 1, the power system includes the engine 150, a motor 130, and another motor 140 that are connected in this order from the upstream side. These three components of the power system are mechanically linked with one another via a planetary gear unit 120. The planetary gear unit 120 includes a sun gear 121 revolving on the center, a planetary pinion gear 124 revolving both round the sun gear 121 and on its axis, and a ring gear 122 revolving round the planetary pinion gear 124. The planetary pinion gear 124 is supported on a planetary carrier 123. In the hybrid vehicle of FIG. 1, the crankshaft 156 is linked with the planetary carrier 123. The motor 130 has a stator 133 fixed to a casing and a rotor 132 connecting with the sun gear 121. The motor 140 has a stator 143 fixed to the casing and a rotor 142 connecting with the ring gear 122. The ring gear 122 is linked with an axle 116 via a differential gear.

The power system in the hybrid vehicle of this embodiment further includes a clutch 160 that connects and disconnects the ring gear 122 with and from the motor 140. A brake 162 to constrain the rotation of the ring gear 122 is disposed upstream the clutch 160. The connection and disconnection of the clutch 160 and the brake 162 are controlled by the control unit 190.

Each of the motors 130 and 140 is a three-phase synchronous motor, which includes the rotor 132 or 142 with a plurality of permanent magnets attached to the outer circumferential face thereof and the stator 133 or 143 with three-phase coils wound thereon to generate a revolving magnetic field. Each of the motors 130 and 140 may work as a standard motor that is driven to rotate by the interaction between the magnetic field generated by the permanent magnets attached to the rotor 132 or 142 and the magnetic field generated by the three-phase coils wound on the stator 133 or 143. Each of the motors 130 and 140 may also work as a generator that generates an electromotive force between both ends of the three-phase coils by such interaction. A sine wave polarized motor, in which the magnetic flux density between the rotor 132 or 142 and the stator 133 or 143 has a sinusoidal distribution in the circumferential direction, is applicable for the motors 130 and 140. A non-sine wave polarized motor that can output a relatively large torque is, however, applied for the motors 130 and 140 in this embodiment.

The stators 133 and 143 are electrically connected to a battery 194 via driving circuits 191 and 192, respectively. Each of the driving circuits 191 and 192 is constructed as a transistor inverter that includes plural pairs of transistors as switching elements and is electrically connected to the control unit 190. The control unit 190 PWM (pulse width modulation) controls the on- and off-time of the respective transistors included in the driving circuits 191 and 192. The PWM control makes three-phase alternating current flown through the three-phase coils of the stator 133 or 143 to generate a revolving magnetic field with the battery 194 as the power source.

The driving conditions of the hybrid vehicle of this embodiment are under control of the control unit 190. Like the EFIECU 170, the control unit 190 is constructed as a one-chip microcomputer including a CPU, a ROM, and a RAM. The CPU carries out a variety of control operations discussed later, according to programs recorded in the ROM. In order to attain such control, a diversity of sensors and switches are electrically connected to the control unit 190. Some examples of the sensors and switches that are connected to the control unit 190 include an accelerator pedal position sensor 165 that measures the quantity of depression of an accelerator pedal, a gearshift position sensor 166 that detects the position of a gearshift lever, a speed sensor 117 that measures the revolving speed of the axle 116, another speed sensor 118 that measures the revolving speed of the rotating shaft linked with the ring gear 122, and still another speed sensor 119 that measures the revolving speed of the rotating shaft linked with the planetary carrier 123. As mentioned above, the control unit 190 is electrically connected to the EFIECU 170 and transmits various pieces of information to and from the EFIECU 170. The control unit 190 outputs information required for control of the engine 150 to the EFIECU 170, thereby attaining indirect control of the engine 150. On the contrary, the control unit 190 may receive diverse pieces of information, for example, the revolving speed of the engine 150, from the EFIECU 170.

Figure 2:
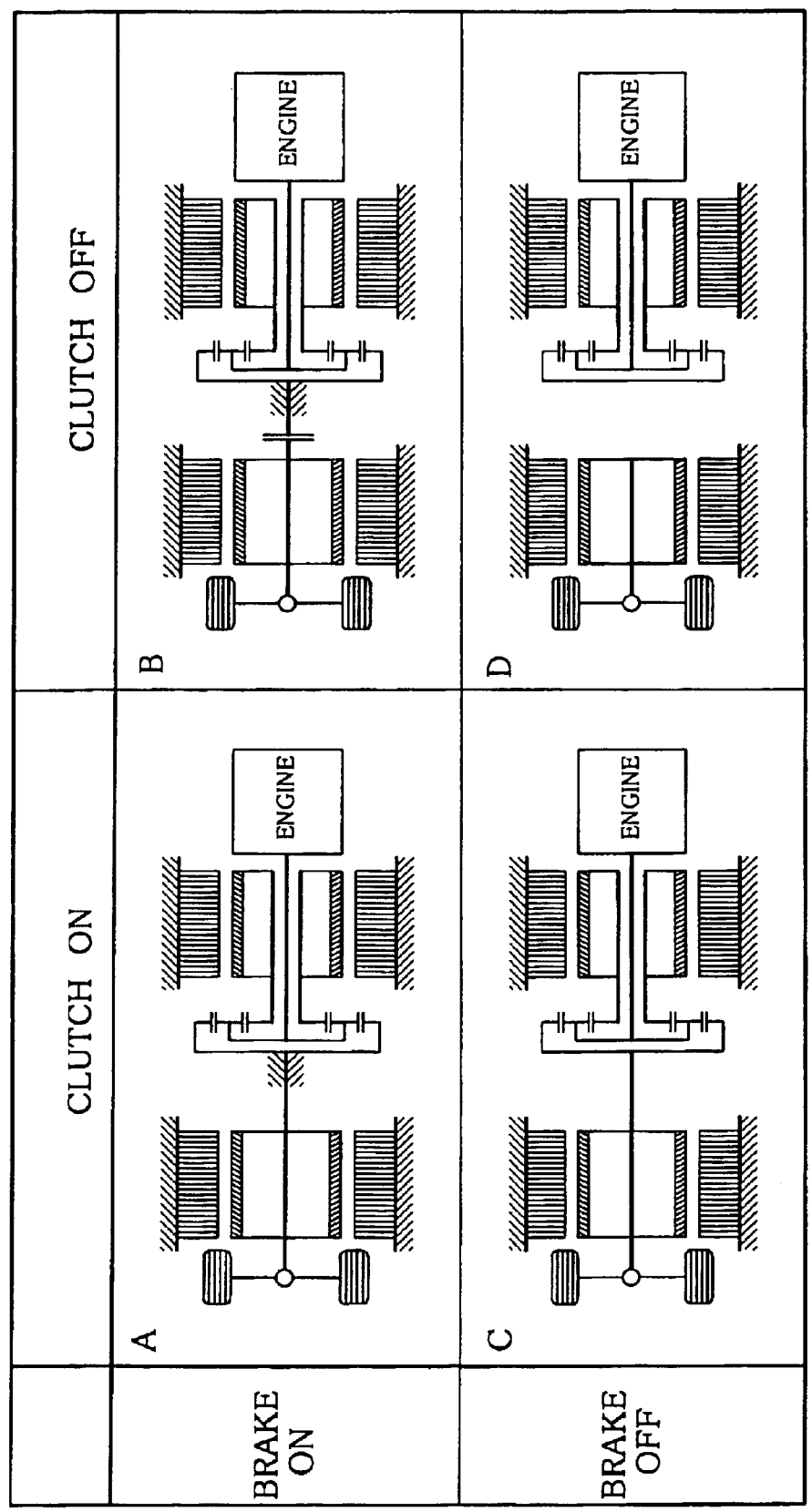
FIG. 2 enumerates possible connection states in the hybrid vehicle of the first embodiment.

The control unit 190 also controls the connection and disconnection of the clutch 160 and the brake 162. In the hybrid vehicle of this embodiment, the configuration of the power system may be changed over among four connection states according to the conditions of the clutch 160 and the brake 162. FIG. 2 enumerates these four connection states.

The upper left drawing represents a connection state A, in which both the clutch 160 and the brake 162 are active. In this connection state, the brake 162 constrains the rotation of the ring gear 122. In the coupling position of the clutch 160, the ring gear 122 is directly linked with the axle 116. In the connection state A, the brake 162 accordingly constrains the rotation of the axle 116. This connection state is not allowed during a drive of the vehicle but is selectable only during a stop of the vehicle. The hybrid vehicle of this embodiment does not apply the connection state A.

The upper right drawing represents a connection state B, in which the brake 162 is active but the clutch 160 is inactive. As in the case of the connection state A, the brake 162 constrains the rotation of the ring gear 122 in the connection state B. The rotation of the axle 116 is, however, allowed since the clutch 160 is released. The clutch 160 is located upstream the motor 140, so that the motor 140 can output power to the axle 116. While the brake 162 constrains the rotation of the ring gear 122, the sun gear 121 connecting with the motor 130 and the planetary carrier 123 connecting with the engine 160 are rotatable in the structure of the planetary gear unit 120. In the connection state B, the motor 130 can regenerate the power output from the engine 150 in the form of electric power. Namely the connection state B where the clutch 160 is released and the brake 162 is activated corresponds to the structure of the series hybrid vehicle.

Figure 34:
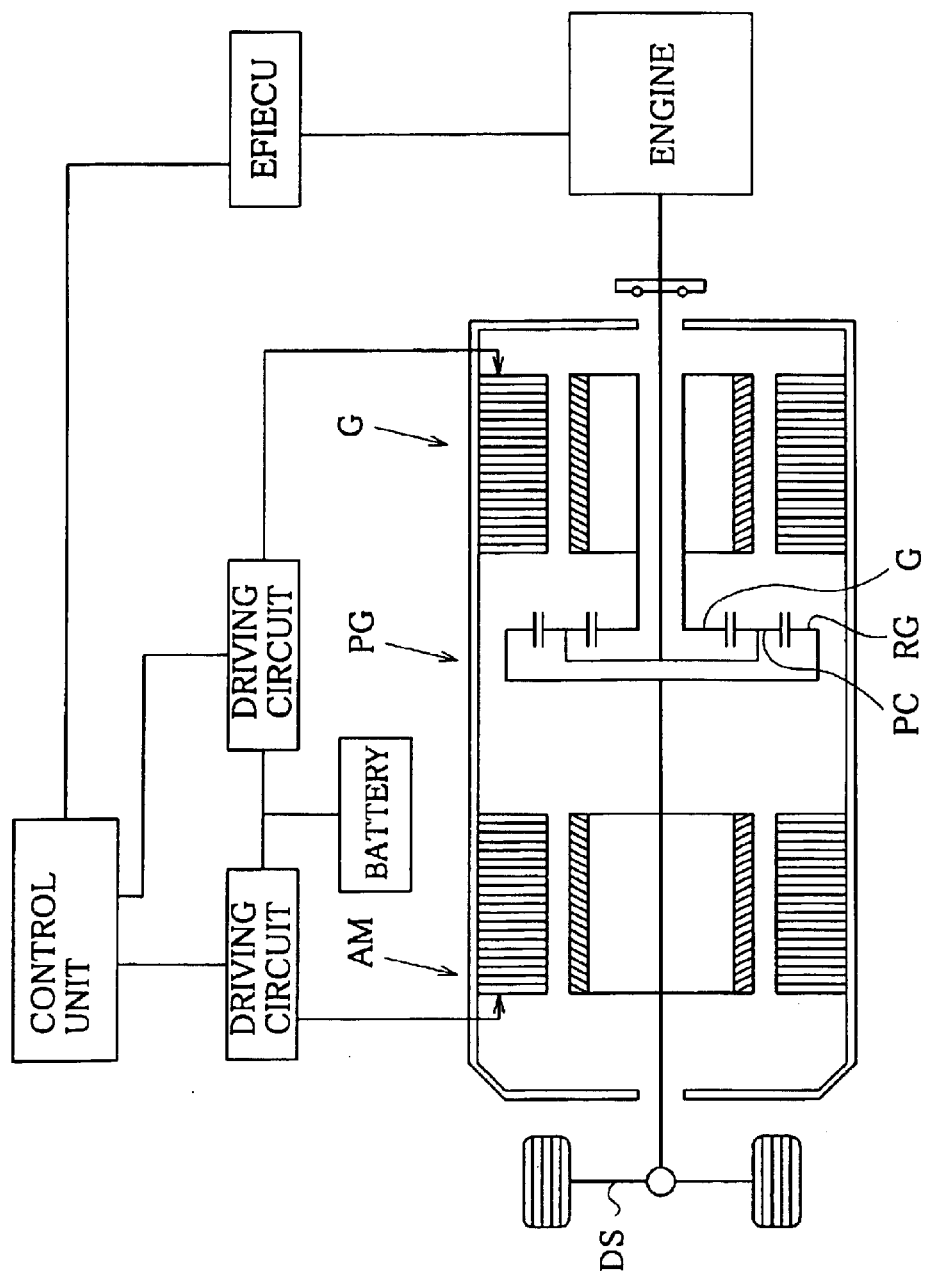
FIG. 34 shows the structure of a prior art hybrid vehicle in a state of connecting an assist motor with an axle.

The lower left drawing represents a connection state C, in which the brake 162 is inactive but the clutch 160 is active. In this state, the ring gear 122 is rotatable with the axle 116. This is equivalent to the structure of the parallel hybrid vehicle discussed previously with FIG. 34. Namely the connection state C in the hybrid vehicle of this embodiment where the brake 162 is released and the clutch 160 is coupled in the hybrid vehicle of this embodiment corresponds to the structure of the parallel hybrid vehicle.

The lower right drawing represents a connection state D, in which both the brake 162 and the clutch 160 are inactive. In this state, the ring gear 122 is freely rotatable. Since the clutch 160 is released, the axle 116 is rotatable and the motor 140 can output power to the axle 116. In this case, however, the motor 130 can not regenerate the power output from the engine 150. As described previously, the planetary gear unit has the mechanical characteristic that the settings of the rotating state of two rotating shafts automatically determine the rotating state of a residual rotating shaft. In the connection state D, the brake 162 is inactive, so that the rotating state of the ring gear 122 is not specified. When the engine 150 outputs power and a load is applied to the sun gear 121 to make the motor 130 perform a regenerative operation, a reactive force for rotating the sun gear 121 against the load is not applied to the ring gear 122. The motor 130 can thus not carry out the regenerative operation. This phenomenon is described in detail below with the general operations of the planetary gear unit.

The rotating conditions of the respective gears included in the planetary gear unit 120 may be expressed by Equations (1) known in the field of mechanics and given below or may geometrically be specified according to a nomogram:

$$Ns=(1+\rho)/\rho \times Nc - Nr/\rho$$

$$Nc=\rho/(1+\rho)\times Ns + Nr/(1+\rho)$$

$$Nr=(1+\rho)Nc - \rho Ns$$

$$Tes=Tc \times \rho/(1+\rho)=\rho Ter$$

$$Ter=Tc/(1+\rho) \qquad (1)$$

where $\rho$ denotes the ratio of the number of teeth in the sun gear to the number of teeth in the ring gear, Ns represents the revolving speed of the sun gear, Tes represents the torque output to the sun gear, Nc represents the revolving speed of the planetary carrier, Tc represents the torque of the planetary carrier, Nr represents the revolving speed of the ring gear, and Ter represents the torque output to the ring gear.

Figure 3:
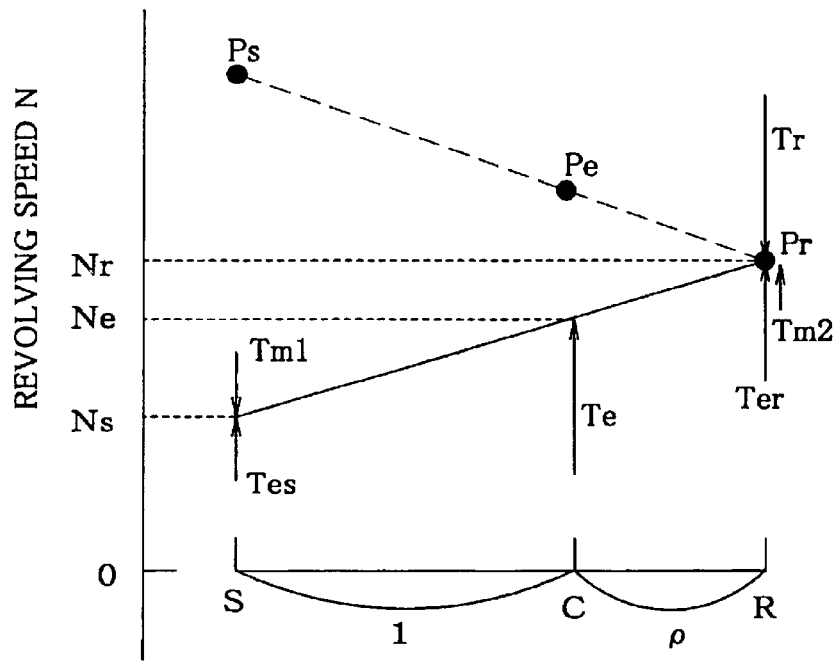
FIG. 3 shows basic operations of a planetary gear unit.

The following describes the functions of the planetary gear unit 120 based on a nomogram. FIG. 3 shows an example of the nomogram, with the revolving speeds of the respective gears as ordinate and the gear ratio of the respective gears expressed by the distance as abscissa. The position C of the planetary carrier 123 interiorly divides the position (S) of the sun gear 121 and the position (R) of the ring gear 122 at a ratio of 1 to $\rho$. Here $\rho$ represents the ratio of the number of teeth (Zs) in the sun gear 121 to the number of teeth (Zr) in the ring gear 122 as specified above. The revolving speeds Ns, Ne, and Nr of the respective gears are plotted at the positions S, C, R, thus defined. The planetary gear unit 120 is characterized by that the three plots are always aligned on a straight line. This straight line is called an operating collinear line. The settings of two points unequivocally determines the operating collinear line. Using the operating collinear line thus determines the revolving speed of a residual rotating shaft, based on the revolving speeds of two rotating shafts among three rotating shafts.

The planetary gear unit 120 is also characterized by that the operating collinear line is kept in a balanced state as a rigid body, when the torques applied to the respective rotating shafts are replaced by the forces acting on the operating collinear line. In a concrete example, it is assumed that a torque Te is applied to the planetary carrier 123. As shown in FIG. 3; a force having the magnitude corresponding to the torque Te is applied vertically upward at the position C on the operating collinear line. The applying direction of the force depends upon the direction of the torque Te. A torque Tr output from the ring gear 122 is applied vertically upward at the position R on the operating collinear line. The torque Te is divided into two equal components of the force Tes and Ter, based on the distributive law of force applied on the rigid body: Tes=$\rho$/(1+$\rho$)×Te and Ter=1/(1+$\rho$)×Te. In the state of acting these forces, a torque Tm1 to be applied on the sun gear 121 and a torque Tm2 to be applied to the ring gear 122 are determined by taking into account the condition that the operating collinear line is kept in the balanced state as the rigid body. The torque Tm1 is equal to the torque Tes, whereas the torque Tm2 is equal to the difference between the torque Tr and the torque Ter.

In the connection state D of FIG. 2 where the brake 162 is inactive, the ring gear 122 is freely rotatable. In the nomogram of FIG. 3, no torque is applied at the position R corresponding to the ring gear 122. In this state, the operating collinear line is not kept in the balanced state as a rigid body. In the connection state D of FIG. 2, the motor 130 can thus not carry out the regenerative operation. In the case where the battery 194 has a marginal state of charge, the motor 140 may work to drive the hybrid vehicle with a supply of electric power from the battery 194.

In the hybrid vehicle of the embodiment, the applicable revolving speed of the engine 150 has a restriction according to the vehicle speed, based on the characteristics of the planetary gear unit 120. For example, in the nomogram of FIG. 3, it is assumed that the ring gear 122 or the axle 116 is rotated at the specific revolving speed Nr. Namely it is assumed that the rotating state of the ring gear 122 is expressed by a point Pr in the nomogram of FIG. 3. In this state, when the revolving speed of the engine 150 is equal to Ne, the operating collinear line is expressed by the solid line in FIG. 3 as described above.

While the ring gear 122 is rotated at the point Pr, it is assumed that the revolving speed of the engine 150 rises to a point Pe. In this state, the operating collinear line is expressed by the broken line in FIG. 3. The sun gear 121 is rotated at a point Ps, which represents an extremely high revolving speed.

Figure 4:
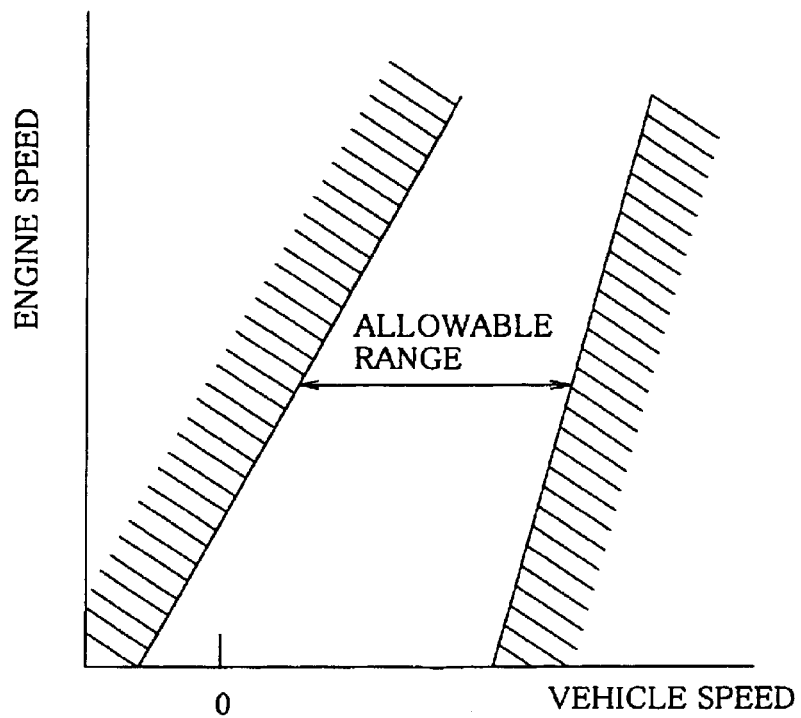
FIG. 4 shows restriction of the engine speed against the vehicle speed.

Each gear generally has an upper limit of revolving speed that is allowed without causing any damage. The point Ps may exceed the upper limit of the sun gear 121. In this case, it is required to lower the revolving speed of the engine 150 to a level below the point Pe. In the hybrid vehicle of this embodiment, the revolving speed of the engine 150 has restrictions according to the revolving speed of the ring gear 122 as shown in FIG. 4. In the case of a low revolving speed of the engine 150, there is a possibility that the sun gear 121 is reversely rotated at a high speed. Not only the upper limit but a lower limit is accordingly set for the revolving speed of the engine 150.

(2) Drive Control Process

The following described a drive control process in the hybrid vehicle of the embodiment. As described above, the hybrid vehicle of the embodiment enables selection of a drive mode between the structure of the series hybrid vehicle (hereinafter this structure is referred to as the series mode) and the structure of the parallel hybrid vehicle (hereinafter this structure is referred to as the parallel mode). The CPU in the control unit 190 (hereinafter simply referred to as the CPU) selects the drive mode according to the driving conditions of the vehicle and controls the engine 150, the motors 130 and 140, the clutch 160, and the brake 162 in the selected drive mode. The CPU periodically executes a drive control routine to attain such control.

Figure 5:
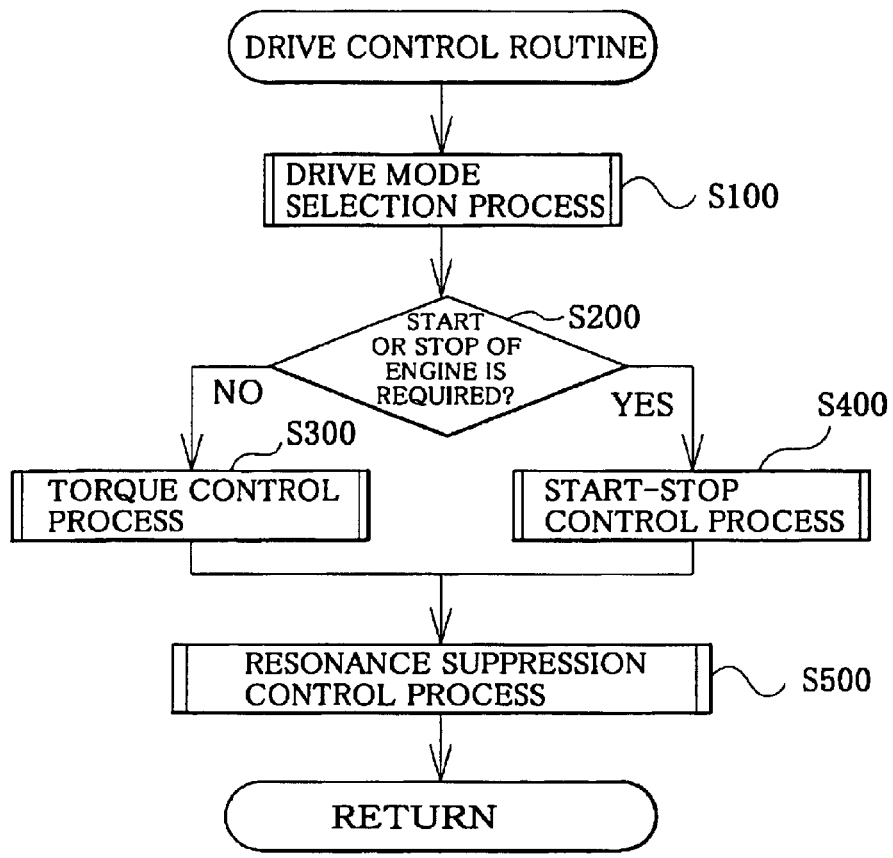
FIG. 5 is a flowchart showing a drive control routine.
Figure 6:
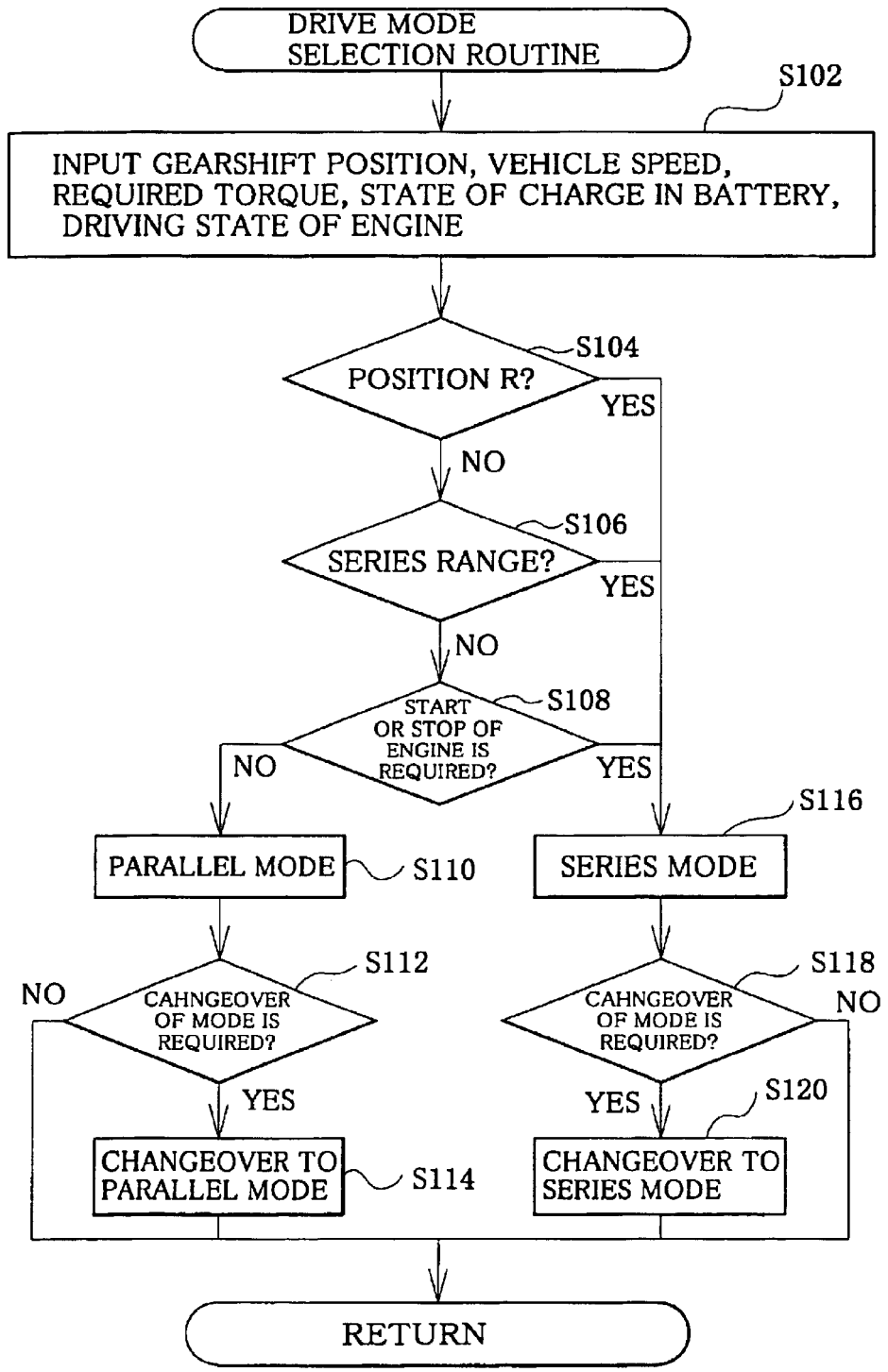
FIG. 6 is a flowchart showing a drive mode selection routine.

FIG. 5 is a flowchart showing the drive control routine. When the program enters this routine, the CPU first carries out a drive mode selection process (step S100). The details of the drive mode selection process are shown in the flowchart of FIG. 6.

In the drive mode selection routine, the CPU first reads a diversity of parameters representing the driving conditions of the vehicle (step S102). Typical examples of the parameter includes the gearshift position, the vehicle speed, the required torque, the state of charge in the battery, and the driving state of the engine. The gearshift position is detected by the gearshift position sensor 166. The vehicle speed is measured by the speed sensor 117 mounted on the axle. The required torque is calculated from the vehicle speed and the accelerator pedal position detected by the accelerator pedal position sensor 165. The state of charge in the battery is measured by a state-of-charge sensor. The driving state of the engine shows whether the engine 150 is currently driven or not and is obtained through communication with the EFIECU 170.

The CPU sets the drive mode according to preset conditions for decision, based on the input driving conditions of the vehicle. The CPU first determines whether or not the current gearshift position is at a position R or reverse position (step S104). When the current gearshift position is at the position R, the CPU selects the series mode (step S130).

When the current gearshift position is not at the position R, on the other hand, it is determined whether the driving state defined by the vehicle speed and the required torque is within a series range (step S106). The series range represents a driving area in the series mode, among all the possible combinations of torque and vehicle in the hybrid vehicle. An example of the settings in this embodiment is shown in FIG. 7.

Figure 7:
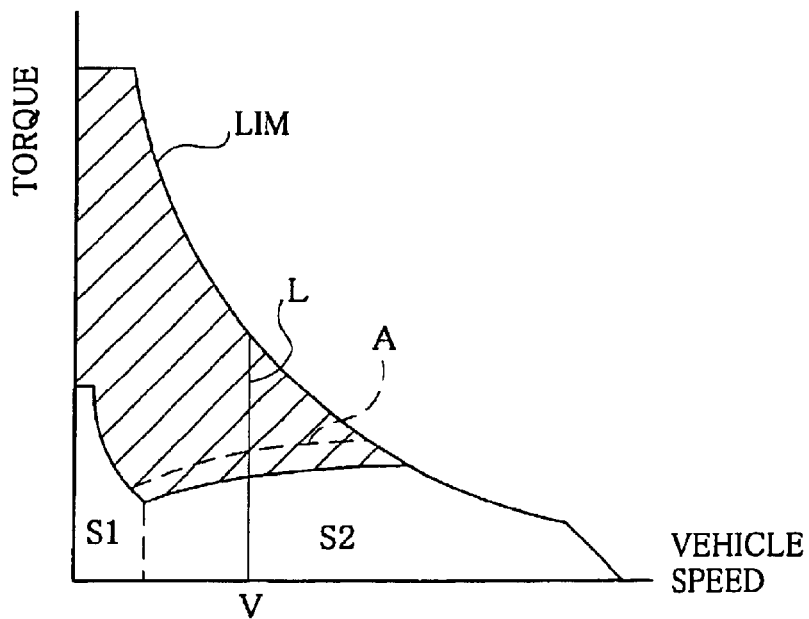
FIG. 7 shows selection of the drive mode in the driving range of the hybrid vehicle of the first embodiment.

A curve LIM in FIG. 7 shows a drivable range of the hybrid vehicle. The hatched area represents a driving area in the parallel mode, and the residual area represents a driving area in the series mode. A broken line A shows a working curve discussed below. As clearly understood from the drawing, the series mode is selected in an area of relatively low required torque and at the time of a stop of the vehicle. The parallel mode is selected in an area having the vehicle speed and the required torque of or over preset levels. In the structure of this embodiment, such settings are stored in the form of a map in the ROM of the control unit 190. The CPU refers to this map and selects the driving area of the hybrid vehicle corresponding to the input combination of the vehicle speed and the required torque at step S106. When it is determined that the driving state is in the series range, the CPU selects the series mode as the drive mode (step S130).

When it is determined that the driving state of the vehicle is out of the series range, on the other hand, the CPU determines whether or not the engine 150 should start or stop (step S120). For example, when the observed state of charge in the battery 194 is equal to or lower than a preset level in the inactive state of the engine 150, it is required to activate the engine 150 and start the power generation by the motor 130, in order to charge the battery 194. When the observed state of charge in the battery 194 is equal to or higher than a preset level in the active state of the engine 150, on the contrary, it is required to inactivate the engine 150 and stop the power generation by the motor 130, in order to prevent the battery 194 from being overcharged. The CPU determines whether or not the engine 150 should start or stop, mainly based on the observed state of charge in the battery 194 and the current driving state of the engine 150. When the driving conditions of the vehicle require a start or a stop of the engine 150, the CPU selects the series mode (step S130).

The hybrid vehicle of the engine may start or stop the engine 150 in the parallel mode. It is accordingly possible to set the drive mode without considering the driving conditions of the vehicle that require a start or a stop of the engine 150. In the parallel mode, however, the torque output from the motor 130 to start or stop the engine 150 is also transmitted to the axle 116 via the ring gear 122. This may case a torque shock. In principle, the motor 140 may be controlled to compensate for the torque shock. It is, however, substantially impossible to control the motor 140 according to the variation in torque output to the ring gear 122 at the time of starting or stopping the engine 150 and completely compensate for the torque shock. The procedure of this embodiment selects the series mode at the time of a start or a stop of the engine 150, so as to prevent the occurrence of the torque shock.

In the case when none of the conditions for decision discussed above is fulfilled, the CPU selects the parallel mode (step S122). The reason of such settings of the drive mode in this embodiment will be discussed later.

When the parallel mode is selected, the CPU determines whether or not a mode changeover is required according to the previous drive mode (step S124). When the previous drive mode is the series mode, the CPU changes over the drive mode to the parallel mode (step S126). When the previous drive mode is the parallel mode, this step is skipped.

In a similar manner, when the series mode is selected, the CPU determines whether or not a mode changeover is required according to the previous drive mode (step S132). When the previous drive mode is the parallel mode, the CPU changes over the drive mode to the series mode (step S134). When the previous drive mode is the series mode, this step is skipped.

In the configuration of this embodiment, the changeover between the parallel mode and the series mode is implemented via the connection state D shown in FIG. 2. For example, in the case of a changeover from the parallel mode (the connection state C in FIG. 2) to the series mode (the connection state B in FIG. 2), the procedure releases the clutch 160 and makes both the brake 162 and the clutch 160 inactive (the connection state D). The procedure then activates the brake 162 to attain the series mode (the connection state B). In the case of a changeover from the series mode (the connection state B) to the parallel mode (the connection state C), the procedure inactivates the brake 162 to the connection state D and couples the clutch 160 to attain the parallel mode (the connection state C).

One available process may simultaneously control the on-off position of the clutch 160 and the brake 162. There is, however, a possibility that both the clutch 160 and the brake 162 are active (the connection state A) at a moment according to the control timings. The connection state A during a drive of the vehicle may cause a significant torque shock on the axle 116. The procedure of this embodiment accordingly implements the changeover via the structure D to prevent the potential torque shock.

On conclusion of the drive mode selection process, the program returns to the drive control routine (FIG. 5). After setting the drive mode, the CPU carries out control to make a required power output from the axle 116. The details of the control procedure depend upon whether or not a start or a stop of the engine 150 is required. The CPU accordingly determines whether or not the engine 150 should start or stop (step S200). This procedure is identical with the decision at step S120 in the drive mode selection routine (FIG. 6). When it is determined that a start or a stop of the engine 150 is not required, the CPU carries out a torque control process to make the power output from the axle 116 in the general driving state (step S300). Otherwise the CPU carries out a start-stop control process to start or stop the engine 150 while ensuring output of the power from the axle 116 (step S400).

Figure 8:
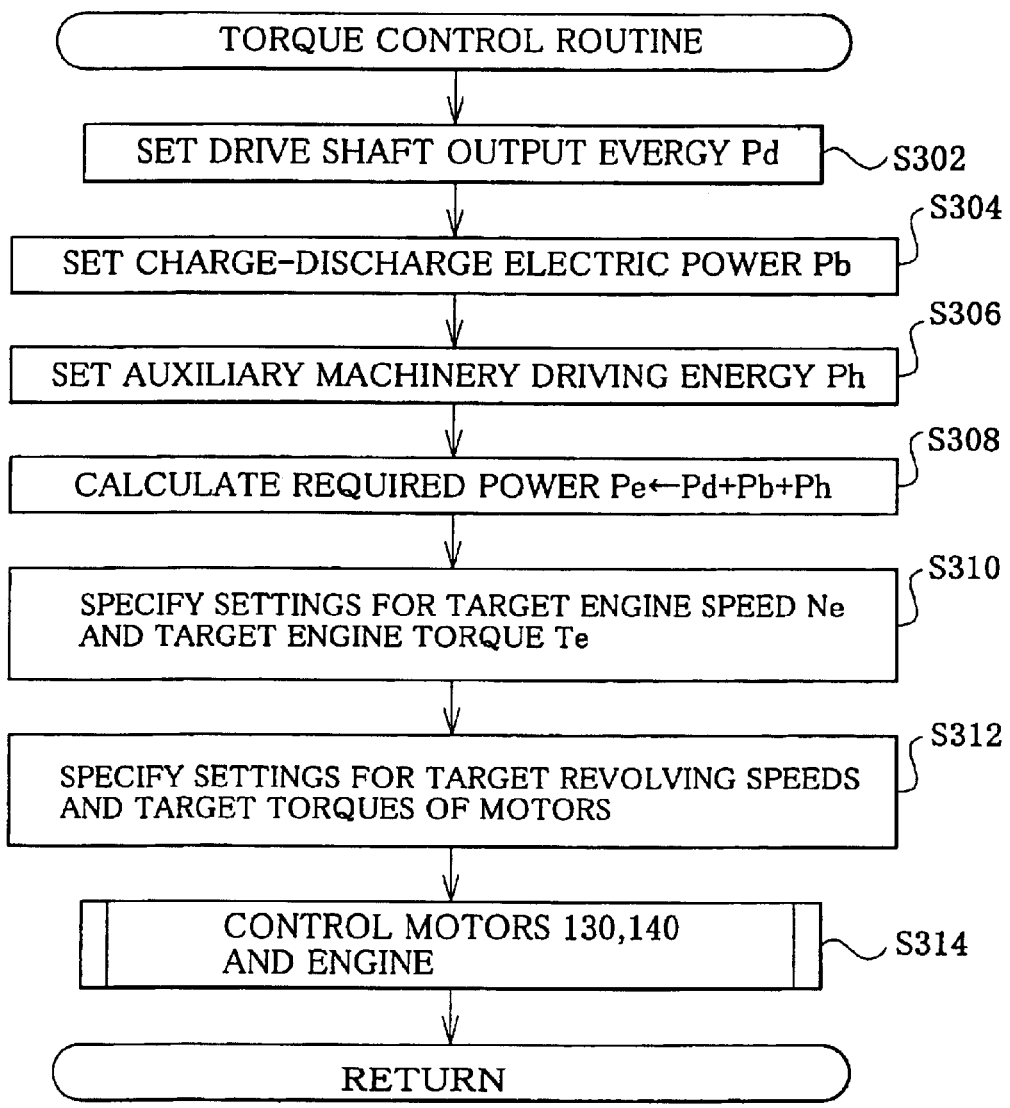
FIG. 8 is a flowchart showing a torque control routine.

The details of the torque control process are discussed below. FIG. 8 is a flowchart showing the details of the torque control routine. A similar series of processing is carried out in both the parallel mode and the series mode, although different drive modes have different settings for the drive points of the engine 150 and the motors 130 and 140 as discussed later. In one possible modification, different torque control routines may be provided corresponding to the different settings of the drive points.

When the program enters the torque control routine, the CPU first sets an energy Pd to be output from the drive shaft or the axle 116 (step S302). The setting of the energy is based on the step-on amount of the accelerator pedal detected by the accelerator pedal position sensor 165. The energy Pd to be output from the drive shaft is expressed by the product of a target revolving speed Nd* and a torque Td* of the axle 116. The procedure sets a combination of a target revolving speed Nd* and a target torque Td* of the axle 116, simultaneously with the setting of the energy Pd to be output from the drive shaft, although not specifically shown in the flowchart.

The CPU then sets a charge-discharge electric power Pb and an auxiliary machinery driving energy Ph (steps S304 and S206). The charge-discharge electric power Pb represents energy required for charging or discharging the battery 194, and takes a positive value for charging the battery 194 and a negative value for discharging the battery 194. The auxiliary machinery driving energy Ph represents electric power required for driving auxiliary machinery, such as an air conditioner. The sum of the settings of the electric power is specified as a required power Pe (step S308).

In the torque control routine, the control of the engine 150 is carried out by taking into account the energy balance per unit time. The term 'energy' in the specification hereof thus represents the energy per unit time. In this sense, the mechanical energy is synchronous with the power and the electrical energy is synchronous with the electric power in this specification. For simplicity of explanation, it is assumed that no transmission is interposed between the axle 116 and the ring gear 122. Namely the revolving speed and the torque of the axle 116 are equal to the revolving speed and the torque of the ring gear 122.

The CPU subsequently specifies the drive point of the engine 150 based on the setting of the required power Pe (step S310). Each drive point represents a combination of a target revolving speed Ne and a target torque Te of the engine 150. The drive point of the engine 150 is specified according to a predetermined map, basically with the preference given to the driving efficiency of the engine 150.

Figure 9:
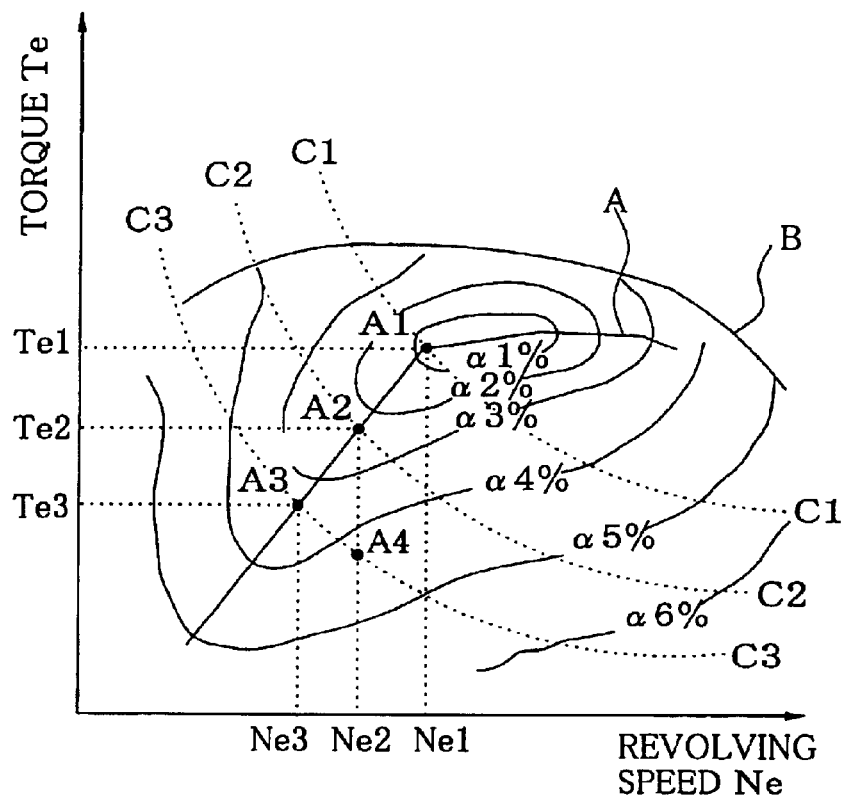
FIG. 9 shows the relationship between the drive point of the engine and the driving efficiency.

FIG. 9 shows an example of the map showing the driving state of the engine 150, with the revolving speed Ne of the engine as abscissa and the torque Te as ordinate. A curve B represents a limit of a drivable range of the engine 150. Curves a1 to a6 show drive point lines with fixed driving efficiencies of the engine 150. The driving efficiency is lowered in the order of α1 to α6. Curves C1 to C3 represent lines having fixed powers (revolving speed×torque) output from the engine 150.

As clearly seen in FIG. 9, the driving efficiency of the engine 150 is significantly varied according to the revolving speed and the torque. In the case of outputting a power on the curve C1 from the engine 150, the engine 150 driven at a drive point (a combination of the revolving speed and the torque) corresponding to a point A1 in FIG. 9 has the highest driving efficiency. In a similar manner, in the case of outputting a power on the curve C2 or a power on the curve C3, the engine 150 drive at a point A2 or at a point A3 in FIG. 9 attains the highest driving efficiency. Selection of the drive points having the highest driving efficiency corresponding to each power to be output gives a curve A shown in FIG. 9. This curve A is called the working curve. This curve A is identical with the curve A shown in FIG. 7. The working curve A may be set in advance by experiments or by analyses and stored as a map in the ROM included in the control unit 190.

The procedure of step S310 in the flowchart of FIG. 8 reads a drive point corresponding to the required power Pe from the map, so as to specify the target revolving speed Ne and the target torque Te of the engine 150. This method sets the drive point of the high driving efficiency. The procedure of setting the drive point of the engine 150 is common to the series mode and the parallel mode.

The CPU subsequently specifies settings for the target torques and the target revolving speeds of the motors 130 and 140 (step S312). The series mode and the parallel mode have different settings for these target revolving speeds and target torques.

In the series mode, the motor 140 outputs all the required power to the axle 116. A target revolving speed N2 and a target torque T2 of the motor 140 accordingly coincide with the target revolving speed Nd* and the target torque Td* of the axle 116. As described previously, the hybrid vehicle of the embodiment falls into the series mode when the current gearshift position is at the reverse position. In the series mode, the target revolving speed Nd* may correspond to the reverse direction and take a negative value. In this case, the settings of the motor 140 are coincident with the target revolving speed Nd* and the target torque Td* of the axle 116.

The drive point of the motor 130 is set to make the driving state of the engine 150 satisfy the target revolving speed Ne and the target torque Te specified at step S310. The procedure substitutes a value '0' into the revolving speed Nr of the ring gear 122 and the target revolving speed Ne and the target torque Te of the engine 150 into the revolving speed Nc and the torque Tc of the planetary carrier 123 in Equations (1) given above, and calculates the revolving speed Ns and the torque Ts of the sun gear 121. This specifies the settings of a target revolving speed N1 and a torque T1 of the motor 130 as follows:

$$N1=(1+\rho)/\rho \times Ne$$

$$T1=Tc\times\rho/(1+\rho)$$

In the parallel mode, the target revolving speeds of the motors 130 and 140 are set to make the revolving speed Nr of the ring gear 122 coincident with the target revolving speed Nd* of the axle 116. The motor 140 rotates at the same revolving speed as that of the axle 116. The target revolving speed Ne of the motor 140 accordingly coincides with the target revolving speed Nd* of the axle 116. The setting of the target revolving speed N1 of the motor 130 is specified as follows by substituting the target revolving speed Nd* of the axle 116 into the revolving speed Nr of the ring gear 122 and the target revolving speed Ne of the engine 150 into the revolving speed Nc of the planetary carrier 123 in Equations (1) given above:

$$N1=(1+\rho)/\rho \times Ne-Nd^*/\rho$$

The target torques T1 and T2 of the motors 130 and 140 are set to make the torque output to the axle 116 coincident with the required torque Td*. According to Equations (1) given above, when the torque Te is output from the engine 150, the torque Tr of the ring gear 122 and the torque Ts of the sun gear 121 are specified as follows:

$$Ts=Te\times\rho/(1+\rho)$$

$$Tr=Te/(1+\rho)$$

The setting of the target torque T1 of the motor 130 is determined to apply a load corresponding to the torque Ts of the sun gear 121, so as to enable the engine 150 to be driven at the target drive point Te. The concrete setting is T1=·Ts. The setting of the target torque T2 of the motor 140 is determined to compensate for the torque transmitted from the engine 150 to the ring gear 122 and attain the required torque Td*. The concrete setting is Ts=Td*·Tr.

The above series of the processing specifies the settings for the drive points of the motors 130 and 140. The hybrid vehicle of this embodiment may be driven in each drive mode while the engine 150 is at a stop. In such cases, the drive points of the motors 130 and 140 are specified by setting the value '0' to the revolving speed Ne and the torque Te of the engine 150.

The CPU actually controls the operations of the motors 130 and 140 and the engine 150, based on the settings of the target torques and target revolving speeds (step S314). A known series of processing to control the synchronous motor may be applied for the procedure of controlling the operations of the motors. This embodiment adopts the proportional integral control. The concrete procedure measures the current revolving speed of each motor and sets the target voltages to be applied to the respective phases, based on a deviation of the observed revolving speed from the target revolving speed. The proportional term, the integral term, and the cumulative term of the deviation specify the voltage values to be applied. Adequate values determined, for example, experimentally are set for proportional coefficients of the respective terms. The settings of the voltages are converted into duty ratios of the switching in the driving circuits 191 and 192 constructed as the transistor inverters and are applied to the respective motors through the PWM control.

The CPU regulates the switching of the driving circuits 191 and 192 and thereby directly controls the operations of the motors 130 and 140 as described above. The EFIECU 170 is actually in charge of controlling the operations of the engine 150. The CPU in the control unit 190 transmits information representing the drive point of the engine 150 to the EFIECU 170 and thus indirectly controls the operations of the engine 150. The hybrid vehicle of this embodiment is thus driven while causing the power defined by the required revolving speed and torque to be output from the axle 116 in the general driving state.

Figure 10:
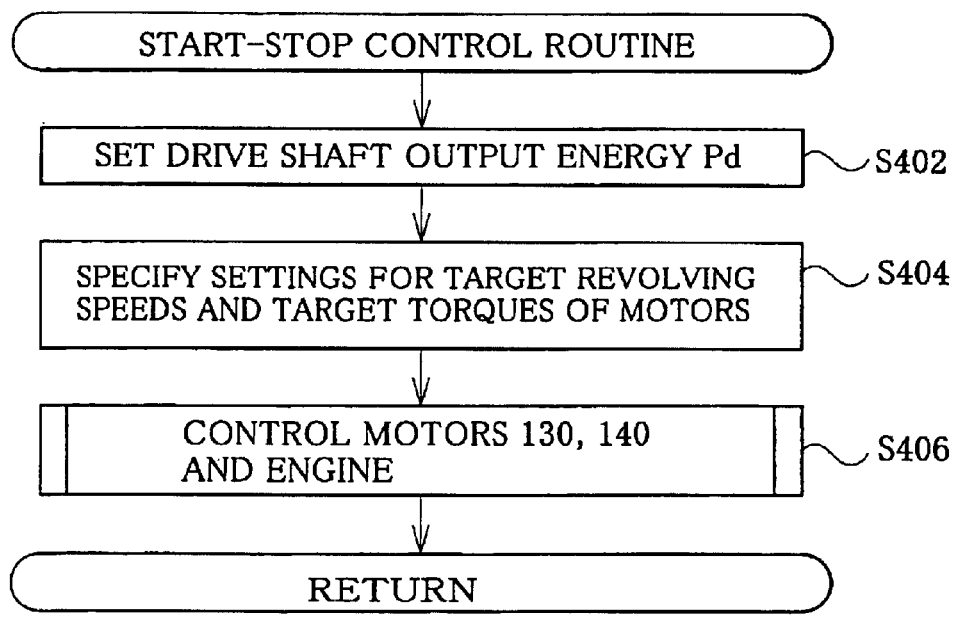
FIG. 10 is a flowchart showing a start-stop control routine.

The following describes the details of the engine start-stop control process executed at step S400 in the flowchart of FIG. 5. FIG. 10 is a flowchart showing the details of the start-stop control routine. When the program enters this routine, the CPU first sets the output energy Pd from the axle 116 (step S402). The setting of the output energy Pd follows the procedure discussed at steps S302 to S308 in the torque control routine (FIG. 8).

The CPU subsequently specifies the drive points of the motors 130 and 140 based on the setting of the drive shaft output energy Pd (step S404). As described previously in the drive mode selection routine (FIG. 6), the hybrid vehicle of this embodiment selects the series mode at the time of a start or a stop of the engine 150. The target revolving speed N2 and the target torque T2 of the motor 140 are accordingly coincident with the target revolving speed Nd* and the target torque Td* of the axle 116.

The target revolving speed N1 and the target torque T1 of the motor 130 are set to attain the drive point for starting or stopping the engine 150. At the time of starting the engine 150, the procedure sets the target torque T1 of the motor 130 to cause a torque required for motoring the engine 150 to be output to the planetary carrier 123. The procedure sets the target revolving speed N1 of the motor 130 to raise the revolving speed of the engine 150 according to a preset sequence for starting. At the time of stopping the engine 150, on the other hand, the procedure sets the target torque of the motor 130 to cause a torque required for braking the rotation of the engine 150 to be output to the planetary carrier 123. The procedure sets the target revolving speed N1 of the motor 130 to lower the revolving speed of the engine 150 according to a preset sequence for stopping. The settings of the target revolving speed and the target torque of the motor 130 may be specified by substituting the revolving speed and the torque for motoring into the revolving speed Nc and the torque Tc of the planetary carrier in Equations (1) given above.

According to the details of the drive mode selection process (FIG. 6), the settings of the drive points may allow a start or a stop of the engine 150 in the parallel mode. In such cases, a specific revolving speed set as the sequence for starting or stopping the engine 150 may be set to the target revolving speed Ne of the engine 150. The value obtained by adding a minus sign to the torque to be output to the planetary carrier at the time of a start or a stop of the engine 150 may be set to the target torque Te of the engine 150. The drive points of the motors 130 and 140 can thus be specified by the same procedure as that for setting the drive points of the motors 130 and 140 in the parallel mode described above.

The above series of the processing specifies the settings of the drive points at the time of a start or a stop of the engine 150. The CPU actually controls the operations of the motors 130 and 140 and the engine 150, based on such settings (step S406). The control of the motors 130 and 140 follows the method discussed in the torque control routine. As in the case of the torque control routine, the CPU in the control unit 190 indirectly controls the operations of the engine 150 through communication with the EFIECU 170. There is, however, a difference in details of the control of the engine 150 executed by the EFIECU 170. For example, at the time of starting the engine 150, the control procedure injects and ignites the fuel when the revolving speed of the engine 150 is raised to a preset level by motoring. At the time of stopping the engine 150, the control procedure prohibits the fuel injection in the engine 150. The hybrid vehicle of this embodiment is thus driven with starting or stopping the engine 150, while causing the power defined by the required revolving speed and torque to be output from the axle 116.

After conclusion of either the torque control process or the start-stop control process, the CPU returns to the drive control routine (FIG. 5) and subsequently carries out a resonance suppression control process (step S500).

Figure 11:
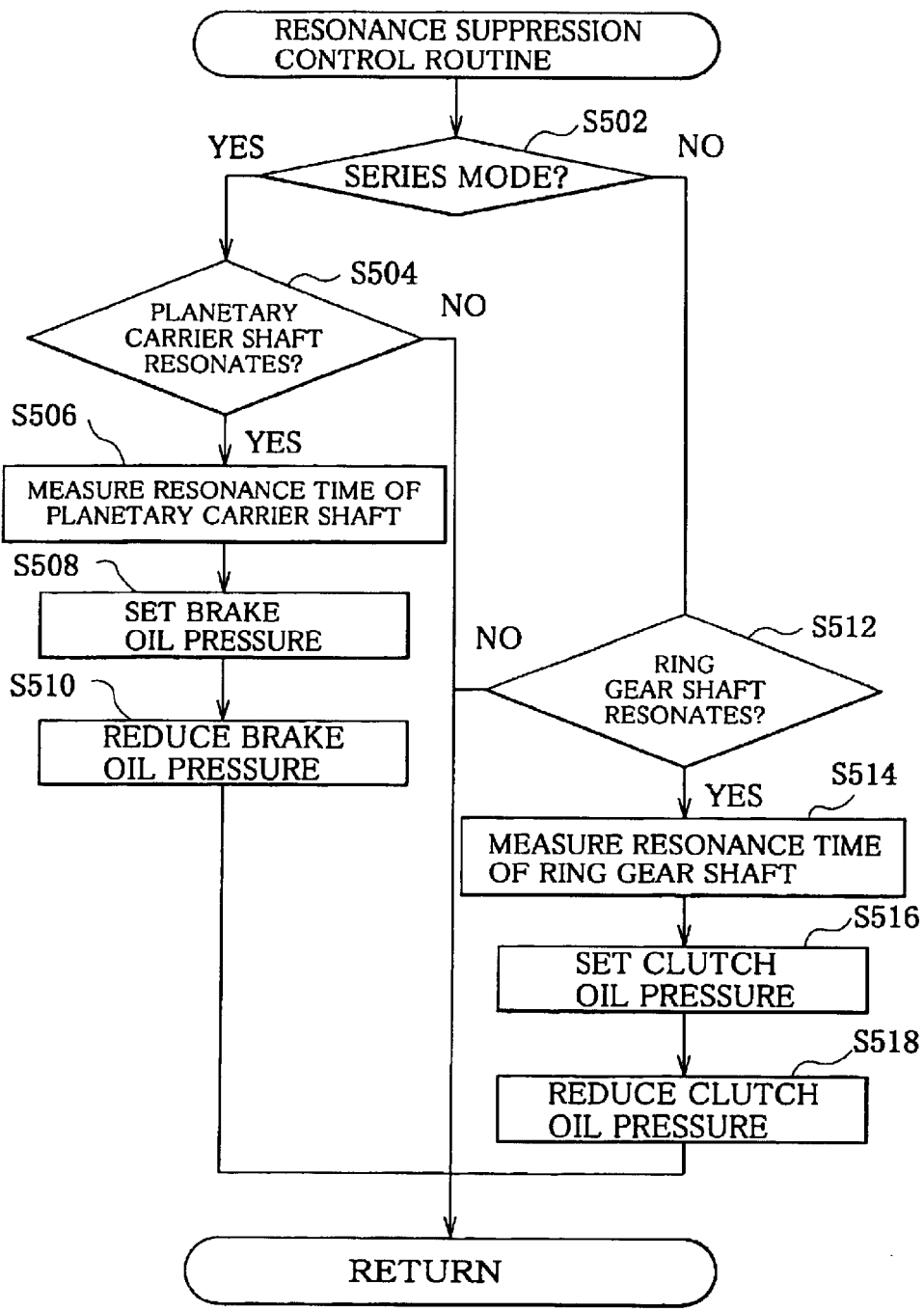
FIG. 11 is a flowchart showing a resonance suppression control routine.

FIG. 11 is a flowchart showing the details of the resonance suppression control routine. This control process suppresses the torsional resonance occurring at a rotating shaft of the planetary gear unit 120. Since the resonance tends to occur at different rotating shafts in different drive modes, the series of the processing is varied according to the drive mode.

When the program enters this routine, the CPU first determines whether or not the current drive mode is the series mode (step S502). This is because the series of the processing is varied according to the drive mode.

In the case of the series mode, the CPU subsequently determines whether or not a rotating shaft connecting with the planetary carrier 123 (hereinafter referred to as the planetary carrier shaft) resonates (step S504). The concrete procedure measures the revolving speed of the planetary carrier shaft with the speed sensor 119 and processes the observed value through a band-pass filter, so as to determine whether or not the revolving speed is within a resonance zone. The resonance of the planetary carrier shaft tends to occur at the time of starting or stopping the engine 150.

When it is determined that the planetary carrier shaft does not resonate, no further processing is required to suppress the resonance. The program thus immediately exits from the resonance suppression control routine. When it is determined that the planetary carrier shaft resonates, on the other hand, the CPU measures a resonance time (step S506). Here the resonance time represents a time period elapsing after the revolving speed of the planetary carrier shaft enters the resonance zone.

The CPU then sets the oil pressure of the brake 162 corresponding to the observed resonance time (step S508). In this embodiment, the relationship between the resonance time and the oil pressure of the brake 162 is specified in advance and stored in the ROM of the control unit 190. The CPU refers to the table and specifies the setting of the oil pressure of the brake 162 at step S508.

Figure 12:
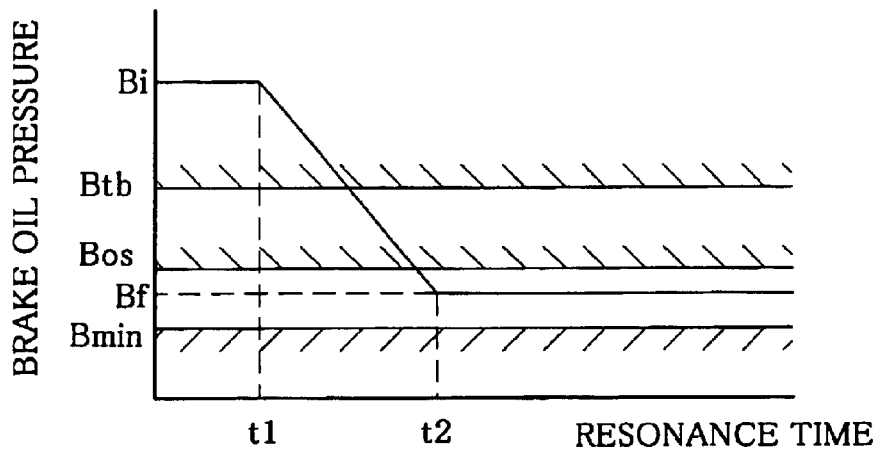
FIG. 12 shows settings of brake oil pressure.

FIG. 12 shows an example of the setting of the brake oil pressure in this embodiment. The setting varies the brake oil pressure from an initial value Bi to a final value Bf with an elapse of the resonance time. The procedure of the embodiment maintains the initial value Bi until the resonance time reaches a time point t1, and gradually reduces the brake oil pressure to the final value Bf at a time point t2.

In the series mode, the brake oil pressure is proportional to the torque that restricts the rotation of the ring gear 122. Reduction of the brake oil pressure lowers the torque restricting the ring gear 122 and allows the rotation of the ring gear 122. As clearly understood from Equations (1) given above, this reduces the torque output from the motor 130 to the planetary carrier shaft. The resonance of the planetary carrier shaft is caused by elastic vibrations that are ascribed to an excessively large torque output from the motor 130 relative to the force of inertia of the engine 150. The reduced torque from the motor 130 thus suppresses the resonance.

From this point of view, the procedure of this embodiment reduces the brake oil pressure to a certain level that ensures suppression of the resonance of the planetary carrier shaft. The final value Bf is set to satisfy the following conditions. The first condition is that the final value Bf does not exceed a specific brake oil pressure Btb, which enables output of the maximum torque that makes the planetary carrier shaft broken by the torsional resonance, that is, the torque corresponding to the torsional strength of the planetary carrier shaft. In the example of FIG. 12, the initial value Bi exceeds this specific brake oil pressure Btb. Such setting is based on the fact that the planetary carrier shaft is not broken by the torsion at an instant when the resonance occurs. Another value of not greater than the specific brake oil pressure Btb may, however, be set to the initial value Bi.

The second condition is that the final value Bf does not exceed a limit value Bos, which causes no vibrations of the vehicle. When the resonance occurs at the planetary carrier shaft, vibrations are generated on the whole vehicle since the power system is fixed to the vehicle. Such vibrations are reduced with a decrease in resonance. The limit value Bos is set in advance, for example, experimentally and represents an upper limit brake oil pressure that relieves the vibrations of the vehicle to a driver's or passengers' allowable level.

The third condition is that the final value Bf is greater than a lower limit value Bmin, which enables a torque required for motoring or stopping the engine 150 to be output to the planetary carrier shaft. The resonance of the planetary carrier shaft occurs at the time of starting or stopping the engine 150. The setting of the final value Bf of the brake oil pressure to be not lower than this lower limit value Bmin enables the processing for starting or stopping the engine 150 to be continued even in the course of the resonance suppression control. The torque required for starting or stopping the engine 150 is relatively low. The setting of the final value Bf accordingly does not cause break of the planetary carrier shaft nor the extreme vibrations of the vehicle. After setting the oil pressure of the brake 162 according to the map of FIG. 12, the CPU reduces the oil pressure of the brake 162 to the preset value (step S510).

In the example of FIG. 12, the oil pressure of the brake 162 is decreased linearly in a time period between t1 and t2. Another applicable setting may vary the brake oil pressure in a non-linear manner. The setting is not restricted to the monotonous decrease. Still another applicable setting may significantly decrease the brake oil pressure before keeping a slightly increased level.

When it is determined at step S502 that the current drive mode is the parallel mode, on the other hand, the CPU determines whether or not a rotating shaft connecting with the ring gear 122 (hereinafter referred to as the ring gear shaft) resonates (step S512). As in the case of the planetary carrier shaft (step S504), the concrete procedure measures the revolving speed of the ring gear shaft with the speed sensor 118 and processes the observed value through a band-pass filter for the determination of the resonance. The resonance of the ring gear shaft tends to occur at the time of jack rabbit start or abrupt braking.

When it is determined that the ring gear shaft does not resonate, no further processing is required to suppress the resonance. The program thus immediately exits from the resonance suppression control routine. When it is determined that the ring gear shaft resonates, on the other hand, the CPU measures a resonance time (step S514). Here the resonance time represents a time period elapsing after the revolving speed of the ring gear shaft enters the resonance zone.

The CPU then sets the oil pressure of the clutch 160 corresponding to the observed resonance time (step S516). In this embodiment, the relationship between the resonance time and the oil pressure of the clutch 160 is specified in advance and stored in the ROM of the control unit 190. The CPU refers to the table and specifies the setting of the oil pressure of the clutch 160 at step S516.

Figure 13:
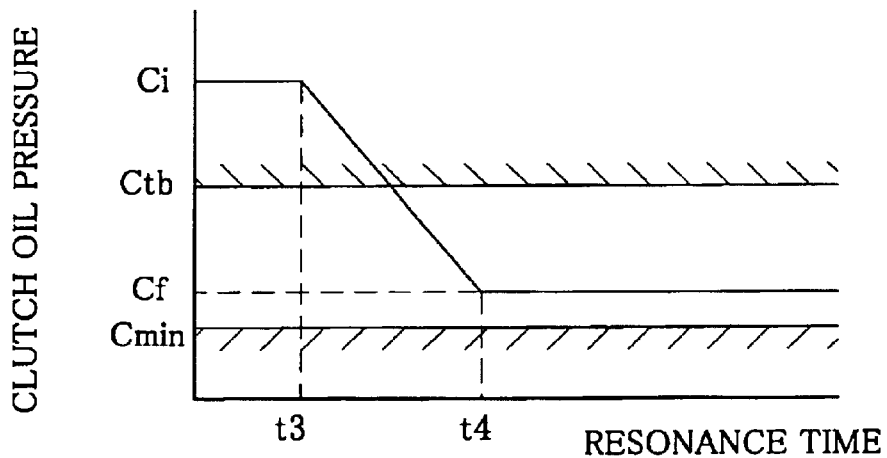
FIG. 13 shows settings of clutch oil pressure

FIG. 13 shows an example of the setting of the clutch oil pressure in this embodiment. The setting varies the clutch oil pressure from an initial value Ci to a final value Cf with an elapse of the resonance time. The procedure of the embodiment maintains the initial value Ci until the resonance time reaches a time point t3, and gradually reduces the clutch oil pressure to the final value Cf at a time point t4.

Reduction of the clutch oil pressure lowers the torque applied to the ring gear shaft. The resonance of the ring gear shaft is caused by elastic vibrations that are ascribed to an excessively large torque transmitted from the axle 116 to the ring gear shaft relative to the force of inertia of the engine 150 and the motor 130. The reduced torque transmitted from the axle 116 thus suppresses the resonance of the ring gear shaft.

From this point of view, the procedure of this embodiment reduces the clutch oil pressure to a certain level that ensures suppression of the resonance of the ring gear shaft. As in the case of the brake oil pressure, the final value Cf is set to be not greater than a specific clutch oil pressure Ctb, which enables transmission of the maximum torque that makes the ring gear shaft broken by the torsional resonance, that is, the torque corresponding to the torsional strength of the ring gear shaft. The final value Cf is also set to be not less than another specific clutch oil pressure Cmin, which enables transmission of the torque that allows regenerative braking by the motor 130. In the course of braking the vehicle, the motor 140 can carry out the regenerative operation to recover the kinetic energy of the vehicle in the form of electric power. Setting the clutch oil pressure to be not less than Cmin allows the regenerative braking by the motor 130. This enhances the efficiency of recovery of the kinetic energy. After setting the oil pressure of the clutch 160 according to the map of FIG. 13, the CPU reduces the oil pressure of the clutch 160 to the preset value (step S510).

The resonance of the ring gear shaft occurs at the time of jack rabbit start or abrupt braking. Unlike the setting of the brake oil pressure, the setting of FIG. 13 does not take into account an upper limit value that causes no vibrations of the vehicle. The setting may, however, take into account the upper limit value.

In this embodiment, the series mode is selected at the time of starting or stopping the engine 150. The control of suppressing the resonance of the planetary carrier shaft is accordingly not carried out in the parallel mode. In the alternative arrangement that allows a start or a stop of the engine 150 in the parallel mode, the series of processing at steps S504 to S510 may also be carried out in the parallel mode.

By periodically executing the series of processing discussed above, the hybrid vehicle of the embodiment can be driven while converting the power output from the engine 150 into a desired combination of revolving speed and torque and causing the desired power to be output from the drive shaft. The above processing also controls a start or a stop of the engine, and suppresses the resonance occurring at the planetary carrier shaft or the ring gear shaft.

The following describes the method of specifying the relationship between the driving state of the vehicle and the drive mode (FIG. 7). In this embodiment, an area of relatively low vehicle speed and low torque including at a stop of the vehicle (area S1 in FIG. 7) and a reverse area are assigned to the series mode. An area of high vehicle speed but relatively low torque (area S2 in FIG. 7) is also allocated to the series mode.

The hybrid vehicle generally uses the power of the motor for a gentle start. This desirably prevents the engine 150 from being driven under the condition of poor fuel consumption and ensures a smooth start of the vehicle. The hybrid vehicle of this embodiment also uses only the power of the motor for a start by taking advantage of these merits. In the case of utilizing only the power of the motor, the connection state corresponding to the series mode is more easily controllable. In this embodiment, from this point of view, the driving area with only the power of the motor, that is, the area S1 in FIG.7, is allocated to the series mode. The range of this area may be determined, for example, according to the magnitude of the torque possibly output from the motor 140.

Allocation of the area S1 and the reverse area to the series mode gives several advantages discussed below to the hybrid vehicle of the embodiment. The first advantage is found at the time of starting or stopping the engine 150. As the hybrid vehicle starts and accelerates, the engine 150 starts its operation to allow the hybrid vehicle to utilize the power of the engine 150 for further driving. As described previously, the procedure of this embodiment selects the series mode at the time of starting the engine 150, in order to prevent a possible torque shock. Setting the area S1 to include a transient area from the driving area with the power of the motor 140 to the driving area with the power of the engine 150 ensures a start of the engine 150 without changing over the drive mode. This advantage is also found at the time of stopping the operation of the engine 150.

The second advantage is found at the time of starting or stopping the engine 150 while the vehicle is at a stop. While the hybrid vehicle of the embodiment is at a stop, the engine 150 starts or stops its operation according to the state of charge in the battery 194. The engine 150 may be driven to cause the motor 130 to carry out power generation and charge the battery 194 in both the series mode and the parallel mode. In the parallel mode, however, it is practically impossible to completely compensate for the torque output to the axle 116 at the time of starting or stopping the engine 150. There is accordingly a possibility of torque shock. The driver and passengers sensitively notice the torque shock while the vehicle is at a stop or is driven at a very low speed. The procedure of this embodiment specifies the setting of the area S1 to select the series mode while the vehicle is at a stop or is driven at a very low speed. This arrangement effectively prevents a possible torque shock and improves the ride of the hybrid vehicle.

Figure 14:
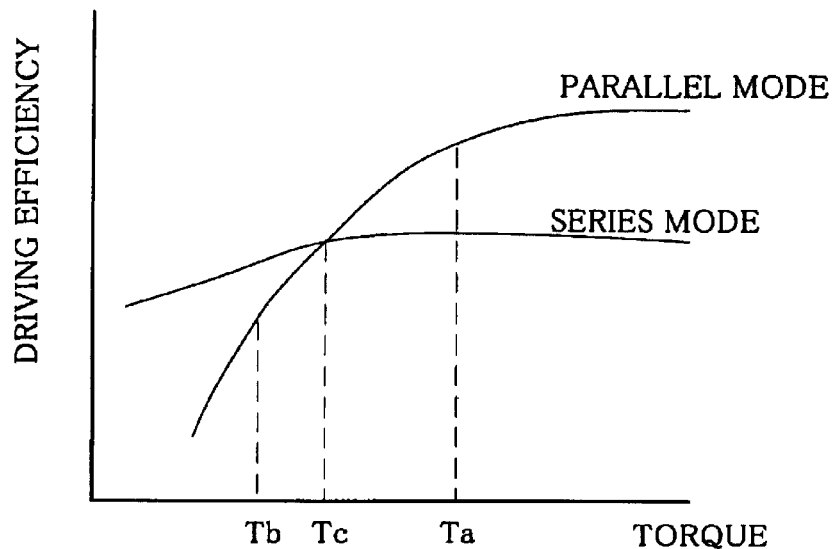
FIG. 14 shows the relationship between the drive mode and the driving efficiency.

The following describes the reason why the area of high vehicle speed but relatively low torque (the area S2 in FIG. 7) is allocated to the series mode. The setting of this area is based on the driving efficiency in the series mode and in the parallel mode. FIG. 14 shows the driving efficiency in the two different drive modes. The graph shows a variation in driving efficiency with a variation in required torque at a specific vehicle speed V in FIG. 7, that is, a variation in driving efficiency along a straight line L in FIG. 7.

Figure 35:
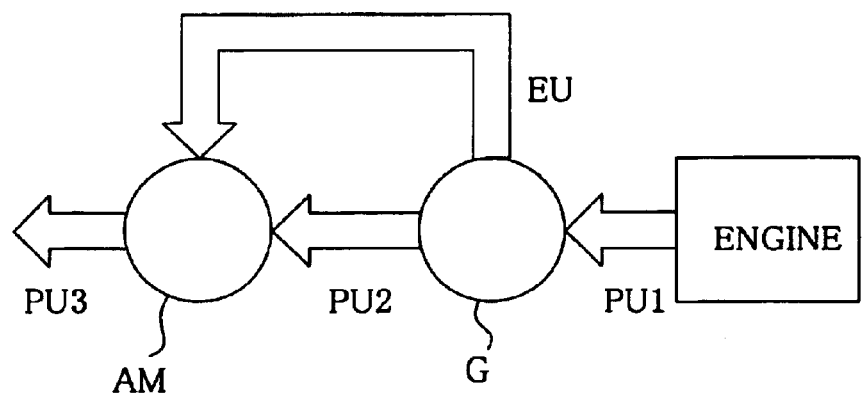
FIG. 35 shows a process of power transmission in the underdrive condition in the prior art hybrid vehicle in the state of connecting the assist motor with the axle.
Figure 36:
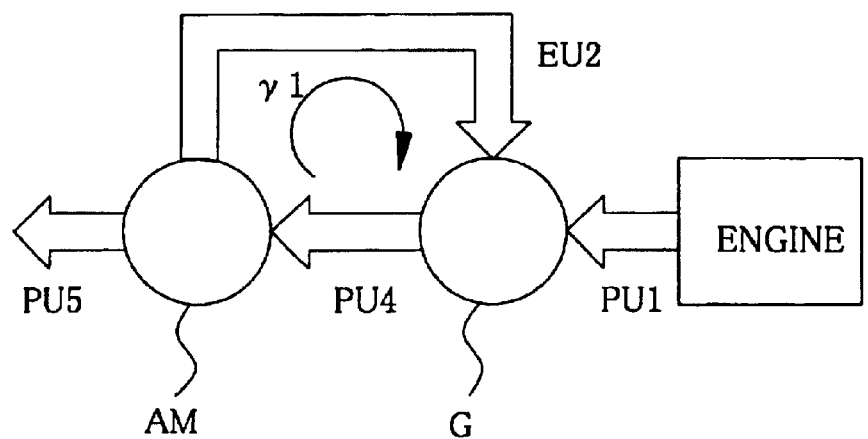
FIG. 36 shows a process of power transmission in the overdrive condition in the prior art hybrid vehicle in the state of connecting the assist motor with the axle.

As discussed previously with FIGS. 34 to 36, in the parallel mode, the driving efficiency is high in the underdrive condition and is lowered, due to circulation of power, in the overdrive condition. In the underdrive condition, the vehicle is driven while converting the power output from the engine 150 into a combination of reduced revolving speed and enhanced torque. In the overdrive condition, on the other hand, the vehicle is driven while converting the power output from the engine 150 into a combination of enhanced revolving speed and reduced torque. In the parallel mode, the driving efficiency is higher in an area of relatively high required torque and is lower in an area of or below a torque Ta that starts circulation of power as shown in FIG. 14.

Figure 15:
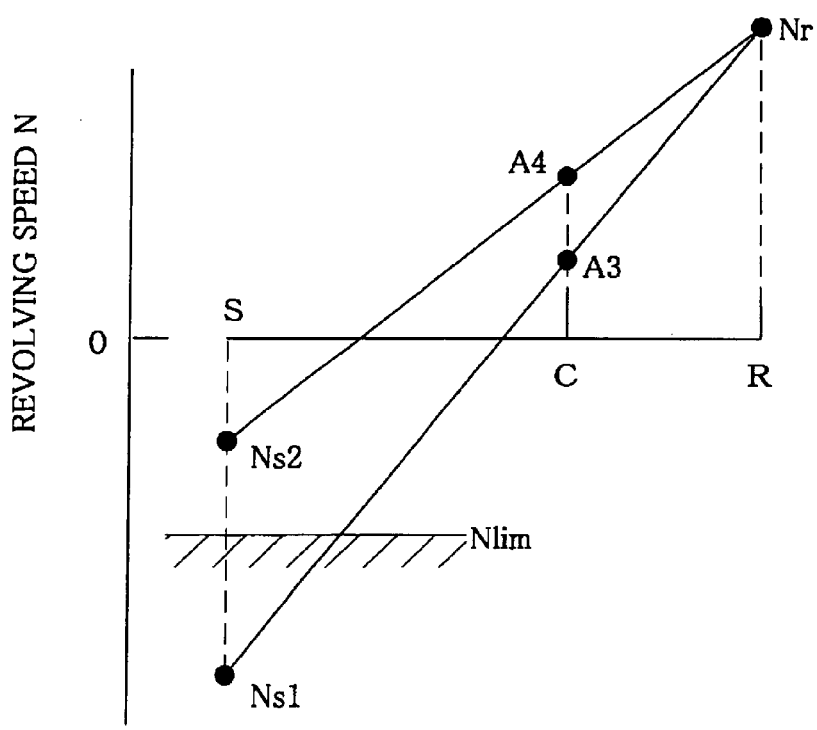
FIG. 15 is a nomogram applied at the time of high-speed drive.

In the parallel mode, the restriction of the revolving speed (see FIG. 4) may further lower the driving efficiency. FIG. 15 shows a nomogram in the overdrive condition. In this example, the vehicle speed or the revolving speed of the ring gear 122 corresponds to a point Nr in FIG. 15. It is here assumed that a point A3 on the working curve A in FIG. 7 is set to the revolving speed of the engine 150 under the condition of a relatively low required torque. Based on the function of the planetary gear unit 120 described previously, the revolving speed of the sun gear 121 is equal to a value corresponding to a point Ns1 in FIG. 15. The sun gear 121 is thus rotated in the reverse direction at an extremely high speed. As mentioned previously, the planetary gear unit 120 has the mechanical restriction of the revolving speed. In the state of rotation shown in FIG. 15, the revolving speed of the sun gear 121 may exceed a limit value Nlim.

In the hybrid vehicle of this embodiment, due to the restriction on the revolving speed of the planetary gear unit 120, the engine 150 may not be driven at any drive point on the working curve A. In the above example, in order to restrict the revolving speed of the sun gear 121 to the limit value Nlim, it is required to raise the revolving speed of the engine 150, for example, to a point A4. Namely the engine 150 should be driven at the point A4 shown in FIG. 7. Driving the engine 150 at a drive point apart from the working curve A lowers the driving efficiency. Because of this reason, the driving efficiency in the parallel mode is further lowered in an area of or below a required torque Tb as shown in FIG. 14.

In the series mode, on the other hand, there is no decrease in driving efficiency, due to the circulation of power or the restriction on the revolving speed of the planetary gear unit 120. The series mode thus gives a relatively stable curve of driving efficiency, irrespective of the variation in required torque as shown in FIG. 14. In the series mode, however, there is a greater loss in the process of conversion of all the power output from the engine 150 into electric power. The maximum driving efficiency in the series mode is accordingly lower than that in the parallel mode.

The procedure of this embodiment selects the drive mode of the higher driving efficiency between the parallel mode and the series mode, based on the predetermined settings of the driving efficiency in the parallel mode and in the series mode according to the relationship between the required torque and the vehicle speed. In the example of FIG. 14, the hybrid vehicle of this embodiment selects the parallel mode in an area of or over a required torque Tc, while selecting the series mode in a residual area below the required torque Tc. In the map of FIG. 7, the area of lower required torque than the working curve A is allocated to the series mode, but this relationship is not absolute. A certain hysteresis is naturally set to prevent undesirably frequent changeovers between the parallel mode and the series mode.

The hybrid vehicle of this embodiment discussed above selectively uses the parallel mode and the series mode according to the driving state of the vehicle, thus ensuring an efficient drive that takes advantage of the characteristics of these two drive modes. This arrangement enhances the driving efficiency of the hybrid vehicle and improves the ride.

These advantages are discussed more in detail. As described previously with FIGS. 14 and 7, the hybrid vehicle of this embodiment selects the drive mode of the higher driving efficiency between the parallel mode and the series mode according to the vehicle speed and the required torque. Compared with the prior art hybrid vehicle having the fixed structure corresponding to either the parallel mode or the series mode, the hybrid vehicle of the embodiment has the enhanced driving efficiency, regardless of the driving state of the vehicle.

As described previously in the drive mode selection process of FIG. 6, the hybrid vehicle of the embodiment selects the series mode at the time of starting or stopping the engine 150. This arrangement starts or stops the engine 150 with substantially no torque shock, thus significantly improving the ride.

As shown in FIG. 7, the hybrid vehicle of the embodiment selects the series mode while the vehicle is at a stop or is driven at a very low speed. This arrangement effectively prevents a possible torque shock at the time of starting or stopping the engine 150 in this driving state, and enables a shift from the driving state with only the power of the motor 140 to the driving state with the power of the motor 150 without changing over the drive mode. The hybrid vehicle of this embodiment thus ensures a smooth shift of the driving state.

As described previously in the drive mode selection process (FIG. 6), the hybrid vehicle of the embodiment selects the series mode for a reverse drive. When the hybrid vehicle goes back in the active state of the engine 150, there is no necessity of compensating for the torque output from the engine 150, and a sufficient torque in the reverse direction can be output from the motor 140. This arrangement readily controls the motor 140 regardless of the driving conditions of the engine 150, thus ensuring a smooth reverse drive. Another advantage is to facilitate the whole control procedure and thus relieve the loading to the control unit 190.

The hybrid vehicle of the embodiment controls the oil pressures of the clutch 160 and the brake 162 and thereby suppresses the resonance occurring at the rotating shafts of the planetary gear 120. This arrangement effectively prevents potential vibrations of the vehicle due to such resonance and thus significantly improves the ride. This arrangement also prevents untimely abrasion or damage of the planetary gear unit 120 and extends the life of the planetary gear unit 120.

The hybrid vehicle of the embodiment exerts the diversity of effects mentioned above, but the control procedures discussed in the embodiment are only illustrative. For example, the relationship between the driving state of the vehicle and the drive mode is not restricted to the setting shown in FIG. 7, but may be modified adequately. One possible modification selects the parallel mode while the hybrid vehicle is at a stop, is driven at a very low speed, or goes back. This modified procedure may change over the drive mode to the series mode and start the engine 150 when it is determined that the battery 194 requires charging based on the observed state of charge in the battery 194.

The above embodiment utilizes the planetary gear unit 120 and the motor 130 for the mechanism of distributing the output power of the engine 150 into mechanical power and electric power. There are a diversity of other structures applicable for the power distribution mechanism.

Figure 16:
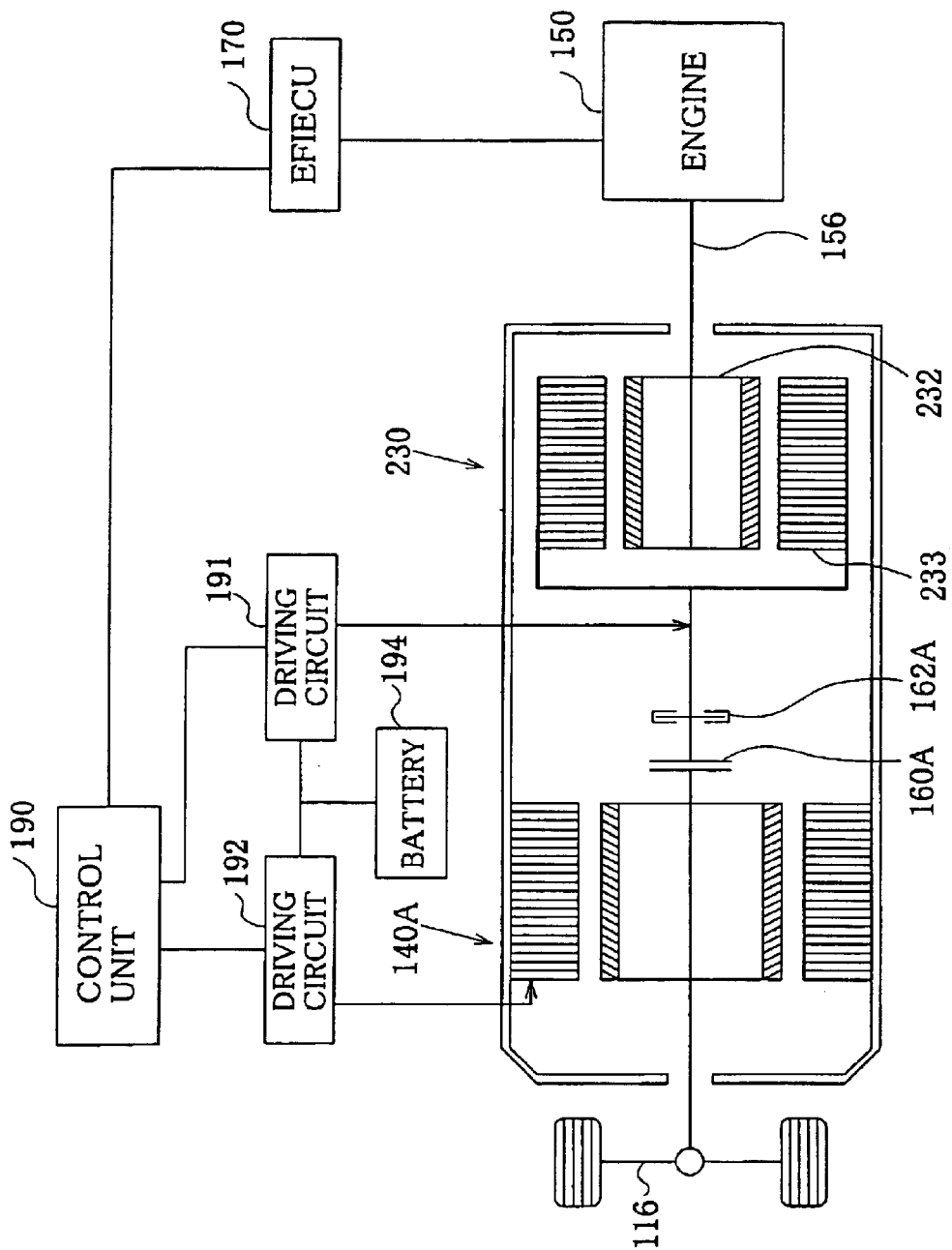
FIG. 16 schematically illustrates the structure of a hybrid vehicle in a modified example of the first embodiment.

FIG. 16 schematically illustrates the structure of a hybrid vehicle in a modified example of the first embodiment. In the hybrid vehicle of the modified example, the power system includes the engine 150, a clutch motor 230, and a motor 140A. The clutch motor 230 is a pair-rotor motor where an inner rotor 232 and an outer rotor 233 are relatively rotatable to each other around a coax. The inner rotor 232 of the clutch motor 230 is linked with the crankshaft 156 of the engine 150, whereas the outer rotor 233 is linked with the axle 116. Like the structure of the first embodiment (FIG. 1), the motor 140A is connected to the axle 116.

The clutch motor 230 is a synchronous motor generator of the pair-rotor type and includes the inner rotor 232 with a plurality of permanent magnets attached to the outer circumferential face thereof and the outer rotor 233 with three-phase coils wound thereon to generate a revolving magnetic field. The clutch motor 230 may work as a standard motor where the inner rotor 232 and the outer rotor 233 are rotated relative to each other by the interaction between the magnetic field generated by the permanent magnets attached to the inner rotor 232 and the magnetic field generated by the three-phase coils wound on the outer rotor 233. The clutch motor 230 may also work as a generator that generates an electromotive force between both ends of the three-phase coils wound on the outer rotor 233 by such interaction. Electric power is input to and output from the three-phase coils via a slip ring.

In the clutch motor 230, since the inner rotor 232 and the outer rotor 233 are rotatable relative to each other, the power input from one of the inner rotor 232 and the outer rotor 233 may be transmitted to the other. When the clutch motor 230 works as the motor and carries out the power operation, the power with the additional torque is transmitted to the other shaft. When the clutch motor 230 works as the generator and carries out the regenerative operation, on the other hand, part of the power is taken out in the form of electric power white the residual power is transmitted. No power is transmitted when the clutch motor 230 carries out neither the power operation nor the regenerative operation. This state corresponds to the released position of a mechanical clutch.

Like the structure of the first embodiment (FIG. 1), the hybrid vehicle of the modified example has a clutch 160A located between the clutch motor 230 and the motor 140A, as well as a brake 162A disposed upstream the clutch 160A. The hybrid vehicle of the modified example may change over the connection state according to the conditions of the clutch 160A and the brake 162A.

Figure 17:
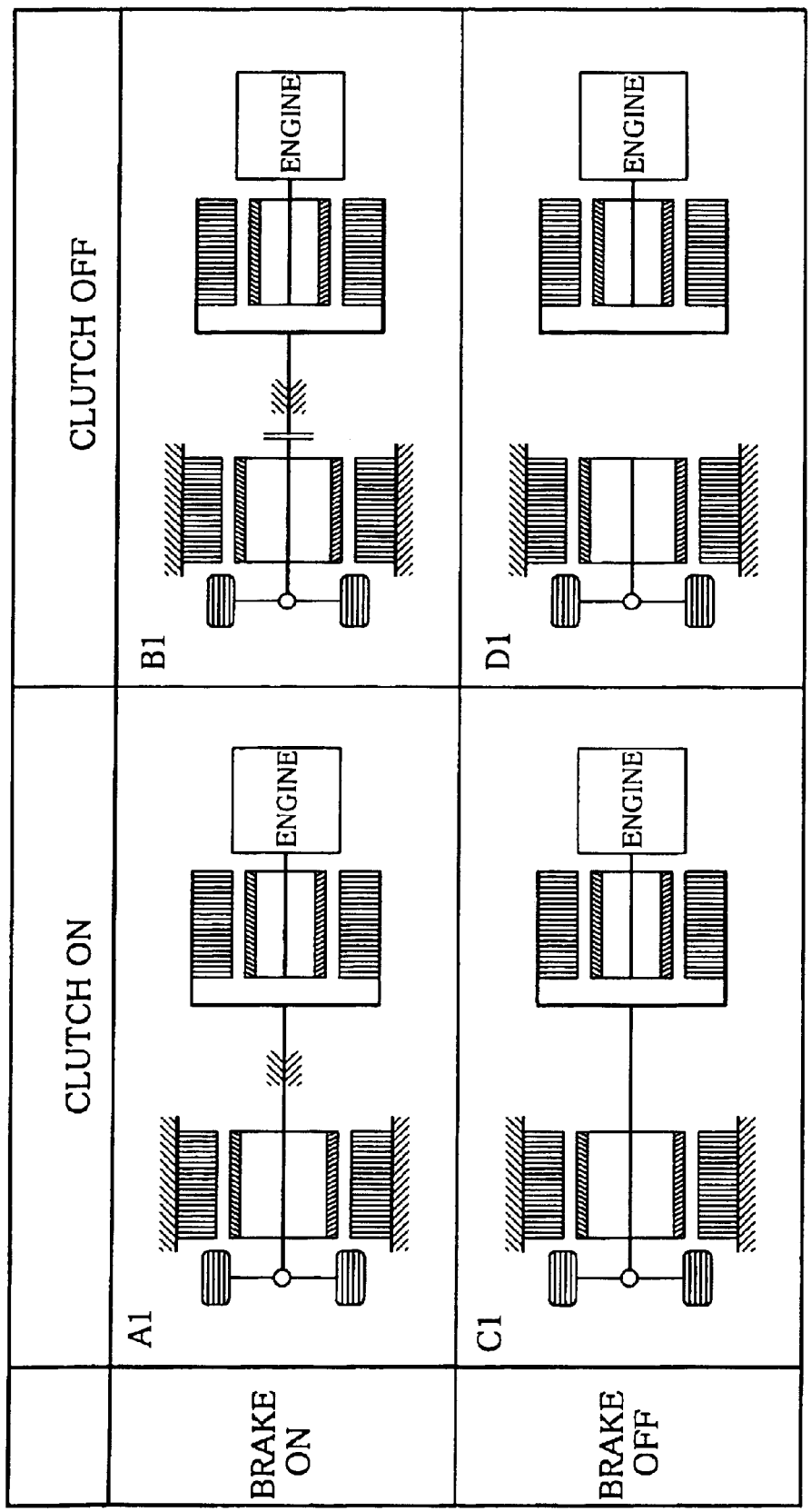
FIG. 17 enumerates possible connection states in the hybrid vehicle of the modified example of the first embodiment.

FIG. 17 enumerates possible connection states in the hybrid vehicle of the modified example. The upper left drawing represents a connection state A1, in which both the clutch 160A and the brake 162A are active. This connection state corresponds to the connection state A in the first embodiment (see FIG. 2). In this connection state, the brake 162A constrains the rotation of the outer rotor 233. In the coupling position of the clutch 160A, the outer rotor 233 is directly linked with the axle 116. In the connection state A1, the brake 162A accordingly constrains the rotation of the axle 116.

The upper right drawing represents a connection state B1, in which the brake 162A is active but the clutch 160A is inactive. This connection state corresponds to the connection state B in the first embodiment (FIG. 2). As in the case of the connection state A1, the brake 162A constrains the rotation of outer rotor 233 in the connection state B1. The rotation of the axle 116 is, however, allowed since the clutch 160A is released. The clutch 160A is located upstream the motor 140A, so that the motor 140A can output power to the axle 116. While the brake 162A constrains the rotation of the outer rotor 233, the engine 150 is drivable by the function of the clutch motor 230. In the connection state B1, the clutch motor 230 can regenerate the power output from the engine 150 in the form of electric power. Namely the connection state B1 corresponds to the structure of the series hybrid vehicle.

The lower left drawing represents a connection state C1, in which the brake 162A is inactive but the clutch 160A is active. This connection state corresponds to the connection state C in the first embodiment (FIG. 2). In this state, the outer rotor 233 is rotatable with the axle 116. In the clutch motor 230, the power output from the engine 150 is partly transmitted to the outer rotor 233, while the residual power is regenerated in the form of electric power. The regenerated electric power is used, for example, to drive the motor 140A. Namely the connection state C1 corresponds to the structure of the parallel hybrid vehicle.

The following describes procedures of converting the power output from the engine 150 and outputting the converted power to the axle 116 in the connection state C1. The discussion first regards the underdrive condition, in which the power output from the engine 150 is converted into a combination of reduced revolving speed and enhanced torque. As clearly understood from the conditions in the connection state C1, the revolving speed of the axle 116 is identical with the revolving speed of the outer rotor 233. In the underdrive condition, the outer rotor 233 of the clutch motor 230 is thus driven at a lower revolving speed than that of the inner rotor 232. This corresponds to the state in which the clutch motor 230 is rotated in reverse of the direction of the torque transmitted from the inner rotor 232 to the outer rotor 233. The clutch motor 230 accordingly regenerates the electric power corresponding to the slip between the inner rotor 232 and the outer rotor 233.

Based on the principle of action and reaction, the torque of the inner rotor 232 is equal to the torque of the outer rotor 233. The torque transmitted to the outer rotor 233 of the clutch motor 230 is equal to the torque of the engine 150. In the underdrive condition, the required torque is greater than the torque output from the engine 150. The motor 140A accordingly carries out the power operation with a supply of electric power, so as to output a torque corresponding to the difference between the required torque and the output torque of the engine 150. The supply of electric power is mainly obtained by the regenerative operation of the clutch motor 230. As in the hybrid vehicle of the first embodiment, in the underdrive condition, the electric power obtained by regenerating part of the power output from the engine 150 is supplied from the upstream clutch motor 230 to the downstream motor 140A. In the hybrid vehicle of this modified example, no circulation of power thus occurs in the underdrive condition.

The discussion then regards the overdrive condition, in which the power output from the engine 150 is converted into a combination of enhanced revolving speed and reduced torque. In the overdrive condition, the outer rotor 233 of the clutch motor 230 is driven at a higher revolving speed than that of the inner rotor 232. This corresponds to the state in which the clutch motor 230 is rotated in the direction of the torque transmitted from the inner rotor 232 to the outer rotor 233. The clutch motor 230 accordingly carries out the power operation with a supply of the electric power corresponding to the slip between the inner rotor 232 and the outer rotor 233.

In the overdrive condition, the required torque is less than the torque output from the engine 150, so that loading is applied by the motor 140A to reduce the torque output to the axle 116. Namely the motor 140A carries out the regenerative operation to regenerate electric power. The regenerated electric power is mainly used for the power operation of the clutch motor 230. As in the hybrid vehicle of the first embodiment, in the overdrive condition, part of the power output from the engine 150 is regenerated by the downstream motor 140A and is supplied to the upstream clutch motor 230. In the hybrid vehicle of this modified example, a circulation of power accordingly occurs to lower the driving efficiency in the overdrive condition.

The lower right drawing represents a connection state D1, in which both the brake 162A and the clutch 160A are inactive. This connection state corresponds to the connection state D in the first embodiment (FIG. 2). In this state, the outer rotor 233 is freely rotatable. Since the clutch 160A is released, the axle 116 is also rotatable. In this case, however, the clutch motor 230 can not regenerate the power output from the engine 150. The relative slip between the inner rotor 232 and the outer rotor 233 is required for regeneration of the electric power. In the connection state D1, since the outer rotor 233 is freely rotatable, no sufficient slip is produced between the two rotors. In the case where the battery 194 has a marginal state of charge, the motor 140A may work to drive the hybrid vehicle with a supply of electric power from the battery 194.

The connection states A1 to D1 in the hybrid vehicle of the modified example are respectively equivalent to the connection states A to D in the hybrid vehicle of the first embodiment and have the similar characteristics, for example, regarding the driving efficiency. The procedures of the first embodiment are applicable to this modified example by adequately modifying the relationship between the drive mode and the driving state of the vehicle (FIG. 7) according to the structure of the hybrid vehicle of the modified example. Like the first embodiment, the hybrid vehicle of the modified example attains the drive taking advantage of the characteristics of the parallel mode and the series mode and thus ensures the enhanced driving efficiency and the improved ride.

(3) Second Embodiment

Figure 18:
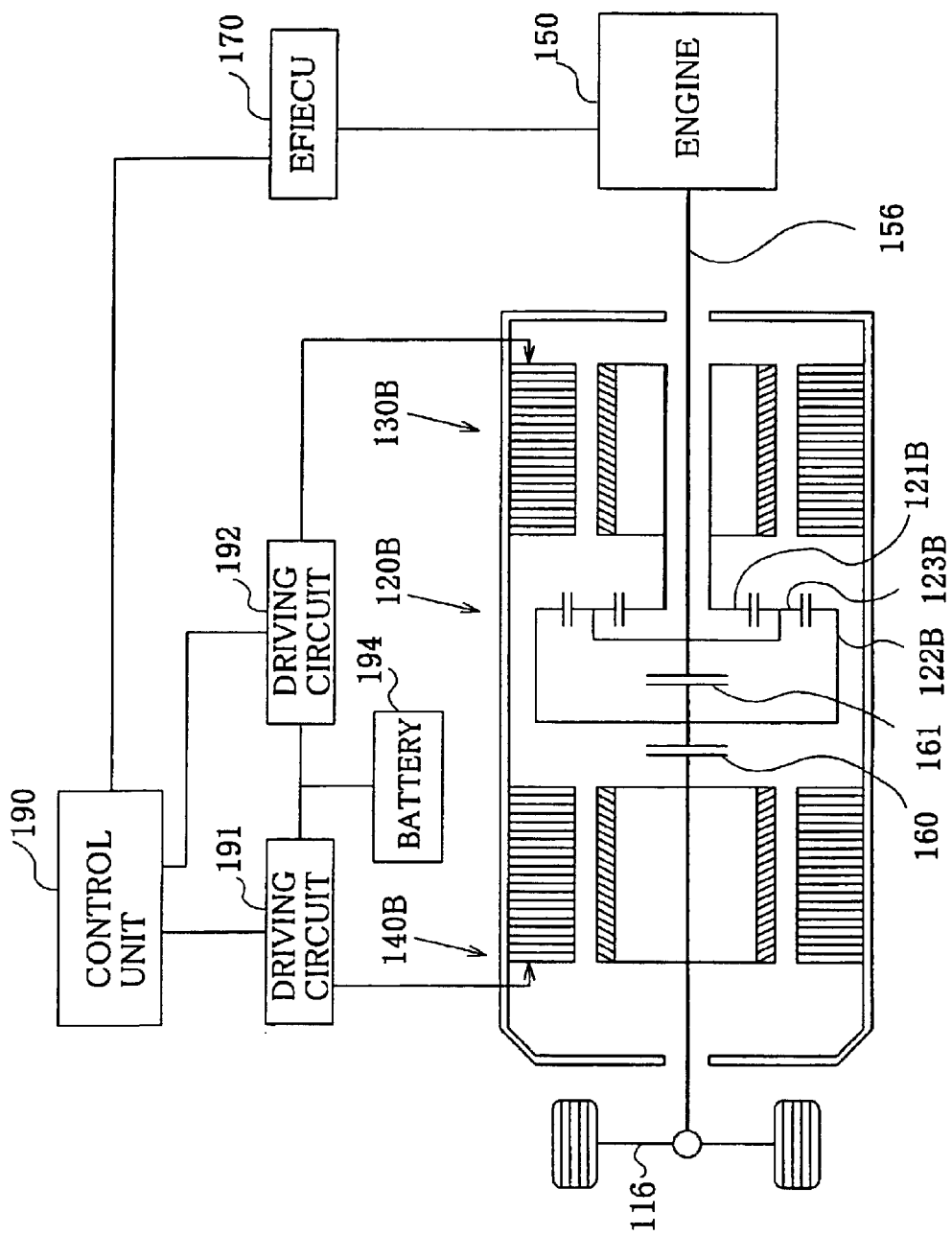
FIG. 18 schematically illustrates the general structure of a hybrid vehicle in a second embodiment.

A hybrid vehicle in a second embodiment of the present invention is discussed below. FIG. 18 schematically illustrates the structure of a hybrid vehicle in the second embodiment. In the hybrid vehicle of this embodiment, the power system includes the engine 150, a motor 130B, and another motor 140B that are connected in this order from the upstream side. Like the first embodiment, these three components of the power system are mechanically linked with one another via a planetary gear unit 120A, and a first clutch 160 is disposed between the planetary gear unit 120B and the motor 140B.

The difference from the first embodiment is that the second embodiment uses a second clutch 161 in place of the brake 162 of the first embodiment. The second clutch 161 connects and disconnects a ring gear 122B with and from a planetary carrier 123B in the planetary gear unit 120B. The control unit 190 controls the connection and disconnection of the second clutch 161. The hybrid vehicle of the second embodiment has a diversity of sensors that are equivalent to those of the first embodiment, although they are omitted from the illustration of FIG. 18 for simplicity of the illustration.

Figure 19:
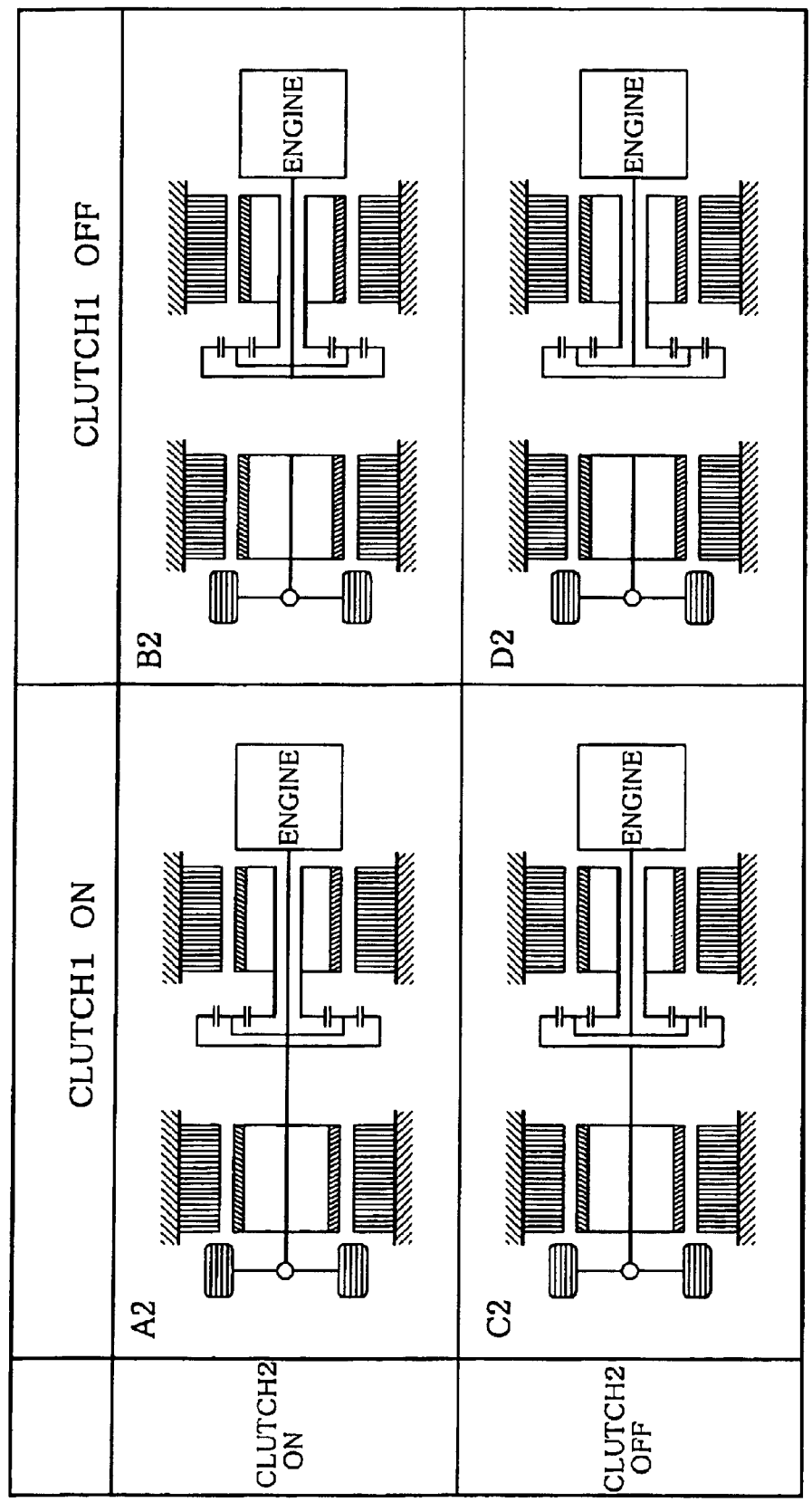
FIG. 19 enumerates possible connection states in the hybrid vehicle of the second embodiment.

In the hybrid vehicle of the second embodiment, the configuration of the power system may be changed over among four connection states according to the conditions of the first clutch 160 and the second clutch 161. FIG. 19 enumerates possible connection states in the hybrid vehicle of the second embodiment.

The upper left drawing represents a connection state A2, in which both the first clutch 160 and the second clutch 161 are active. In this connection state, the function of the second clutch 161 makes the ring gear 122B rotate integrally with the planetary carrier 123B. As clearly understood from the state of the nomogram, when the ring gear 122B and the planetary carrier 123B rotate integrally with each other, the motor 130B is also rotated at the same revolving speed. In the coupled position of the first clutch 160, the ring gear 122B is directly linked with the axle 116. The connection state A2 accordingly corresponds to a specific state, in which all the engine 150, the motor 130B, the motor 140B, and the axle 116 are directly connected with one another. This drive mode is hereinafter referred to as the direct connection mode. This connection state is not found in the first embodiment and is characteristic of the second embodiment.

The upper right drawing represents a connection state B2, in which the second clutch 161 is active but the first clutch 160 is inactive. As in the case of the connection state A2, the function of the second clutch 161 makes the ring gear 122B rotate integrally with the planetary carrier 123B, and the motor 130B is rotated at the same revolving speed. The motor 130B is thus directly linked with the engine 150, while the motor 140B can output power to the axle 116. Namely the connection state B2 corresponds to the structure of the series hybrid vehicle.

The lower left drawing represents a connection state C2, in which the second clutch 161 is inactive but the first clutch 160 is active. In this state, the three gears in the planetary gear unit 120B are rotatable based on the nomogram, and the ring gear 122B is rotatable with the axle 116. This is equivalent to the structure of the parallel hybrid vehicle discussed previously with FIG. 34. Namely the connection state C2 corresponds to the structure of the parallel hybrid vehicle.

The lower right drawing represents a connection state D2, in which both the second clutch 161 and the first clutch 161 are inactive. In this state, the three gears in the planetary gear unit 120B are rotatable based on the nomogram, and the motor 140B can output power to the axle 116. In this case, however, the motor 130B can not regenerate the power output from the engine 150. No regenerative operation of the motor 130 is ascribed to the fact that the rotating state of the ring gear 122B is not specified in the released position of the second clutch 161.

The following describes a drive control routine executed in the hybrid vehicle of the second embodiment. The general flow of the drive control routine is equivalent to that of the first embodiment (see FIG. 5). The CPU of the control unit 190 first carries out the drive mode selection process (step S100), and subsequently performs the start-stop control process (step S400) in the case of requirement for a start or a stop of the engine 150 (step S200) and otherwise the standard torque control process (step S300). The CPU then carries out the resonance suppression control process (step S500). The hybrid vehicle of the second embodiment is driven while iteratively executing this series of processing.

Figure 20:
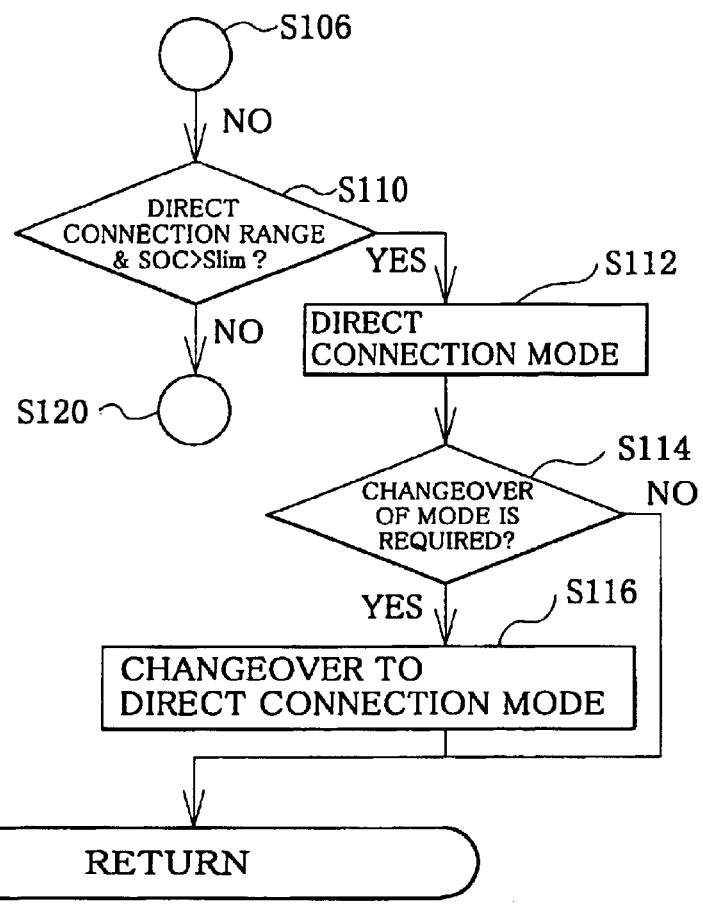
FIG. 20 is a flowchart showing a drive mode selection routine executed in the second embodiment.

The second embodiment has different details of the drive mode selection process from those of the first embodiment (see FIG. 6). FIG. 20 is a flowchart showing the difference from the first embodiment. As discussed above in the drive mode selection process of the first embodiment, when the program enters the routine, the CPU reads the required data representing the driving state of the vehicle (step S102 in FIG. 6) and determines selection or non-selection of the series mode, based on the conditions of whether or not the gearshift position is at the position R (step S104) and whether or not the driving state is in the series range (step S106). The decision is based on the preset table as discussed in the first embodiment.

In the procedure of the second embodiment, when the series mode is not selected based on the above conditions, the CPU determines whether or not the driving state is in a direct connection range and whether or not the observed state of charge SOC in the battery 194 is greater than a preset level Slim (step S110 in FIG. 20). In the case where these conditions are satisfied, the CPU selects the direct connection mode (step S112) and changes over the drive mode from the previous drive mode to the direct connection mode if necessary (steps S114 and S116). When neither the series mode nor the direct connection mode is selected based on the results of the decision, as in the case of the first embodiment, the CPU determines whether or not a start or a stop of the engine 150 is required according to the observed state of charge in the battery 194 (step S120 in FIG. 6) and selects the parallel mode in the case of no requirement for a start or a stop of the engine 150 (steps S122 to S126). The CPU selects the series mode in the case of requirement for a start or a stop of the engine 150 (steps S130 to S134).

Figure 21:
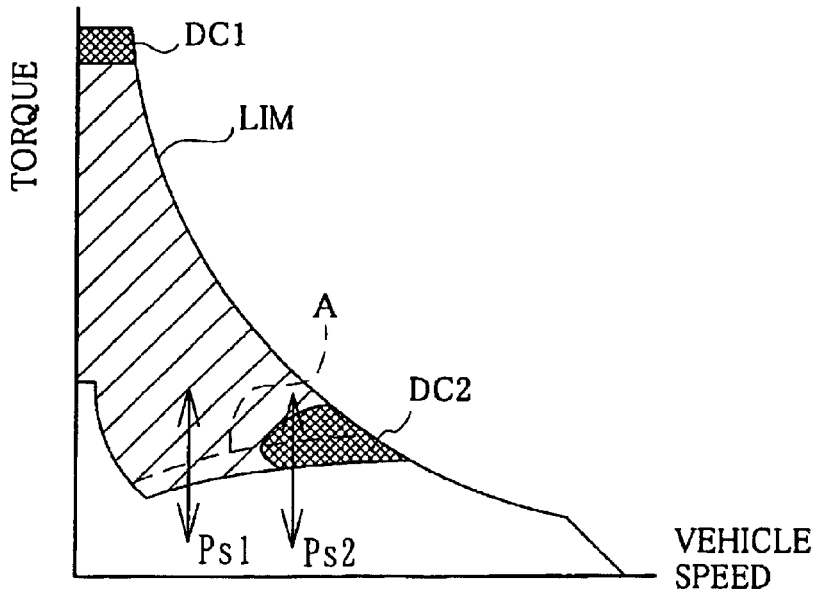
FIG. 21 shows selection of the drive mode in the driving range of the hybrid vehicle of the second embodiment.

Like the first embodiment, the decision regarding the series range (step S106 in FIG. 6) and the direct connection range (step S110 in FIG. 20) is based on the table representing the relationship between the drive mode and the driving state of the vehicle. FIG. 21 shows an example of this table used in the second embodiment. Cross-hatched areas DC1 and DC2 show the direct connection range. The hatched area represents a driving area in the parallel mode, whereas the residual area represents a driving area in the series mode. The driving area in the series mode in the second embodiment is identical with that of the first embodiment.

The setting of the direct connection range is specified to take advantage of the characteristics of the direct connection mode (the connection state A1) shown in FIG. 19. In the connection state A1, all the engine 150, the motor 130B, and the motor 140B are directly linked with the axle. The torque in the direct connection mode is accordingly output from these three power sources and is greater than the output torque in the parallel mode. In the direct connection mode, the power output from the engine 150 may directly be output to the axle 116 without actuation of the motors 130B and 140B. In this case, there is accordingly no loss due to the operations of the motors 130B and 140B. When the required power of the axle 116 is coincident with a drive point on the working curve, the hybrid vehicle in the direct connection mode is driven with an extremely high driving efficiency. The technique of the second embodiment takes advantage of such characteristics of the direct connection mode and selects the direct connection mode in the area DC1 of very large torque and in the area DC2 of relatively large torque in the vicinity of the working curve A.

In the direct connection mode, both the motors 130B and 140B carry out the power operation. It is accordingly desirable that the battery 194 has a sufficiently marginal state of charge. The procedure of the second embodiment thus selects the direct connection mode only when the driving state is in the direct connection range and the observed state of charge SOC in the battery 194 is greater than the preset level Slim. The preset value Slim is determined in advance as the sufficient state of charge to allow the power operation of the motors 130B and 140B.

In the second embodiment, the changeover between the parallel mode and the series mode is implemented via two different pathways. The first pathway is equivalent to the pathway in the first embodiment discussed above. The first pathway attains the changeover between the parallel mode and the series mode via the connection state D2 in which both the first clutch 160 and the second clutch 162 are inactive. The second pathway attains the changeover between the parallel mode and the series mode via the connection state A2 in which both the first clutch 160 and the second clutch 162 are active. For example, the former pathway is applied for a changeover between the parallel mode and the series mode along a route Ps1 in FIG. 21. The latter pathway is applied for a changeover between the parallel mode and the series mode along another routine Ps2 in FIG. 21.

After the selection of the drive mode by the above series of processing, the CPU carries out either the torque control process (step S300 in FIG. 6) or the start-stop control process (step S400) like the first embodiment. The details of the respective routines are similar to those discussed in the first embodiment (see FIGS. 6 and 10), except the settings for the drive points of the motors 130B and 140B.

The configuration in the parallel mode of the second embodiment (the connection state C1 in FIG. 19) is equivalent to the configuration in the parallel mode of the first embodiment (the connection state C in FIG. 2). The settings for the drive points of the motors 130B and 140B are thus identical with those of the first embodiment in both the torque control process (FIG. 6) and the start-stop control process (FIG. 10).

The configuration in the series mode of the second, embodiment is similar to the configuration in the series mode of the first embodiment, except some difference. In the first embodiment, the engine 150 and the motor 130 are driven at different revolving speeds corresponding to the gear ratio in the planetary gear unit 120. In the second embodiment, however, the motor 130B is driven at the same revolving speed as that of the engine 150. The procedure of the second embodiment accordingly sets the target revolving speed N1 and the target torque T1 of the motor 130B equal to the target revolving speed Ne and the target torque Te of the engine 150 in the series mode.

The different method from that of the first embodiment is adopted to specify the setting for the drive point of the engine 150 in the direct connection mode. As described above, the revolving speed of the engine 150 is equal to the revolving speed of the axle 116 in the direct connection mode. A drive point on the working curve A where the revolving speed of the engine 150 is identical with the revolving speed of the axle 116 is selected for the drive point of the engine 150 in the direct connection mode. In the case where the output torque of the engine 150 driven at the selected drive point coincides with the required torque, the hybrid vehicle of the second embodiment is driven while setting the value '0' to the target torques of the motors 130B and 140B, that is, while keeping the motors 130B and 140B at an idle. In the direct connection mode, the target revolving speed N1 and N2 of the motors 130B and 140B are identical with the revolving speed of the axle 116.

In the case where the output of the engine 150 is less than the required torque, the settings for the drive points of the motors 130B and 140B are specified to compensate for the insufficiency of the torque. The settings for the target torques T1 and T2 of the motors 130B and 140B are accordingly determined, such that the sum of the target torques T1 and T2 is equal to the insufficiency or the difference between the required torque and the output torque of the engine 150. The distribution of the torque into the motors 130B and 140B is specified by taking into account the driving efficiencies of these motors. The procedure of the second embodiment distributes the insufficient torque at the ratio of the rated outputs of the motors 130B and 140B and determines the settings of the target torques T1 and T2. When the motors 130B and 140B have an identical rated output, the target torque of each motor is half the insufficient torque.

A variety of other settings may be applied for the distribution of the torque into the motors 130B and 140B in the direct connection mode. One modified procedure uses only the motor 140B to output the torque in the case of a relatively small insufficiency of the torque, while starting the power operation of the motor 130B in the case of a large insufficiency of the torque that can not be compensated only by the motor 140B.

The hybrid vehicle of the second embodiment carries out the above series of processing and is driven while outputting the power defined by the required revolving speed and torque. As in the case of the first embodiment, the CPU carries out the resonance suppression control process (step S500 in FIG. 7), subsequent to the above control processes.

The resonance suppression control process of the second embodiment is similar to that of the first embodiment (see FIG. 11), except some difference. The procedure of the first embodiment reduces the oil pressure of the brake 162 when the resonance occurs in the series mode. The procedure of the second embodiment reduces the oil pressure of the second clutch 161, instead of the oil pressure of the brake 162. Replacement of the brake oil pressure with the second clutch oil pressure at steps S508 and S510 in the resonance suppression control process of the first embodiment (FIG. 11) attains the resonance suppression control of the second embodiment in the series mode. The setting for the oil pressure of the second clutch 161 is specified in advance in the form of a table, which is equivalent to the table of the brake oil pressure in the first embodiment (see FIG. 12). This table is provided, based on the ideas discussed in the first embodiment.

The procedure of the first embodiment reduces the oil pressure of the clutch 160 when the resonance occurs at the ring gear shaft in the parallel mode. In the same manner as the first embodiment, the procedure of the second embodiment reduces the oil pressure of the first clutch 160 when the resonance occurs in the parallel mode. The setting for the oil pressure of the first clutch 160 is specified in advance in the form of a table, which is equivalent to the table of the first embodiment (see FIG. 13). The procedure of the second embodiment executes the same series of processing in the direct connection mode as well as in the parallel mode. Namely the oil pressure of the first clutch 160 is reduced when the resonance occurs at the ring gear shaft in the direct connection mode. The procedure of the second embodiment executes the processing of steps S512 to S518 in the resonance suppression control routine of the first embodiment (FIG. 11), so as to attain the resonance suppression control in both the parallel mode and the direct connection mode.

Like the first embodiment, the hybrid vehicle of the second embodiment discussed above selectively uses the parallel mode and the series mode according to the driving state of the vehicle, thus ensuring an efficient drive that takes advantage of the characteristics of these two drive modes. This arrangement enhances the driving efficiency of the hybrid vehicle and significantly improves the ride.

The structure of the second embodiment also takes the direct connection mode to exert the further effects. In the direct connection mode, the torque may be output from all the engine 150 and the motors 130B and 140B and thus be greater than the output torque in the structure of the first embodiment. This extends the drivable area of the hybrid vehicle. In the direct connection mode, the hybrid vehicle may be driven with only the output power of the engine 150, though under relatively restricted conditions. In this driving state, no electric power is consumed by the motors 130B and 140B, and no conversion of the power output from the engine 150 into electric power is required. There is accordingly no loss due to the conversion. The hybrid vehicle is thus driven at an extremely high driving efficiency in this driving state.

(4) Third Embodiment

Figure 22:
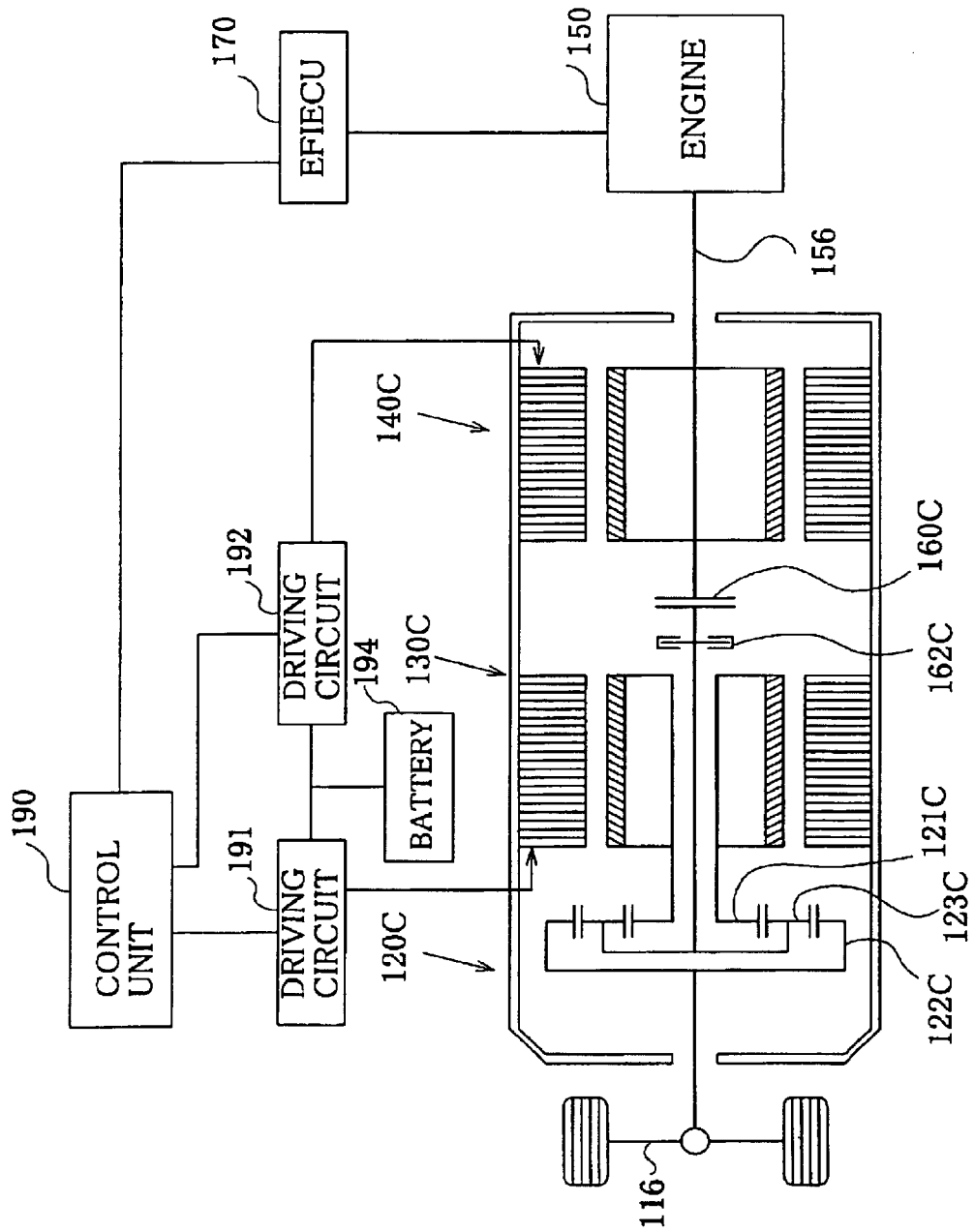
FIG. 22 schematically illustrates the general structure of a hybrid vehicle in a third embodiment.

A hybrid vehicle in a third embodiment of the present invention is discussed below. FIG. 22 schematically illustrates the structure of a hybrid vehicle in the third embodiment. In the hybrid vehicle of this embodiment, the power system includes the engine 150, a motor 140C, and another motor 130C that are connected in this order from the upstream side. While there is no motor directly linked with the crankshaft 156 of the engine 150 in the first and the second embodiments, the motor 140C is directly linked with the crankshaft 156 in the third embodiment.

In the structure of the third embodiment, a planetary carrier 123C in a planetary gear unit 120C connects with the crankshaft 156 of the engine 150, a sun gear 121C connects with the motor 130C, and a ring gear 122C connects with the axle 116. A clutch 160C is provided between the motor 140C and the planetary gear unit 120C. A brake 162C that constrains the rotation of the planetary carrier 123C is disposed downstream the clutch 160C. Like the first embodiment, the control unit 190 controls the connection and disconnection of the clutch 160C and the brake 162C. The hybrid vehicle of the third embodiment has a diversity of sensors that are equivalent to those of the first embodiment, although they are omitted from the illustration of FIG. 22 for simplicity of the illustration.

Figure 23:
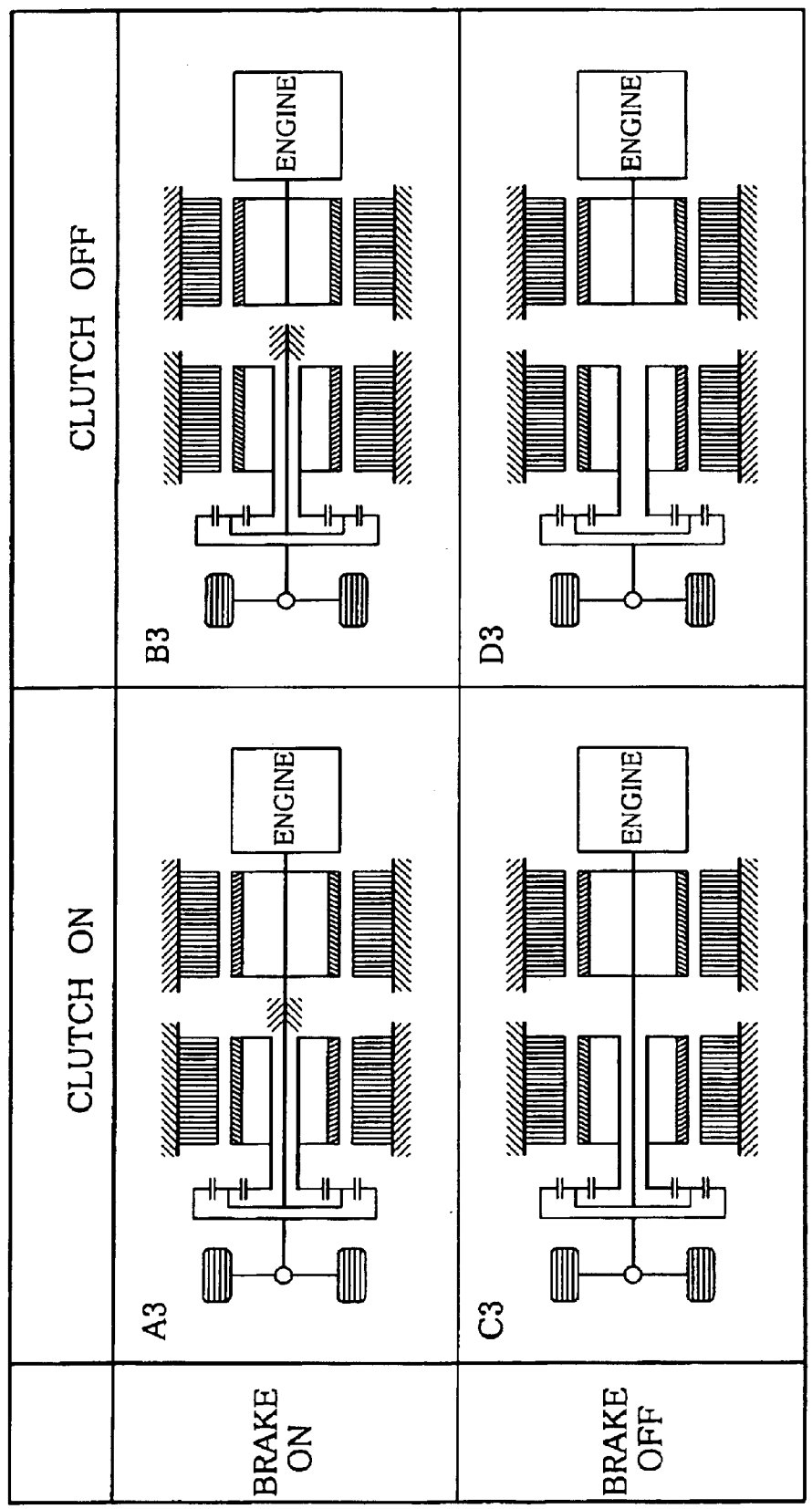
FIG. 23 enumerates possible connection states in the hybrid vehicle of the third embodiment.

In the hybrid vehicle of the third embodiment, the configuration of the power system may be changed over among four connection states according to the conditions of the clutch 160C and the brake 162C. FIG. 23 enumerates possible connection states in the hybrid vehicle of the third embodiment.

The upper left drawing represents a connection state A3, in which both the clutch 160C and the brake 162C are active. In this connection state, the brake 162C constrains the rotation of the planetary carrier 123C. In the coupling position of the clutch 160C, the planetary carrier 123C is directly linked with the crankshaft 156. In the connection state A3, the brake 162C accordingly constrains the rotation of the crankshaft 156. While the rotation of the planetary carrier 123C is constrained, the sun gear 121C and the ring gear 122C are rotatable. The hybrid vehicle in the to connection state A3 is not allowed to utilize the power output from the engine 150 but can be driven with the power of the motor 130C.

The upper right drawing represents a connection state B3, in which the brake 162C is active but the clutch 160C is inactive. As in the case of the connection state A3, the brake 162C constrains the rotation of the planetary carrier 123C while the sun gear 121C and the ring gear 122C are rotatable in the connection state B3. The hybrid vehicle in this connection state can thus be driven with the power of the motor 130. In the released position of the clutch 160C, the engine 150 and the motor 140C are freely rotatable. The motor 140C can thus perform the power generation with the output power of the engine 150. Namely the connection state B3 corresponds to the structure of the series hybrid vehicle. This connection state is hereinafter referred to as the series mode.

Figure 37:
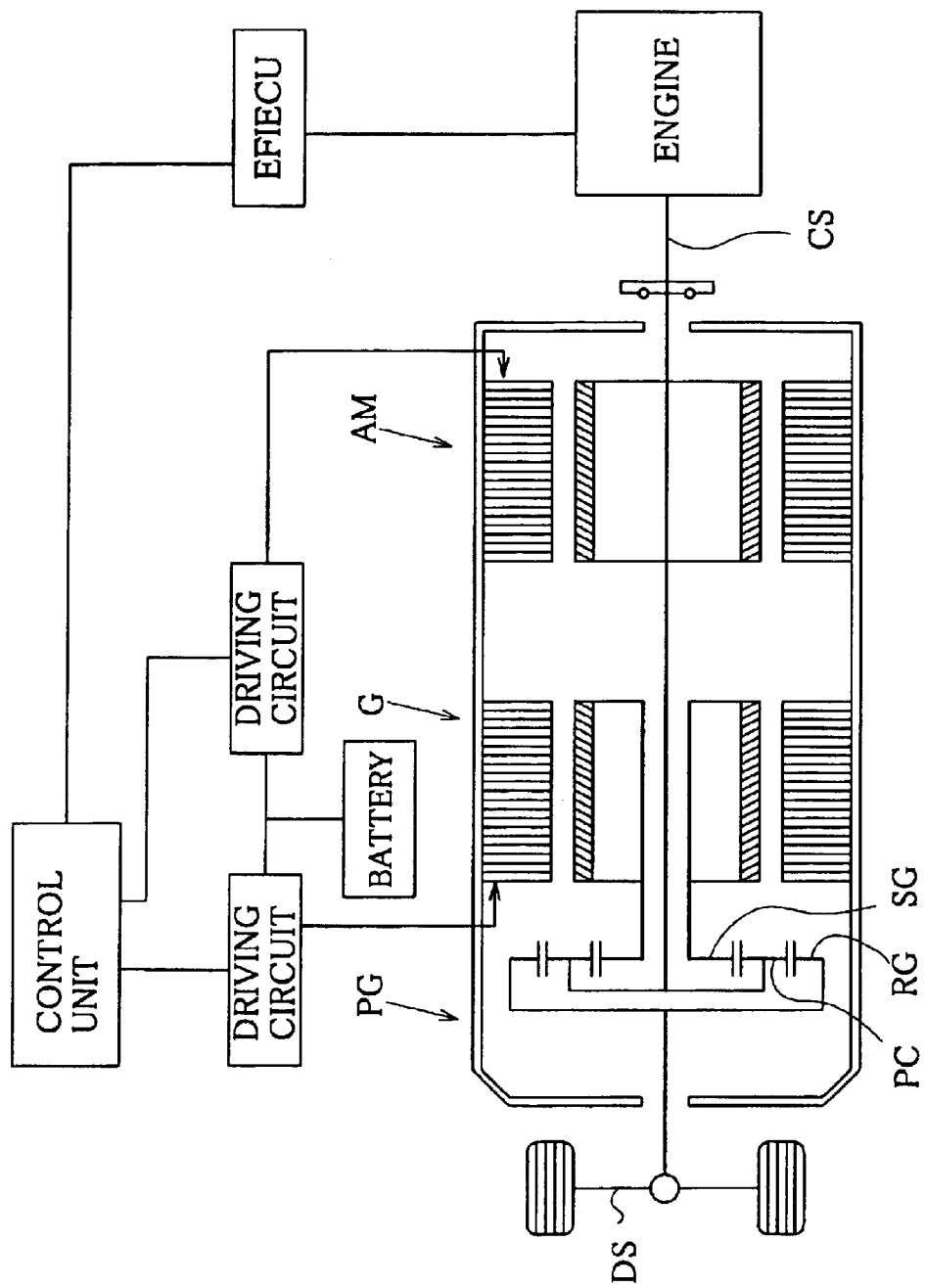
FIG. 37 shows the structure of the prior art hybrid vehicle in a state of connecting the assist motor with a crankshaft.

The lower left drawing represents a connection state C3, in which the brake 162C is inactive but the clutch 160C is active. This is equivalent to the structure of the parallel hybrid vehicle discussed previously with FIG. 37. Namely the connection state C3 in the hybrid vehicle of the third embodiment where the brake 162C is released and the clutch 160C is coupled corresponds to the structure of the parallel hybrid vehicle. This connection state is hereinafter referred to as the parallel mode.

The lower right drawing represents a connection state D3, in which both the brake 162C and the clutch 160C are inactive. In this state, all the gears in the planetary gear unit 120C are freely rotatable, and the motor 140C can regenerate the power output from the engine 150. In this connection state, however, the rotating state of the planetary carrier 123C is not constrained at all, so that no power can be output from the motor 130C to the axle 116. The connection state D3 is thus transiently utilized at the time of a changeover of the configuration of the power system during a drive.

The following describes a drive control routine executed in the hybrid vehicle of the third embodiment. The general flow of the drive control routine is equivalent to that of the first embodiment (see FIG. 5). The CPU of the control unit 190 first carries out the drive mode selection process (step S100), and subsequently performs the start-stop control process (step S400) in the case of requirement for a start or a stop of the engine 150 (step S200) and otherwise the standard torque control process (step S300). The CPU then carries out the resonance suppression control process (step S500). The hybrid vehicle of the third embodiment is driven while iteratively executing this series of processing.

Figure 24:
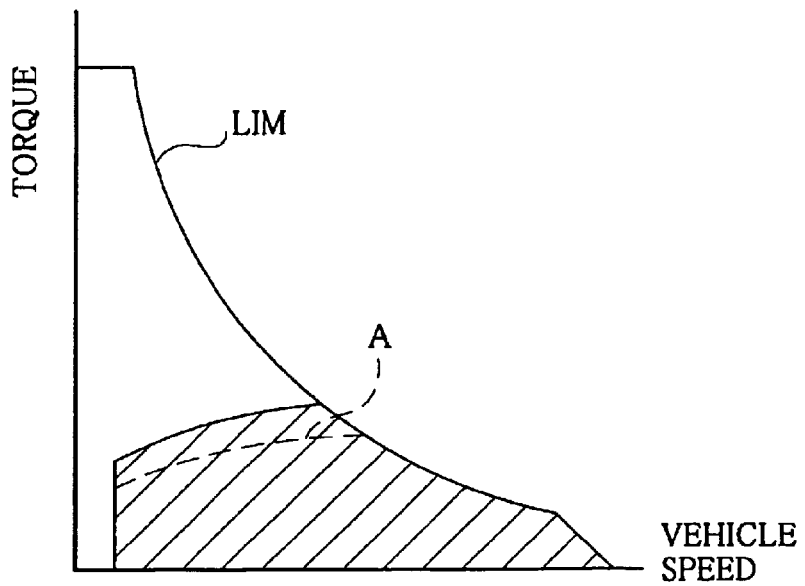
FIG. 24 shows selection of the drive mode in the driving range of the hybrid vehicle of the third embodiment.

The third embodiment has different contents of the table for specifying the series range in the drive mode selection process from those of the first embodiment (FIG. 6). FIG. 24 shows a table representing the relationship between the drive mode and the driving state of the vehicle in the third embodiment. The hatched area represents a driving area in the parallel mode, whereas the residual area represents a driving area in the series mode.

Like the first embodiment, the hybrid vehicle of the third embodiment selects the series mode while the vehicle is at a stop or is driven at a very low speed. As clearly understood from the details of the drive mode selection process (FIG. 6), the series mode is also selected when the gearshift position is at the position R or when a start or a stop of the engine 150 is required. While the procedure of the first embodiment selects the series mode in an area of relatively low required torque in the standard driving conditions, the procedure of the third embodiment selects the series mode in an area of relatively high required torque.

In the same manner as the first embodiment, the procedure of the third embodiment compares the driving efficiency of the series mode with the driving efficiency of the parallel mode and selects the drive mode of the higher driving efficiency for a standard drive. In the first embodiment, the parallel mode in the underdrive condition enables output of the power without causing any circulation of power and accordingly attains the high driving efficiency as described previously with FIGS. 34 to 36. The procedure of the first embodiment thus selects the parallel mode of the higher driving efficiency in the area of high required torque.

Figure 38:
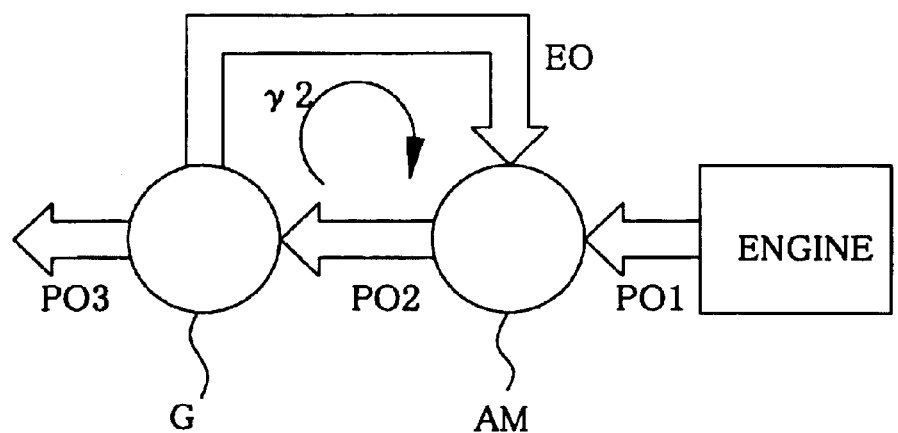
FIG. 38 shows a process of power transmission in the underdrive condition in the prior art hybrid vehicle in the state of connecting the assist motor with the crankshaft.
Figure 39:
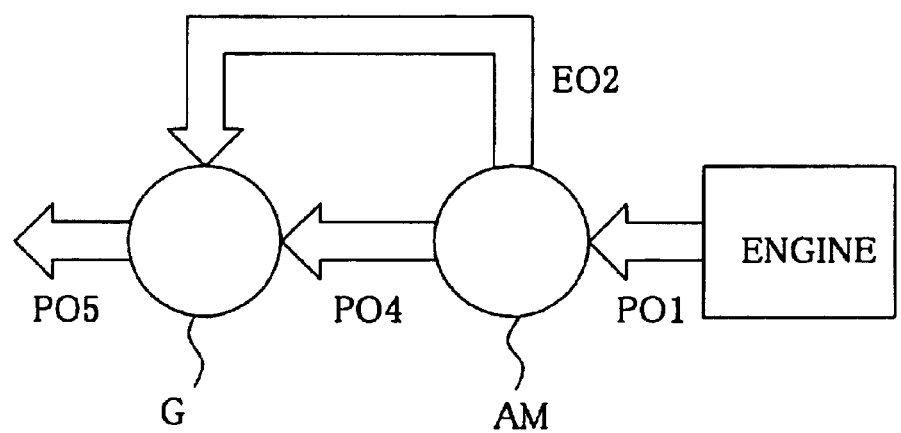
FIG. 39 shows a process of power transmission in the overdrive condition in the prior art hybrid vehicle in the state of connecting the assist motor with the crankshaft.

The phenomena in the structure of the third embodiment are just opposite to those in the structure of the first embodiment as described previously with FIGS. 37 to 39. Namely the parallel mode in the overdrive condition, which converts the power output from the engine 150 into a combination of enhanced revolving speed and reduced torque, enables output of the power without causing any circulation of power and accordingly attains the high driving efficiency. Contrary to the first embodiment, the procedure of the third embodiment thus selects the parallel mode of the higher driving efficiency in the area of low required torque.

In the structure of the third embodiment, the changeover between the parallel mode (the connection state C3 in FIG. 23) and the series mode (the connection state B3) is implemented via the connection state D3 in FIG. 23. For example, in the case of a changeover from the parallel mode (the connection state C3) to the series mode (the connection state B3), the procedure first releases the clutch 160C to have the connection state D3 and then activates the brake 162C to constrain the planetary carrier 123C. The arrangement via this pathway enables the drive mode to be changed over from the parallel mode to the series mode without stopping the operation of the engine 150. In the case of a changeover from the series mode to the parallel mode, the procedure implements the changeover to the parallel mode after starting the engine 150 in the series mode. The pathway via the connection state D3 ensures a smooth changeover of the drive mode without causing any significant torque shock due to a start or a stop of the engine 150.

The changeover of the drive mode via the connection state D3 causes a transient dead time, in which no power is output, although the transient dead time is only a very short time period. In order to avoid no such dead time, the changeover may be implemented via the connection state A3.

After the drive mode selection process, the procedure performs the start-stop control process (step S400) in the case of requirement for a start or a stop of the engine 150 (step S200) and otherwise the standard torque control process (step S300) as shown in the flowchart of FIG. 7. The details of the respective routines in the third embodiment are similar to those discussed in the first embodiment (see FIGS. 8 and 10), except the settings for the drive points of the motors 130C and 140C.

In the series mode, all the required power of the axle 116 is output by the motor 130C. The target revolving speed N1 and the target torque T1 of the motor 130C are accordingly obtained as expressed below by substituting the target revolving speed Nd* and the target torque Td* of the axle 116 into the revolving speed Nr and the torque Tr of the ring gear 122 and the value '0' into the revolving speed Nc of the planetary carrier 123C in Equations (1), which are given above and applied for the planetary gear unit 120C:

$$N1 = -Nd^*/\rho$$

$$Ts = \rho Td^*$$

The motor 140C is directly linked with the engine 150, so that the target revolving speed N2 and the torque T2 of the motor 140C coincide with the target revolving speed Ne and the target torque Te of the engine 150.

A In the parallel mode, the settings for the target revolving speeds of the motors 130C and 140C are specified, such that the revolving speed Nr of the ring gear 122 is coincident with the target revolving speed Nd* of the axle 116 and the revolving speed of the planetary carrier 123C is coincident with the target revolving speed Ne of the engine 150. The motor 140C is driven at the same revolving speed as that of the engine 150. The target revolving speed N2 of the motor 140C is thus equal to the target revolving speed Ne of the engine 150. The target revolving speed N1 of the motor 130C is obtained as expressed below by substituting the target revolving speed Nd* of the axle 116 into the revolving speed Nr of the ring gear 122 and the target revolving speed Ne of the engine 150 into the revolving speed Nc of the planetary carrier 123:

$$N1=(1+\rho)/\rho \times Ne - Nd^*/\rho$$

The settings for the target torques T1 and T2 of the motors 130C and 140C are specified, such that the total torque output to the axle 116 coincides with the required torque Td*. The torque Tes of the sun gear 121C and the torque Tc of the planetary carrier Tc are obtained as expressed below by substituting the target torque Td* of the axle 116 into the torque Ter of the ring gear 122C in Equations (1) given above:

$$Tes = \rho Td^*$$

$$Tc = (1+\rho)Td^*$$

The setting for the target torque T1 of the motor 130C is accordingly determined to ensure output of the required torque to the sun gear 121C. More concretely T1=Tes. The setting for the target torque T2 of the motor 140C is determined by regulating the torque Te output from the engine 150 to ensure output of the required torque to the planetary carrier 123C. More concretely T2=Tc−Td*. In this embodiment, the parallel mode is selected in the overdrive condition that converts the torque output from the engine 150 into a combination of enhanced revolving speed and reduced torque. The target torque T2 of the motor 140C thus mainly takes a negative value. Namely the motor 140C mainly carries out the regenerative operation.

The series mode is selected at the time of starting or stopping the engine. The drive point for starting or stopping the engine 150 is set to the target revolving speed N2 and the target torque T2 of the motor 140. The drive point of the motor 130C is identical with the settings in the series mode.

The hybrid vehicle of the third embodiment carries out the above series of processing and is driven while outputting the power defined by the required revolving speed and torque. As in the case of the first embodiment, the CPU carries out the resonance suppression control process (step S500 in FIG. 7), subsequent to the above control processes.

Figure 25:
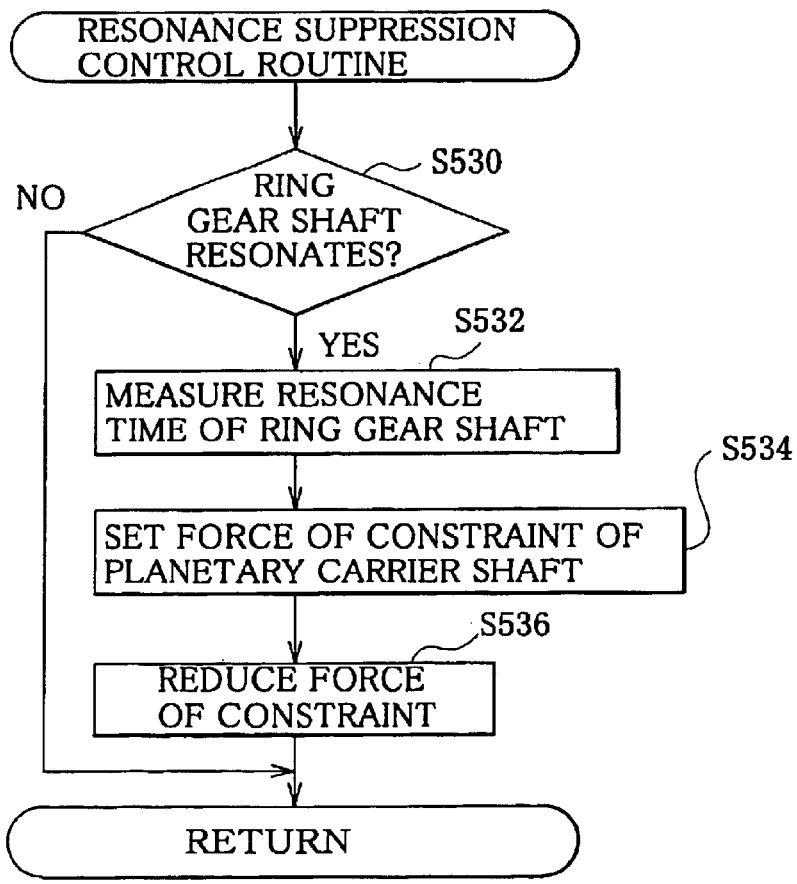
FIG. 25 is a flowchart showing a resonance suppression control routine executed in the third embodiment.

FIG. 25 is a flowchart showing the resonance suppression control process executed in the third embodiment. In the structure of the third embodiment, the motor 140C located upstream the planetary gear unit 120C is in charge of starting or stopping the engine 150. There is accordingly very little possibility that the resonance occurs at the rotating shaft in the planetary gear unit 120C at the time of starting or stopping the engine 150. The procedure of the third embodiment accordingly carries out the control to suppress the resonance occurring at the ring gear shaft connecting with the axle 116.

When the program enters the resonance suppression control process shown in FIG. 25, the CPU first determines whether or not the ring gear shaft resonates (step S530). In the same manner as the resonance suppression control process of the first embodiment (step S512 in FIG. 11), the concrete procedure processes the observed revolving speed of the ring gear shaft through a band-pass filter, so as to determine whether or not the revolving speed is within the resonance zone.

In the case of no occurrence of the resonance at the ring gear shaft, the program immediately exits from the resonance suppression control process without any further processing. In the case of occurrence of the resonance at the ring gear shaft, on the other hand, the CPU measures a resonance time (step S532) and sets the force of constraint of the planetary carrier shaft corresponding to the resonance time (step S534). The relationship between the force of constraint and the resonance time is specified in advance in the form of a table, like the first embodiment.

In the third embodiment, the target for setting the force of constraint is varied according to the drive mode. In the series mode (the connection state B3 in FIG. 23), the brake 162C constrains the rotation of the planetary carrier shaft, so that the procedure reduces the oil pressure of the brake 162C. In the parallel mode (the connection state C3 in FIG. 23), on the other hand, the clutch 160C links the engine 150 with the motor 140C to constrain the rotation of the planetary carrier shaft, so that the procedure reduces the oil pressure of the clutch 160C. The third embodiment provides separate tables for specifying the brake oil pressure and the clutch oil pressure corresponding to each resonance time and selectively uses one of the tables according to the drive mode. These tables are prepared, based on the same idea as that of the table of the first embodiment (FIG. 13) for specifying the oil pressure of the clutch 160.

After setting the force of constraint of the planetary carrier shaft, the CPU controls the clutch 160C or the brake 162C according to the selected drive mode and reduces the force of constraint (step S536).

Like the first embodiment, the hybrid vehicle of the third embodiment discussed above selectively uses the parallel mode and the series mode according to the driving state of the vehicle, thus ensuring an efficient drive that takes advantage of the characteristics of these two drive modes. This arrangement enhances the driving efficiency of the hybrid vehicle and significantly improves the ride.

In the third embodiment, the parallel mode is selected in the area of relatively low torque (see FIG. 24). As discussed previously with FIG. 14, the parallel mode attains the higher driving efficiency than the series mode in the driving condition without causing the circulation of power. The arrangement of the third embodiment is thus effectively applied for the hybrid vehicle that is frequently driven with relatively low torques.

Figure 26:
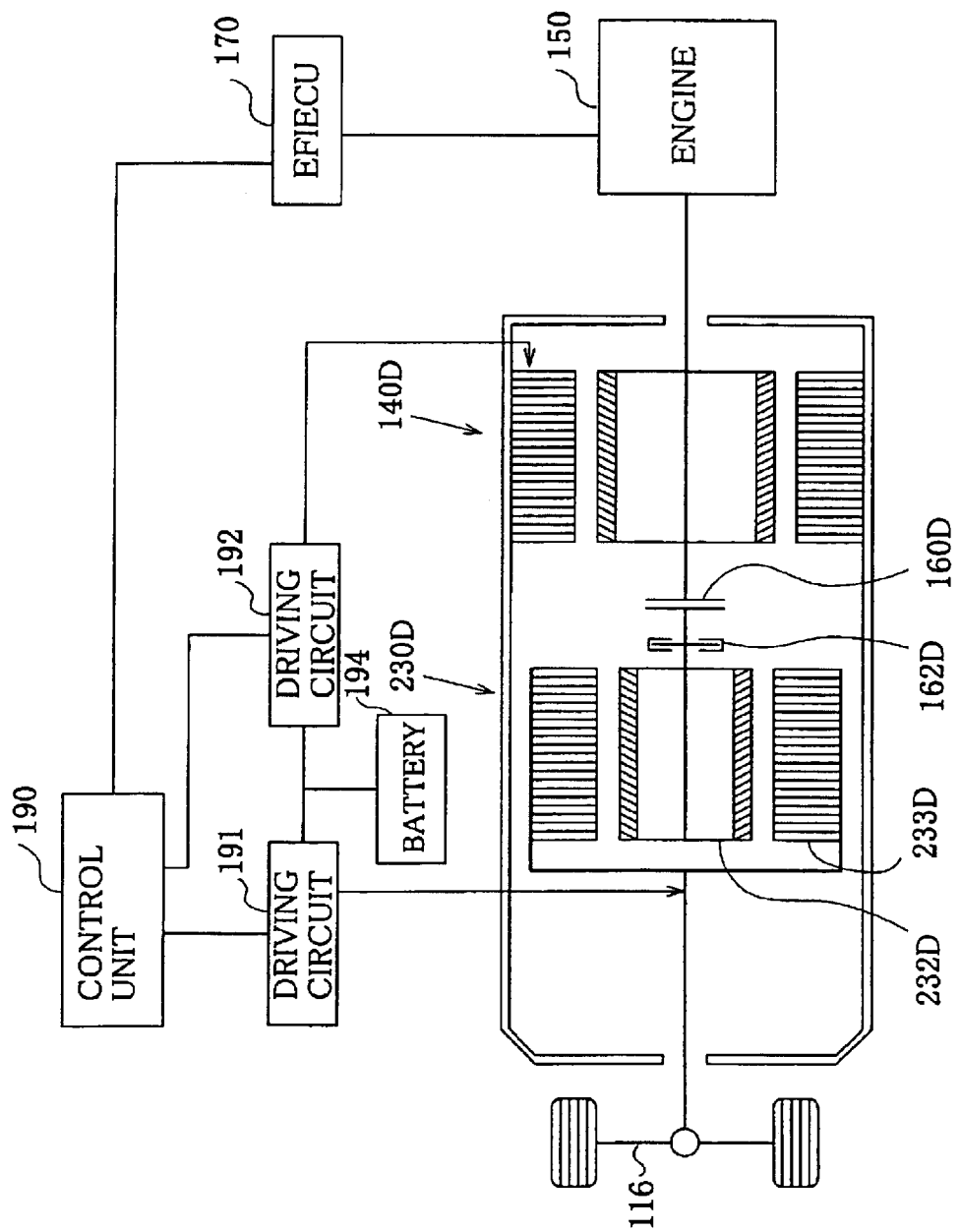
FIG. 26 schematically illustrates the structure of a hybrid vehicle in a modified example of the third embodiment.

The modified structure of the first embodiment is also applicable to the third embodiment. FIG. 26 schematically illustrates the structure of a hybrid vehicle in a modified example of the third embodiment. While the third embodiment uses the combination of the planetary gear unit 120C with the motor 130C for the power distribution mechanism, the modified example uses a clutch motor 230D for the power distribution mechanism. An inner rotor 232D of the clutch motor 230D is linked with the crankshaft 156 of the engine 160 and a motor 140D, whereas an outer rotor 233D is linked with the axle 116.

The hybrid vehicle of the modified example has a clutch 160D located between the clutch motor 230D and the motor 140D, as well as a brake 162D disposed downstream the clutch 160D. The hybrid vehicle of the modified example may change over the connection state according to the conditions of the clutch 160D and the brake 162D.

Figure 27:
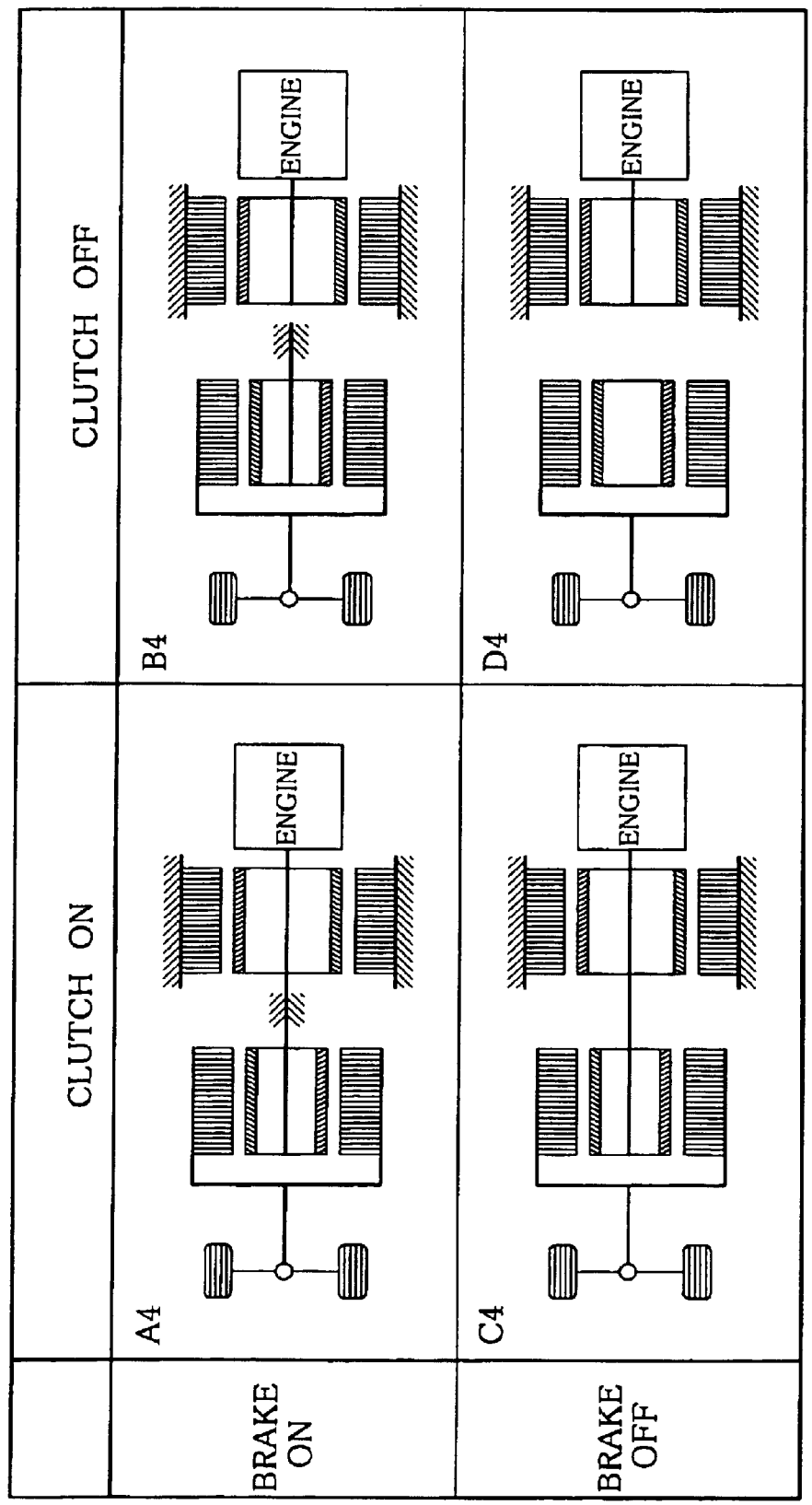
FIG. 27 enumerates possible connection states in the hybrid vehicle of the modified example of the third embodiment.

FIG. 27 enumerates possible connection states in the hybrid vehicle of the modified example. The upper left drawing represents a connection state A4, in which both the clutch 160D and the brake 162D are active. This connection state corresponds to the connection state A3 in the third embodiment (see FIG. 23). In this connection state, the brake 162D constrains the rotation of the inner rotor 232D. In the coupled position of the clutch 160D, the inner rotor 232D is directly linked with the crankshaft 156 and the motor 140D. In the connection state A4, neither the engine 150 nor the motor 140D can be driven.

The upper right drawing represents a connection state B4, in which the brake 162D is active but the clutch 160D is inactive. This connection state corresponds to the connection state B3 in the third embodiment (FIG. 23). As in the case of the connection state A4, the brake 162D constrains the rotation of inner rotor 232D in the connection state B4. Since the clutch 160D is released, however, the motor 140D can be driven with the power of the engine 150 to generate electric power. As the brake 162D constrains the rotation of the inner rotor 232D, the clutch motor 230D can output power to the axle 116. Namely the connection state B4 corresponds to the structure of the series hybrid vehicle.

The lower left drawing represents a connection state C4, in which the brake 162D is inactive but the clutch 160D is active. This connection state corresponds to the connection state C3 in the third embodiment (FIG. 23). In this state, the outer rotor 233 is rotatable with the axle 116. The power output from the engine 150 is partly regenerated by the motor 140D, while the clutch motor 230D carries out the power operation to regulate the revolving speed of the residual power and output the regulated residual power to the axle 116. The electric power required for the power operation of the clutch motor 230D is mainly supplied by the electric power regenerated by the motor 140D. Namely the connection state C4 corresponds to the structure of the parallel hybrid vehicle.

The following describes procedures of converting the power output from the engine 150 and outputting the converted power to the axle 116 in the connection state C4. In the underdrive condition, the outer rotor 233D of the clutch motor 230D has a lower revolving speed than the revolving speed of the inner rotor 232D. The clutch motor 230D accordingly regenerates the electric power corresponding to the slip between the inner rotor 232D and the outer rotor 233D. The motor 140D, on the other hand, carries out the power operation to cause a greater torque than the output torque of the engine 150 to be output from the axle 116. The electric power required for the power operation of the motor 140D is supplied by the electric power regenerated by, the clutch motor 230D. As in the hybrid vehicle of the third embodiment, in the underdrive condition, the electric power obtained by regenerating part of the power output from the engine 150 is supplied from the downstream clutch motor 230D to the upstream motor 140A. In the hybrid vehicle of this modified example, a circulation of power accordingly occurs to lower the driving efficiency in the underdrive condition.

In the overdrive condition, on the other hand, the outer rotor 233D of the clutch motor 230D has a higher revolving speed than the revolving speed of the inner rotor 232D. The clutch motor 230D accordingly carries out the power operation with a supply of the electric power corresponding to the slip between the inner rotor 232D and the outer rotor 233D. In the overdrive condition, the motor 140D applies loading and causes a smaller torque than the output torque of the engine 150 to be output from the axle 116. Namely the motor 140D carries out the regenerative operation to regenerate the electric power, which is mainly supplied for the power operation of the clutch motor 230D. As in the hybrid vehicle of the third embodiment, in the overdrive condition, part of the power output from the engine 150 is regenerated by the upstream motor 140D and is supplied to the downstream clutch motor 230D. In the hybrid vehicle of the modified example, no circulation of power occurs in the overdrive condition.

The lower right drawing represents a connection state D4, in which both the brake 162D and the clutch 160D are inactive. This connection state corresponds to the connection state D3 in the third embodiment (FIG. 23). In this state, the outer rotor 233D is freely rotatable. The engine 150 and the motor 140D are also freely rotatable. In this case, however, the rotation of the inner rotor 232D is not constrained, so that the power can not be output from the clutch motor 230D to the axle 116.

The connection states A4 to D4 in the hybrid vehicle of the modified example are respectively equivalent to the connection states A3 to D3 in the hybrid vehicle of the third embodiment and have the similar characteristics, for example, regarding the driving efficiency. The procedures of the third embodiment are applicable to this modified example by adequately modifying the relationship between the drive mode and the driving state of the vehicle according to the structure of the hybrid vehicle of the modified example. Like the third embodiment, the hybrid vehicle of the modified example attains the drive taking advantage of the characteristics of the parallel mode and the series mode and thus ensures the enhanced driving efficiency and the improved ride.

(5) Fourth Embodiment

Figure 28:
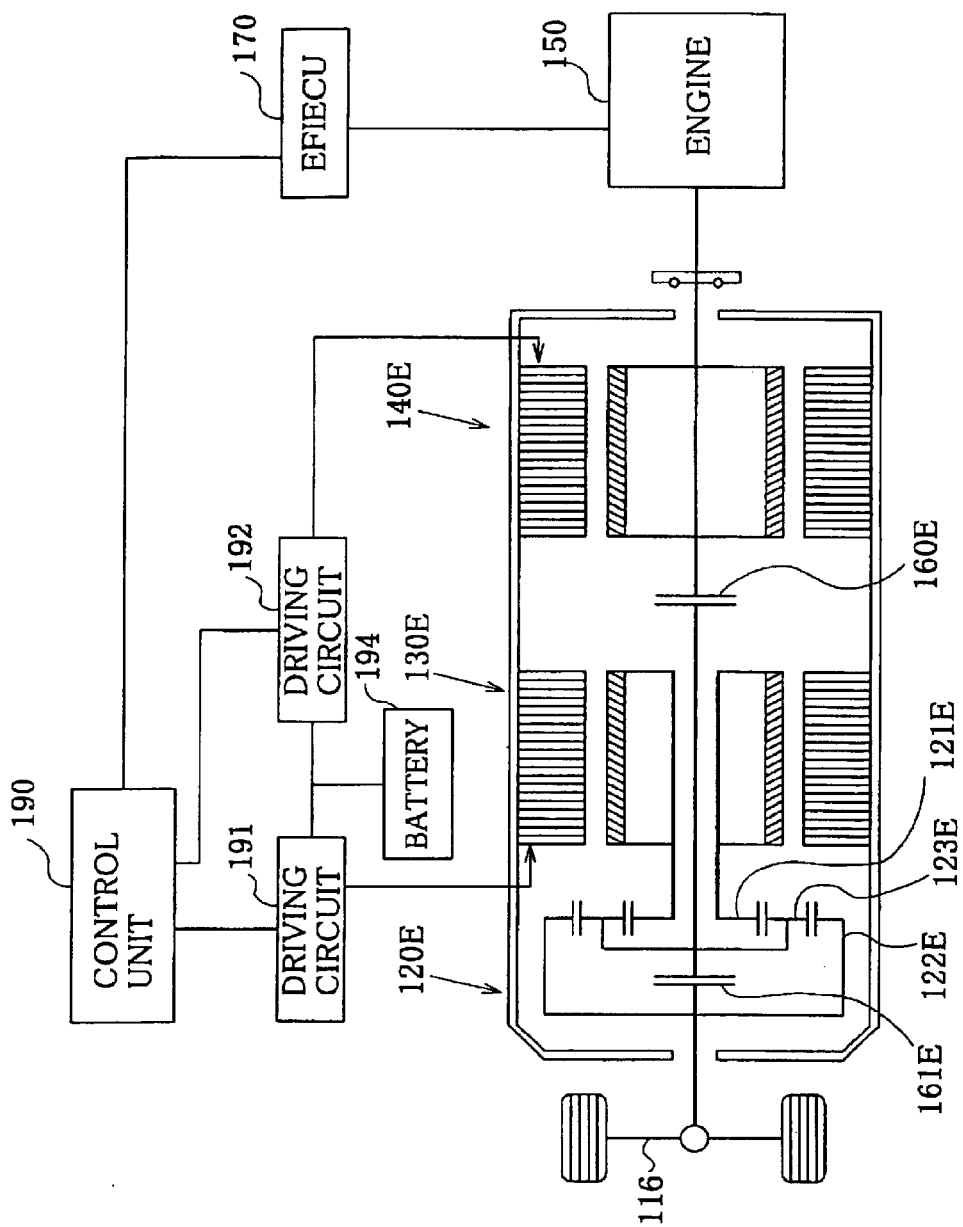
FIG. 28 schematically illustrates the general structure of a hybrid vehicle in a fourth embodiment.

A hybrid vehicle in a fourth embodiment of the present invention is discussed below. FIG. 28 schematically illustrates the structure of a hybrid vehicle in the fourth embodiment. In the hybrid vehicle of this embodiment, the power system includes the engine 150, a motor 140E, and another motor 130E that are connected in this order from the upstream side. As in the case of the third embodiment, the engine 150 is directly linked with the motor 140E, and the motor 130E is mechanically linked with the engine 150 and the motor 140E via a planetary gear unit 120E. A first clutch 160E is disposed between the planetary gear unit 120E and the motor 140E.

The difference from the third embodiment is that the fourth embodiment uses a second clutch 161E in place of the brake 162C of the third embodiment. The second clutch 161E connects and disconnects a ring gear 122E with and from a planetary carrier 123E in the planetary gear unit 120E. The control unit 190 controls the connection and disconnection of the second clutch 161E. The hybrid vehicle of the fourth embodiment has a diversity of sensors that are equivalent to those of the first embodiment, although they are omitted from the illustration of FIG. 28 for simplicity of the illustration.

Figure 29:
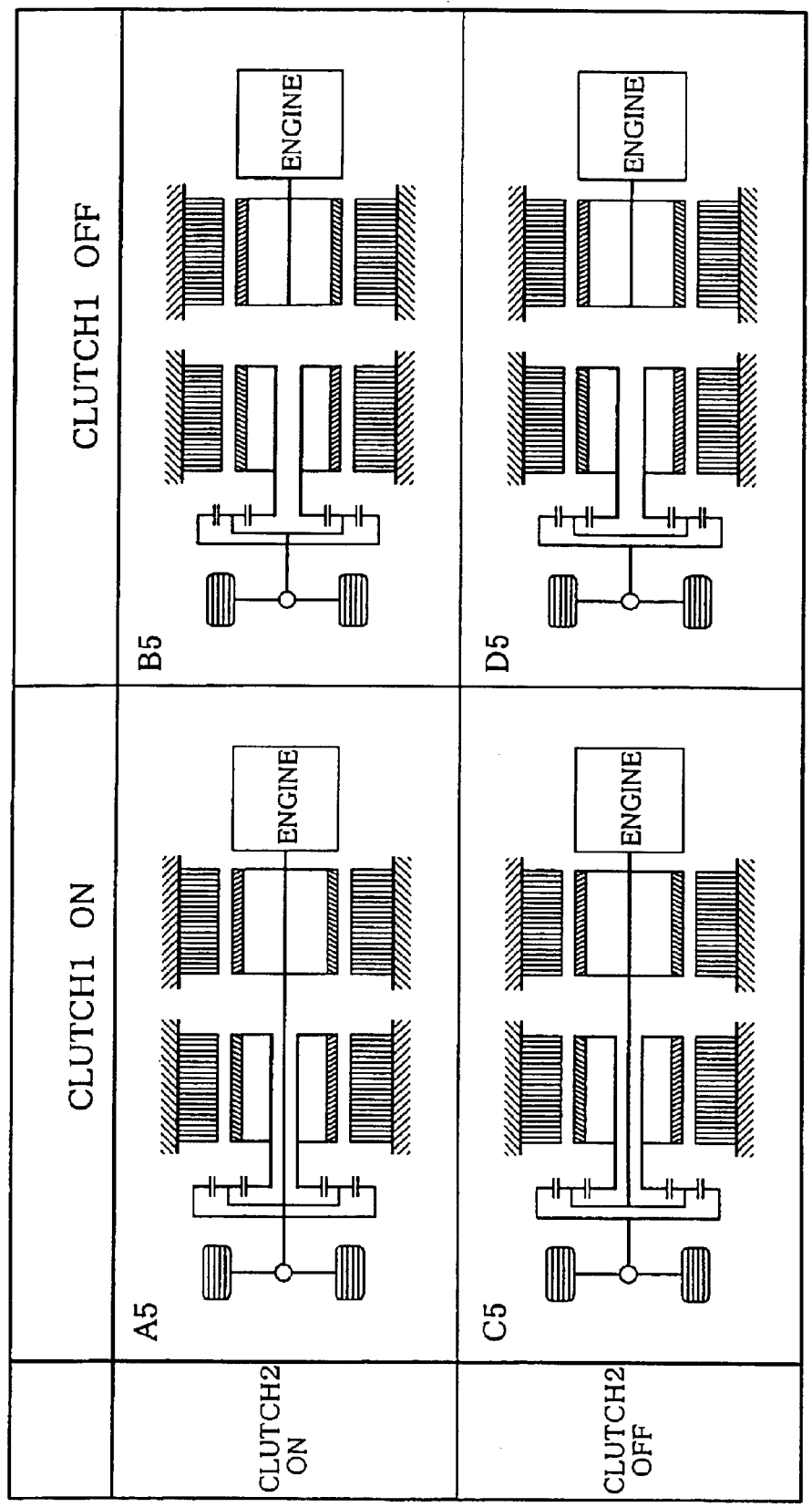
FIG. 29 enumerates possible connection states in the hybrid vehicle of the fourth embodiment.

In the hybrid vehicle of the fourth embodiment, the configuration of the power system may be changed over among four connection states according to the conditions of the first clutch 160E and the second clutch 161E. FIG. 29 enumerates possible connection states in the hybrid vehicle of the fourth embodiment.

The upper left drawing represents a connection state A5, in which both the first clutch 160E and the second clutch 161E are active. In this connection state, the function of the second clutch 161E makes the ring gear 122E rotate integrally with the planetary carrier 123E. As the ring gear 122E and the planetary carrier 123E rotate integrally with each other, the motor 130E is also rotated at the same revolving speed. In the coupled position of the first clutch 160E, the crankshaft 156 of the engine 150 is directly linked with the axle 116. The connection state A5 accordingly corresponds to a specific state, in which all the engine 150, the motor 140E, the motor 130E, and the axle 116 are directly connected with one another. This drive mode is hereinafter referred to as the direct connection mode.

The upper right drawing represents a connection state B5, in which the second clutch 161E is active but the first clutch 160E is inactive. As in the case of the connection state A5, the function of the second clutch 161E makes the ring gear 122E rotate integrally with the planetary carrier 123E, and the motor 130E is rotated at the same revolving speed. The motor 130E is thus directly linked with the axle 116 to enable output of the power from the motor 130E to the axle 116. The engine 150 and the motor 140E are freely rotatable, and the motor 140E can regenerate the power output from the engine 150 in the form of electric power. Namely the connection state B5 corresponds to the structure of the series hybrid vehicle.

The lower left drawing represents a connection state C5, in which the second clutch 161E is inactive but the first clutch 160E is active. This is equivalent to the connection state C3 of the third embodiment. Namely the connection state C5 corresponds to the structure of the parallel hybrid vehicle.

The lower right drawing represents a connection state D5, in which both the second clutch 161E and the first clutch 161E are inactive. In this state, the three gears in the planetary gear unit 120E are rotatable based on the nomogram, and the motor 140B can regenerate the power output from the engine 150 in the form of electric power. In this case, however, since the rotation of the planetary carrier 123E is not constrained, no power can be output from the motor 130E to the axle 116. This is equivalent to the connection state D3 of the third embodiment.

The following describes a drive control routine executed in the hybrid vehicle of the fourth embodiment. The general flow of the drive control routine is equivalent to that of the first embodiment (see FIG. 5). The CPU of the control unit 190 first carries out the drive mode selection process (step S100), and subsequently performs the start-stop control process (step S400) in the case of requirement for a start or a stop of the engine 150 (step S200) and otherwise the standard torque control process (step S300). The CPU then carries out the resonance suppression control process (step S500). The hybrid vehicle of the fourth embodiment is driven while iteratively executing this series of processing.

The details of the drive mode selection process executed in the fourth embodiment are similar to those of the second embodiment (see FIGS. 6 and 20). The procedure first determines whether or not the series mode is to be selected, based on the current gearshift position and the driving state of the vehicle (steps S102 to S106 in FIG. 6). In the case where the series mode is not selected based on these conditions, the process selects the direct connection mode (step S112 in FIG. 20) only when the driving state is in the direct connection range and the observed state of charge SOC in the battery 194 is greater than the preset level Slim. When neither the series mode nor the direct connection mode is selected based on the results of the decision, the process selects the series mode in the case of requirement for a start or a stop of the engine 150, while otherwise selecting the parallel mode (steps S120 to S134 in FIG. 6).

Figure 30:
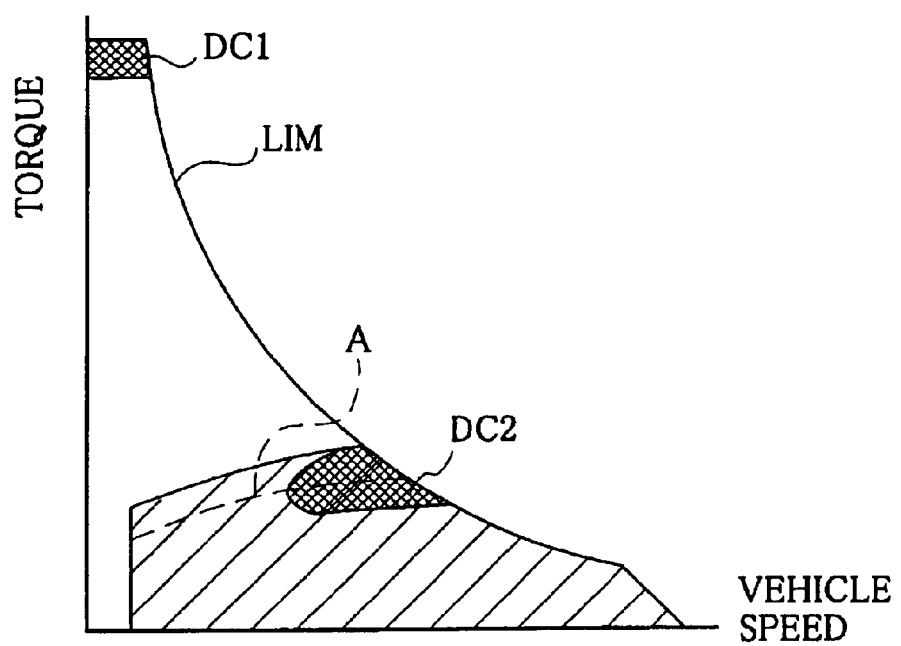
FIG. 30 shows selection of the drive mode in the driving range of the hybrid vehicle of the fourth embodiment.

Like the embodiments discussed above, the decision regarding the series range and the direct connection range is based on the table representing the relationship between the drive mode and the driving state of the vehicle. FIG. 30 shows an example of this table used in the fourth embodiment. Cross-hatched areas DC1 and DC2 show the direct connection range. The hatched area represents a driving area in the parallel mode, whereas the residual area represents a driving area in the series mode. The driving area in the direct connection mode in the fourth embodiment is identical with that of the second embodiment, whereas the driving area in the series mode is identical with that of the third embodiment.

As in the case of the second embodiment, the changeover between the parallel mode and the series mode is implemented via two different pathways. The first pathway attains the changeover between the parallel mode and the series mode via the connection state D5 in which both the first clutch 160E and the second clutch 162E are inactive. The second pathway attains the changeover between the parallel mode and the series mode via the connection state A5 in which both the first clutch 160E and the second clutch 162E are active. As discussed in the second embodiment (FIG. 20), the adequate pathway is selectively used according to the locus along which the driving state of the vehicle is varied in the table of FIG. 30.

After the selection of the drive mode by the above series of processing, the CPU carries out either the torque control process (step S300 in FIG. 5) or the start-stop control process (step S400) like the first embodiment. The details of the respective routines are similar to those discussed in the first embodiment (see FIGS. 8 and 10), except the settings for the drive points of the motors 130E and 140E.

The configuration in the parallel mode of the fourth embodiment is equivalent to the configuration in the parallel mode of the third embodiment. The settings for the drive points of the motors 130E and 140E are thus identical with those of the third embodiment in both the torque control process (FIG. 8) and the start-stop control process (FIG. 10).

The configuration in the series mode of the fourth embodiment is similar to the configuration in the series mode of the third embodiment, except some difference. In the third embodiment, the axle 116 and the motor 130E are driven at different revolving speeds corresponding to the gear ratio in the planetary gear unit 120E. In the fourth embodiment, however, the motor 130E is driven at the same revolving speed as that of the axle 116. The procedure of the fourth embodiment accordingly sets the target revolving speed N1 and the target torque T1 of the motor 130E equal to the target revolving speed Nd* and the target torque Td* of the axle 116.

As in the case of the second embodiment, a drive point on the working curve A where the revolving speed of the engine 150 is identical with the revolving speed of the axle 116 is selected for the drive point of the engine 150 in the direct connection mode. In the case where the output torque of the engine 150 driven at the selected drive point coincides with the required torque, the hybrid vehicle of the fourth embodiment is driven while setting the value '0' to the target torques of the motors 130E and 140E, that is, while keeping the motors 130E and 140E at an idle.

In the case where the output, of the engine 150 is less than the required torque, the settings for the drive points of the motors 130E and 140E are specified to compensate for the insufficiency of the torque. As in the case of the second embodiment, the distribution of the insufficient torque into the respective motors 130E and 140E is based on the ratio of the rated outputs of these motors. In the fourth embodiment, a variety of other settings may be applied for the distribution of the torque into the motors 130E and 140E in the direct connection mode.

The hybrid vehicle of the fourth embodiment carries out the above series of processing and is driven while outputting the power defined by the required revolving speed and torque. As in the case of the first embodiment, the CPU carries out the resonance suppression control process (step S500 in FIG. 5), subsequent to the above control processes.

The resonance suppression control process of the fourth embodiment is similar to that of the third embodiment (see FIG. 25), except some difference. The procedure of the third embodiment reduces the oil pressure of the clutch 160D or the brake 162D when the resonance occurs at the ring gear shaft. The procedure of the fourth embodiment reduces the oil pressure of the second clutch 161E, instead of the oil pressure of the brake 162D. The setting for the oil pressure of the second clutch 161E is specified in advance in the form of a table, which is equivalent to the table of the brake oil pressure in the third embodiment The procedure of the third embodiment reduces the oil pressure of the clutch 160D when the resonance occurs at the ring gear shaft in the parallel mode. In the same manner as the first embodiment, the procedure of the fourth embodiment reduces the oil pressure of the first clutch 160E when the resonance occurs in the parallel mode. In the fourth embodiment, the oil pressure of the first clutch 160E is reduced in the direct connection mode as well as in the parallel mode.

Like the first embodiment, the hybrid vehicle of the fourth embodiment discussed above selectively uses the parallel mode and the series mode according to the driving state of the vehicle, thus ensuring an efficient drive that takes advantage of the characteristics of these two drive modes. This arrangement enhances the driving efficiency of the hybrid vehicle and significantly improves the ride.

The structure of the fourth embodiment also takes the direct connection mode to exert the further effects as discussed in the second embodiment. In the direct connection mode, the torque may be output from all the engine 150 and the motors 130E and 140E. This extends the drivable area of the hybrid vehicle. The hybrid vehicle is also driven at an extremely high driving efficiency in the direct connection mode.

(6) Fifth Embodiment

Figure 31:
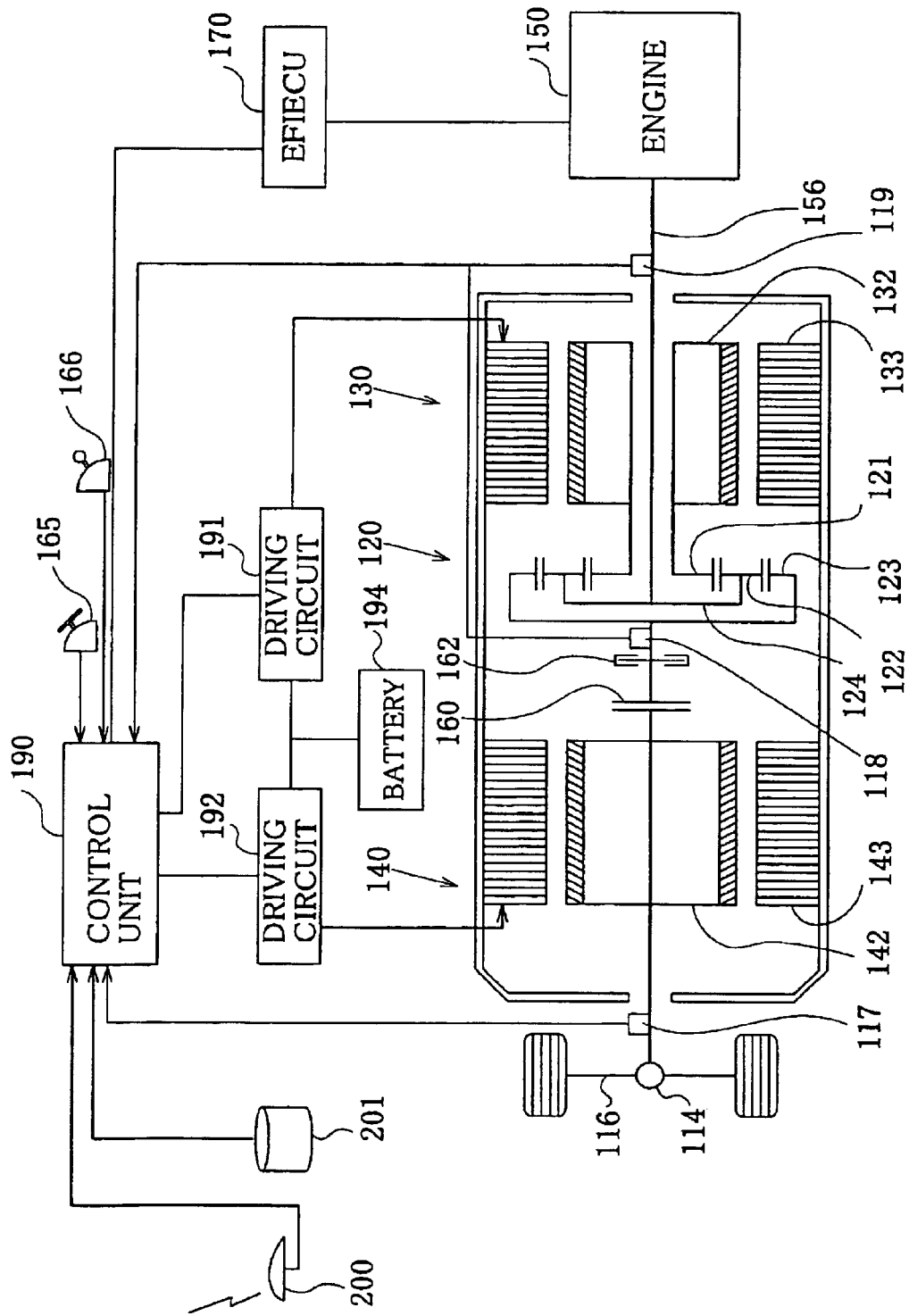
FIG. 31 schematically illustrates the general structure of a hybrid vehicle in a fifth embodiment.

A hybrid vehicle in a fifth embodiment of the present invention is discussed below. FIG. 31 schematically illustrates the structure of a hybrid vehicle in the fifth embodiment. The structure of the hybrid vehicle in the fifth embodiment is substantially similar to the structure of the hybrid vehicle in the first embodiment (FIG. 1). In the fifth embodiment, the configuration of the power system is selectable among the four connection states according to the conditions of the clutch 160 and the brake 162 shown in FIG. 2. The difference from the hybrid vehicle of the first embodiment is that the fifth embodiment has a route information sensor 200 and a road database 201 to give the control unit 190 information regarding the route which the vehicle takes.

The road database 201 mainly stores electronic road map data, and is constructed, for example, by a hard disk, a diversity of CD-ROMs, and other media. The positions as well as the altitudes of the respective roads are stored in the road database 201. The road database 201 also stores destinations and routes input in advance by the driver.

The route information sensor 200 detects the position of the hybrid vehicle and the road status with regard to a planned driving route. A sensor that measures the latitude and the longitude based on the radio wave from satellites may be used to detect the position of the hybrid vehicle. The hybrid vehicle may be provided with an inertia sensor or an acceleration sensor and compute the current position according to the driving data of the vehicle. The detection of the road status may be performed by a receiver that receives required pieces of information transmitted by the radio wave.

Figure 32:
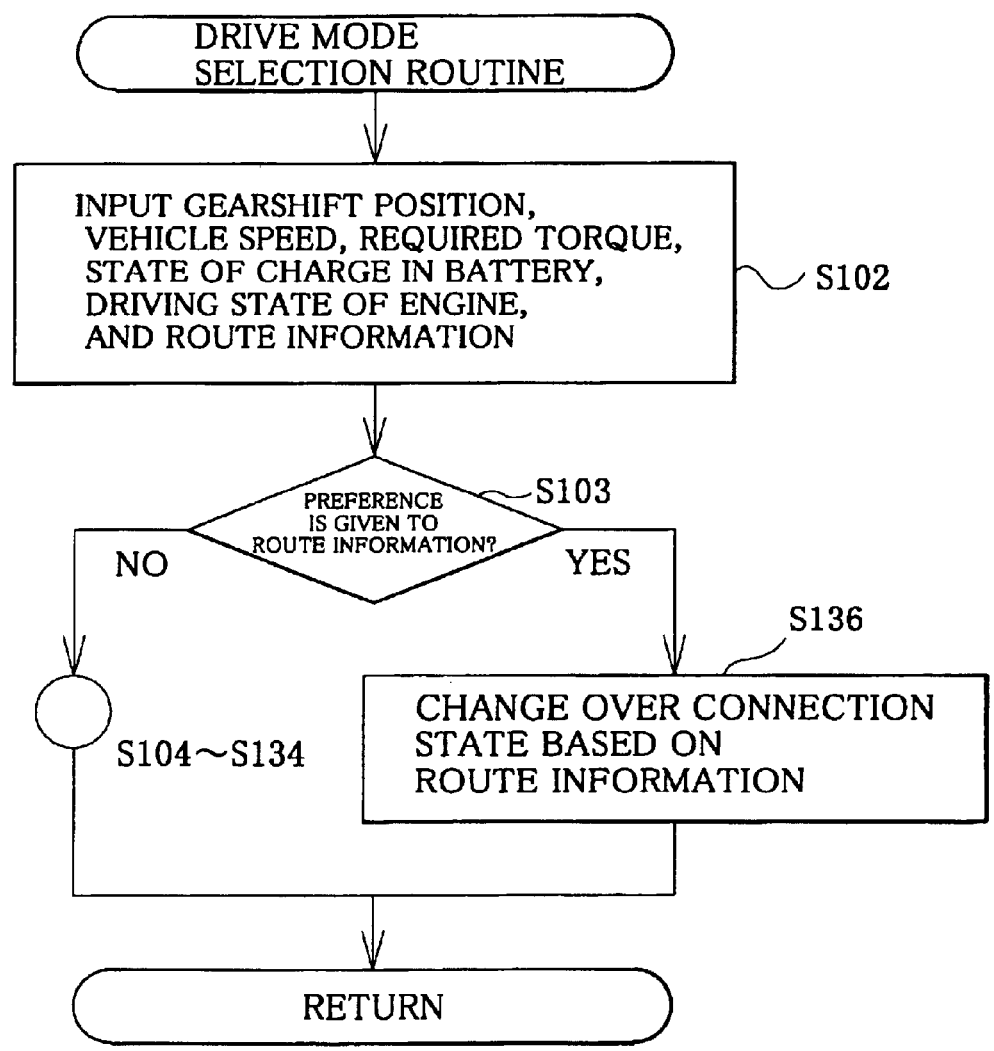
FIG. 32 is a flowchart showing a drive mode selection routine executed in the fifth embodiment.

The details of the drive mode selection process in the drive control routine (FIG. 5) executed in the hybrid vehicle of the fifth embodiment are different from those of the first embodiment. FIG. 32 shows the details of the drive mode selection process executed in the fifth embodiment. In this routine, the CPU reads route information in addition to the diversity of parameters representing the driving conditions of the vehicle (step S102). The input route information includes, for example, information regarding a variation in altitude of the planned driving route like upward slopes and downward slopes, information regarding the frequency of curves as in mountain roads, information regarding the type of road like a standard road or an expressway, and traffic jam information.

When it is determined that preference should be given to the route information (step S103), the CPU sets and changes over the drive mode based on the route information (step S136). Otherwise the CPU sets and changes over the drive mode according to the driving conditions of the vehicle, in the same manner as the first embodiment (see FIG. 6).

Figure 33:
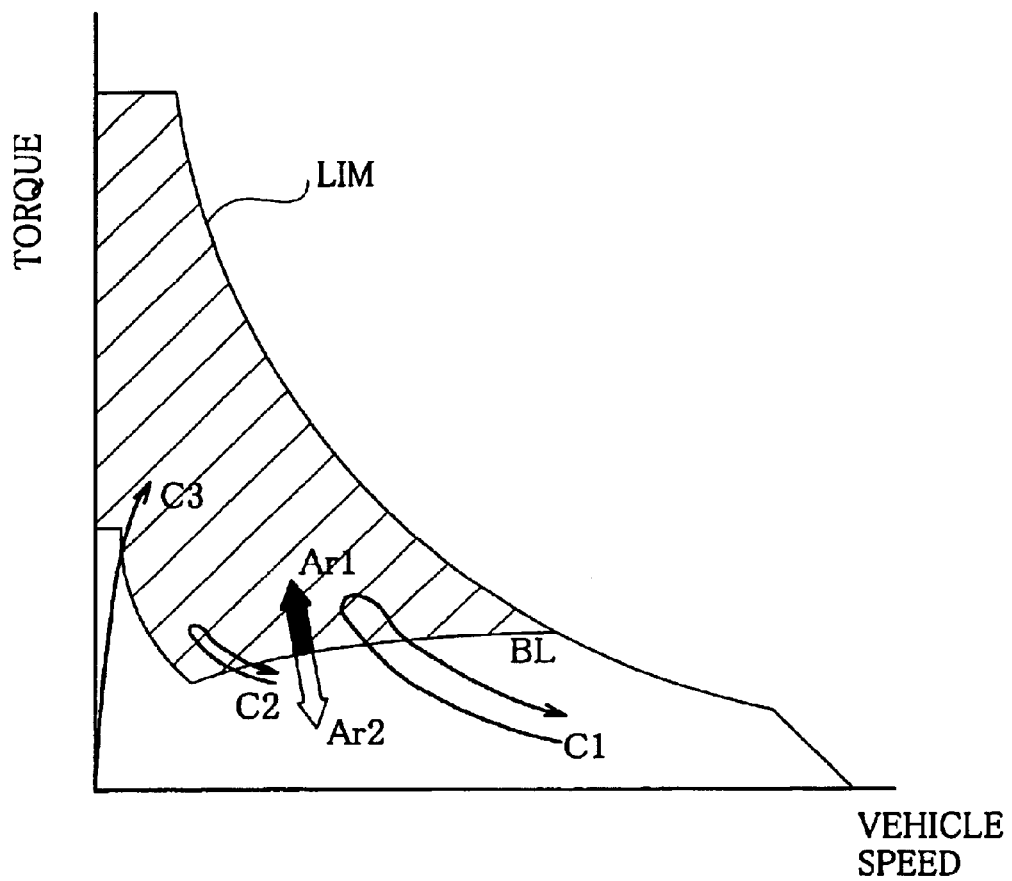
FIG. 33 shows selection of the drive mode in the driving range of the hybrid vehicle of the fifth embodiment.

In the structure of the fifth embodiment, a diversity of situations are identified in advance as the case of giving preference to the route information. Examples of such situation are discussed below with FIG. 33. FIG. 33 shows selection of the drive mode in the driving range of the hybrid vehicle of the fifth embodiment.

In a first example, the parallel mode is preferentially selected when the planned driving route includes an upward slope and the vehicle approaches to a predetermined area before the upward slope. As described previously with FIG. 14, the parallel mode has the higher driving efficiency than the series mode. There is a difference in charging efficiency due to the rating of the motor 130. In this embodiment, the motor of relatively small rating is applied for the motor 130, which accordingly has a relatively low upper limit of the power generation capacity. Under such conditions, even when the output power of the engine 150 satisfies the total required power for driving and for charging the battery 194, the motor 130 may not regenerate all the output power. In the series mode, it is accordingly required to gradually charge the battery 194 in a range of not exceeding the rating of the motor 130. In the parallel mode, on the other hand, part of the output power of the engine 150 is directly transmitted to the axle 116 in the form of mechanical power. This relatively reduces the electric power required for driving out of the electric power to be regenerated by the motor 130, that is, the electric power supplied to the motor 140. The parallel mode accordingly enables a greater quantity of electric power to be supplied for charging the battery 194.

Because of these reasons, the preferential selection of the parallel mode ensures a drive suitable to charge the battery 194 and make provision for the upward slope requiring greater power consumption. A variety of procedures may be applied for the drive with the preference given to the parallel mode. For example, as one application of step S136 that sets and changes over the drive mode based on the route information, the procedure may select the parallel mode irrespective of the driving conditions of the vehicle, in the case where the planned driving route includes an upward slope and the vehicle approaches to a predetermined area before the upward slope. In another example, in the table of specifying the drive mode (FIG. 33), a boundary BL between the series mode and the parallel mode may be shifted to extend the area of the parallel mode (in the direction of the arrow Ar2).

In a second example, the series mode is preferentially selected when the planned driving route includes a discrete curve or corner and the vehicle approaches to a predetermined area before the discrete curve or corner. A curve C1 in FIG. 33 represents the variation in driving state of the vehicle running on such a discrete curve or corner. The vehicle once decelerates and subsequently accelerates. The standard setting causes frequent changeover of the drive mode in the order of the series mode, the parallel mode, the series mode when the vehicle runs at the discrete curve or corner. The frequent changeover of the drive mode results in the poor ride and the poor response of the vehicle running at the discrete curve or corner, since there is often a time delay of the torque output on the occasion of the changeover. The hybrid vehicle of this embodiment sets the series mode to the drive mode in response to input of the route information representing the presence of such a discrete curve or corner. This arrangement effectively prevents the potential troubles due to the frequent changeover of the drive mode. In the table of specifying the drive mode (FIG. 33), the boundary BL may be shifted-to extend the area of the series mode (in the direction of the arrow Ar1).

In a third example, the parallel mode is preferentially selected when the planned driving route includes a continuous curve or corner and the vehicle approaches to a predetermined area before the continuous curve or corner. A curve C2 in FIG. 33 represents the variation in driving state of the vehicle running on such a continuous curve or corner. The vehicle on the continuous curve or corner is generally driven in an area of relatively low vehicle speed but high torque. Setting the parallel mode to the drive mode in response to input of the route information representing the presence of such a continuous curve or corner effectively prevents frequent changeover of the drive mode. In the table of specifying the drive mode (FIG. 33), the boundary BL may be shifted to extend the area of the parallel mode (in the direction of the arrow Ar2).

In a fourth example, the parallel mode is selected at the time of starting the vehicle, which is on an upward slope. A curve C3 in FIG. 33 represents the variation in driving state of the vehicle at the time of starting on the upward slope. The start on the upward slope requires a greater torque than the standard start. When the vehicle starts in the series mode according to the standard procedure, the drive mode should be changed over to the parallel mode immediately after the start. In the driving state that requires the large torque, it is desirably to continuously output the torque without changeover of the drive mode. Setting the parallel mode at the time of starting the vehicle on an upward slope effectively prevents the immediate changeover of the drive mode and ensures continuous output of the torque. The vehicle starting in the parallel mode may use only the power of the motor 140 or additionally use the power of the engine 150.

In a fifth example, the vehicle changes the boundary BL of the drive mode (FIG. 33) according to the slope in the planned driving route and preferentially selects the adequate drive mode. For example, a drive on the upward slope requires a relatively large torque, so that the vehicle is generally driven in the area of the parallel mode. Shifting the boundary BL according to the gradient of the upward slope to extend the area of the parallel mode (in the direction of the arrow Ar2 in FIG. 33) thus effectively prevents the frequent changeover of the drive mode during the drive. A drive on the downward slope does not require a large torque, so that the vehicle is generally driven in the area of the series mode. Shifting the boundary BL according to the gradient of the downward slope to extend the area of the series mode (in the direction of the arrow Ar1 in FIG. 33) thus effectively prevents the frequent changeover of the drive mode during the drive.

The vehicle may be driven with a negative torque, that is, with a braking force, on a steep downward slope, although not specifically illustrated in FIG. 33. In such cases, the motor 140 carries out regenerative braking. As the gradient of the downward slope becomes steeper, it is preferable to combine regenerative braking of the motor 130 and engine braking of the engine 150 with the regenerative braking of the motor 140. The regenerative braking of the motor 130 and the engine braking can be applied in the parallel mode. One preferable procedure may thus preferentially select the parallel mode when the vehicle is on an extremely steep downward slope.

A diversity of other settings may be applied to select the drive mode based on the route information. For example, the parallel mode is preferentially selected when the planned driving route includes an expressway, as in the case of the upward slope. Like the drive on the upward slope, the drive on the expressway requires the greater power consumption and thus selects the drive mode suitable to charge the battery 194.

In another example, the series mode is preferentially selected when the planned driving route has a traffic jam and the vehicle approaches to a predetermined area before the traffic jam. Stop, start, and low-speed drive of the vehicle are generally repeated in the traffic jam. Setting the series mode to the drive mode effectively prevents the frequent changeover of the drive mode in the traffic jam and ensures smooth driving. The process of setting and changing over the drive mode based on the route information is not restricted to the above examples. Still another example may change over the drive mode in the urban area and in the provincial area.

The hybrid vehicle of the fifth embodiment discussed above sets the adequate drive mode according to the driving state of the vehicle as well as the route information, thus ensuring an efficient drive that takes advantage of the characteristics of the parallel mode and the series mode. This arrangement enhances the driving efficiency of the hybrid vehicle and significantly improves the ride.

The fifth embodiment regards the structure that adds the route information sensor 200 and the road database 201 to the hybrid vehicle of the first embodiment. The structure may add the route information sensor 200 and the road database 201 to any of the hybrid vehicles of the other embodiments and their modified examples.

The present invention is not restricted to the above embodiments or their modified examples, but there may be many other modifications, changes, and alterations without departing from the scope or spirit of the main characteristics of the present invention. For example, the hybrid vehicle of each embodiment uses the gasoline engine 150 for the engine, but another power source like a Diesel engine is also applicable for the engine. The three-phase synchronous motor used in any of the above embodiments may be replaced by an induction motor, another a.c. motor, or a d.c. motor. In the above embodiments, the CPU executes the software to implement the variety of control procedures. Such control procedures may alternatively be attained by the hardware configuration. The technique of the present invention is not restricted to the hybrid vehicle discussed in the embodiments, but may be applied to a diversity of power output apparatuses including ships and vessels, aircraft, and machine tools.

INDUSTRIAL APPLICABILITY

The technique of the present invention is effectively utilized to attain a hybrid-type power output apparatus that enables changeover between the parallel hybrid configuration and the series hybrid configuration and ensures a high driving efficiency in a wide driving range.

What is claimed is:

1. A power output apparatus comprising at least an engine and two motors and causing power to be output from a drive shaft, said power output apparatus comprising:

changeover means that changes over a connection state of the engine and the two motors between a parallel connection mode, in which at least part of output of the engine is transmitted in the form of mechanical power to the drive shaft and at least one of the two motors is utilized as a power source, and a series connection mode, in which at least one of the two motors converts the output of the engine into electric power and the other motor reconverts the electric power into mechanical power and outputs the mechanical power to the drive shaft; and a control means that controls said changeover means to change over the connection state to the series connection mode each and every time that power is outputted in a reverse direction is instructed.

2. A power output apparatus in accordance with claim 1, wherein one of the two motors functions as a power regulation unit, which has at least two rotating shafts and is capable of regulating magnitude of power transmitted between the at least two rotating shafts through transmission of electric power, said power regulation unit and the other motor are arranged in series between an output shaft of the engine and the drive shaft, and said changeover means comprises:

a connection mechanism that connects and disconnects the power regulation unit with and from the other motor; and a constraint mechanism that constrains one of the at least two rotating shafts in said power regulation unit and thereby allows conversion between electric power and mechanical power in said power regulation unit in a released position of the connection mechanism.

3. A power output apparatus in accordance with claim 2, wherein said power regulation unit comprises a pair-rotor motor having two rotors that are rotatable relative to each other.

4. A power output apparatus in accordance with claim 2, wherein said power regulation unit comprises a planetary gear unit having three rotating shafts and a motor generator linked with one of the three rotating shafts.

5. A power output apparatus in accordance with claim 4, wherein the constraint mechanism links the residual two rotating shafts of the planetary gear unit with each other.

6. A power output apparatus in accordance with claim 2, wherein the constraint mechanism constrains rotation of a specific rotating shaft that is linked with the connection mechanism, among the at least two rotating shafts in said power regulation unit.

7. A hybrid vehicle that has at least an engine and two motors mounted thereon and is driven while causing power to be output from a drive shaft, said hybrid vehicle comprising:

changeover means that changes over a connection state of the engine and the two motors between a parallel connection mode, in which at least part of output of the engine is transmitted in the form of mechanical power to the drive shaft and at least one of the two motors is utilized as a power source, and a series connection mode, in which at least one of the two motors converts the output of the engine into electric power and the other motor reconverts the electric power into mechanical power and outputs the mechanical power to the drive shaft; and a control means that controls said changeover means to change over the connection state to the series connection mode each and every time that it is determined that the current gearshift position is at the reverse position.

8. A hybrid vehicle in accordance with claim 7, wherein one of the two motors functions as a power regulation unit, which has at least two rotating shafts and is capable of regulating magnitude of power transmitted between the at least two rotating shafts through transmission of electric power, said power regulation unit and the other motor are arranged in series between an output shaft of the engine and the drive shaft, and said changeover means comprises:

a connection mechanism that connects and disconnects the power regulation unit with and from the other motor; and a constraint mechanism that constrains one of the at least two rotating shafts in said power regulation unit and thereby allows conversion between electric power and mechanical power in said power regulation unit in a released position of the connection mechanism.

9. A hybrid vehicle in accordance with claim 8, wherein said power regulation unit comprises a pair-rotor motor having two rotors that are rotatable relative to each other.

10. A hybrid vehicle in accordance with claim 8, wherein said power regulation unit comprises a planetary gear unit having three rotating shafts and a motor generator linked with one of the three rotating shafts.

11. A hybrid vehicle in accordance with claim 10, wherein the constraint mechanism links the residual two rotating shafts of the planetary gear unit with each other.

12. A hybrid vehicle in accordance with claim 8, wherein the constraint mechanism constrains rotation of a specific rotating shaft that is linked with the connection mechanism, among the at least two rotating shafts in said power regulation unit.

13. A hybrid vehicle in accordance with claim 7, said hybrid vehicle further comprising:

detection means that detects a predetermined parameter relating to a driving state of said hybrid vehicle; and control means that controls said changeover means to change over the connection state, based on a result of the detection.

14. A hybrid vehicle in accordance with claim 13, wherein said control means comprises:

a storage unit that stores a mapping of each range of the predetermined parameter to the connection state having a high driving efficiency; and a unit that refers to the storage unit based on the result of the detection by said detection means and implements the changeover of the connection state.

15. A hybrid vehicle in accordance with claim 13, wherein said detection means determines whether or not said hybrid vehicle is at a stop, and said control means selects the series connection mode when it is determined that said hybrid vehicle is at a stop.

16. A hybrid vehicle in accordance with claim 13, wherein said detection means determines whether or not said hybrid vehicle is in a specific driving state that requires motoring of the engine, and said control means selects the series connection mode when it is determined that said hybrid vehicle is in the specific driving state.

17. A hybrid vehicle in accordance with claim 13, wherein said detection means determines whether or not said hybrid vehicle is in a certain driving state that requires a stop of the engine, and said control means selects the series connection mode when it is determined that said hybrid vehicle is in the certain driving state.

18. A hybrid vehicle in accordance with claim 7, said hybrid vehicle further comprising:

route information input means that inputs route information relating to a driving state of said hybrid vehicle, with regard to a preset driving route of said hybrid vehicle, and said control means carries out the changeover by taking into account the route information.

19. A hybrid vehicle that has at least an engine and two motors mounted thereon and is driven while causing power to be output from a drive shaft, said hybrid vehicle comprising:

changeover means that changes over a connection state of the engine and the two motors between a parallel connection mode, in which at least part of output of the engine is transmitted in the form of mechanical power to the drive shaft and at least one of the two motors is utilized as a power source, and a series connection mode, in which at least one of the two motors converts the output of the engine into electric power and the other motor reconverts the electric power into mechanical power and outputs the mechanical power to the drive shaft, wherein one of the two motors functions as a power regulation unit, which has at least two rotating shafts and is capable of regulating magnitude of power transmitted between the at least two rotating shafts through transmission of electric power, said power regulation unit and the other motor are arranged in series between an output shaft of the engine and the drive shaft, and said changeover means comprises:

a connection mechanism that connects and disconnects the power regulation unit with and from the other motor; and a constraint mechanism that constrains one of the at least two rotating shafts in said power regulation unit and thereby allows conversion between electric power and mechanical power in said power regulation unit in a released position of the connection mechanism, said hybrid vehicle further comprising:

resonance detection means that detects occurrence of a resonance on at least one of the output shaft of the engine and the drive shaft; and resonance suppression control means that, when the occurrence of the resonance is detected at any shaft, controls both the connection mechanism and the constraint mechanism to restrict a torque applied on the shaft with the resonance.

20. A hybrid vehicle in accordance with claim 19, wherein said resonance suppression control means restricts the torque applied on the shaft with the resonance to be not greater than a torsional strength of the shaft.

21. A hybrid vehicle in accordance with claim 19, wherein said resonance suppression control means restricts the torque applied on the shaft with the resonance to a specific level that causes no vibrations of said hybrid vehicle.

22. A hybrid vehicle in accordance with claim 19, wherein said power regulation unit is linked with the engine, said resonance detection means detects the occurrence of the resonance on the output shaft of the engine in the released position of the connection mechanism and in an active position of the constraint mechanism, and said resonance suppression control means reduces a force of constraint by the constraint mechanism when the occurrence of the resonance is detected.

23. A hybrid vehicle in accordance with claim 22, wherein said resonance detection means detects the occurrence of the resonance in the course of motoring the engine, and said resonance suppression control means reduces the force of constraint by the constraint mechanism in a certain range that enables a specific torque, which allows motoring of the engine, to be added to the output shaft.

24. A hybrid vehicle in accordance with claim 19, wherein said resonance detection means detects the occurrence of the resonance on the drive shaft in a coupled position of the connection mechanism, and said resonance suppression control means reduces a force of connection by the connection mechanism when the occurrence of the resonance is detected.

25. A hybrid vehicle in accordance with claim 24, wherein said resonance detection means detects the occurrence of the resonance in the course of braking said hybrid vehicle, and said resonance suppression control means reduces the force of connection by the connection mechanism in a certain range that enables transmission of a specific torque, which is not less than a maximum regenerative torque applied by one of said power regulation unit and the other motor arranged closer to the engine.

26. A hybrid vehicle in accordance with claim 19, wherein said power regulation unit comprises a planetary gear unit having three rotating shafts and a motor generator linked with one of the three rotating shafts, the constraint mechanism links the residual two rotating shafts of the planetary gear unit with each other, said resonance detection means detects a required torque to be output from the drive shaft, and said resonance suppression control means makes both the connection mechanism and the constraint mechanism in coupled positions when the required torque is not less than a preset value.

27. A method of controlling a hybrid vehicle, said hybrid vehicle comprising: at least an engine and a motor as power source for causing power to be output from a drive shaft; and changeover means that changes over a connection state of the engine and the motor between a parallel connection mode, which transmits at least part of output of the engine to the drive shaft in the form of mechanical power, and a series connection mode, which converts the output of the engine into electric power and outputs the electric power to the drive shaft, said method comprising the steps of:

(a) detecting whether or not a current gearshift position is at the reverse position; and (b) controlling said changeover means to change over the connection state to the series connection mode each and every time that it is determined that the current gearshift position is at the reverse position.

* * * * *